(12) United States Patent
Koo et al.

(10) Patent No.: US 12,250,393 B2
(45) Date of Patent: *Mar. 11, 2025

(54) IMAGE ENCODING/DECODING METHOD AND DEVICE THEREFOR

(71) Applicant: LG ELECTRONICS INC.

(72) Inventors: Moonmo Koo, Seoul (KR); Mehdi Salehifar, Seoul (KR); Seunghwan Kim, Seoul (KR); Jaehyun Lim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/386,135

(22) Filed: Nov. 1, 2023

(65) Prior Publication Data

US 2024/0114159 A1  Apr. 4, 2024

Related U.S. Application Data

(63) Continuation of application No. 17/716,772, filed on Apr. 8, 2022, now Pat. No. 11,863,778, which is a continuation of application No. 17/266,407, filed as application No. PCT/KR2019/009990 on Aug. 8, 2019, now Pat. No. 11,412,242.

(Continued)

(51) Int. Cl.
| | |
|---|---|
| *H04N 19/44* | (2014.01) |
| *H04N 19/132* | (2014.01) |
| *H04N 19/159* | (2014.01) |
| *H04N 19/176* | (2014.01) |

(Continued)

(52) U.S. Cl.
CPC .......... *H04N 19/44* (2014.11); *H04N 19/132* (2014.11); *H04N 19/159* (2014.11); *H04N 19/176* (2014.11); *H04N 19/625* (2014.11); *H04N 19/70* (2014.11)

(58) Field of Classification Search
CPC ...................................................... H04N 19/44
See application file for complete search history.

(56) References Cited

U.S. PATENT DOCUMENTS

| 2021/0185358 A1* | 6/2021 | Jung | .................... H04N 19/119 |
| 2021/0227260 A1* | 7/2021 | Lee | ........................ H04N 19/88 |

* cited by examiner

*Primary Examiner* — Jerry T Jean Baptiste
(74) *Attorney, Agent, or Firm* — Bryan Cave Leighton Paisner LLP

(57) ABSTRACT

The present invention relates to a video signal decoding method based on a Multiple Transform Selection (MTS). The method may comprise the steps of: parsing a first syntax element representing whether MTS applies to the inverse transformation of a current block, wherein the MTS represents a transform mode which uses a transform type other than a default transform type predefined for the current block; by performing inverse quantization on the current block, deriving an inverse-quantized transform coefficient array having the width and the height of the current block; determining, on the basis of the first syntax element, a vertical transform type applying to the vertical direction of the current block, and a horizontal transform type applying to the horizontal direction of the current block; and, by performing inverse transformation on the inverse-quantized transform coefficient array by using the vertical transform type and the horizontal transform type, deriving a residual sample array having the width and the height of the current block.

7 Claims, 35 Drawing Sheets

Related U.S. Application Data

(60) Provisional application No. 62/716,355, filed on Aug. 8, 2018.

(51) Int. Cl.
*H04N 19/625* (2014.01)
*H04N 19/70* (2014.01)

[FIG. 1]
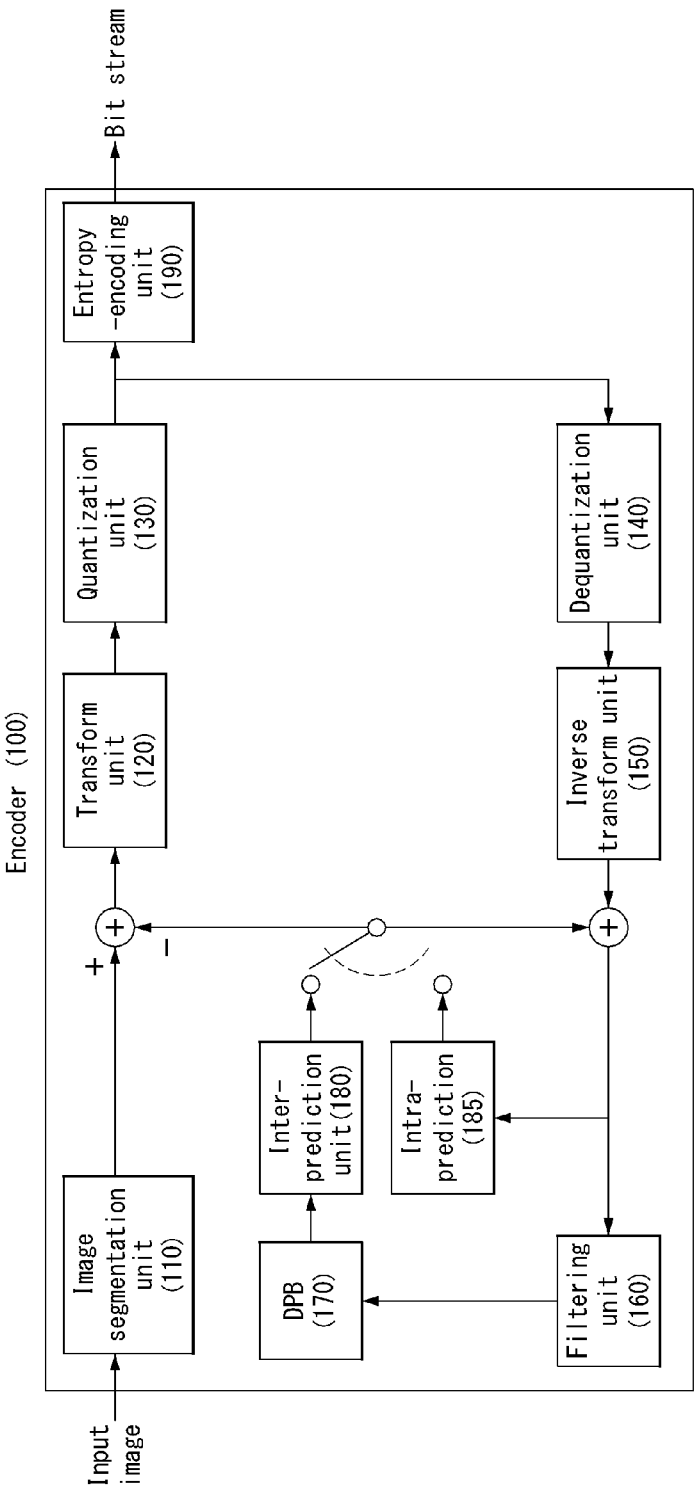

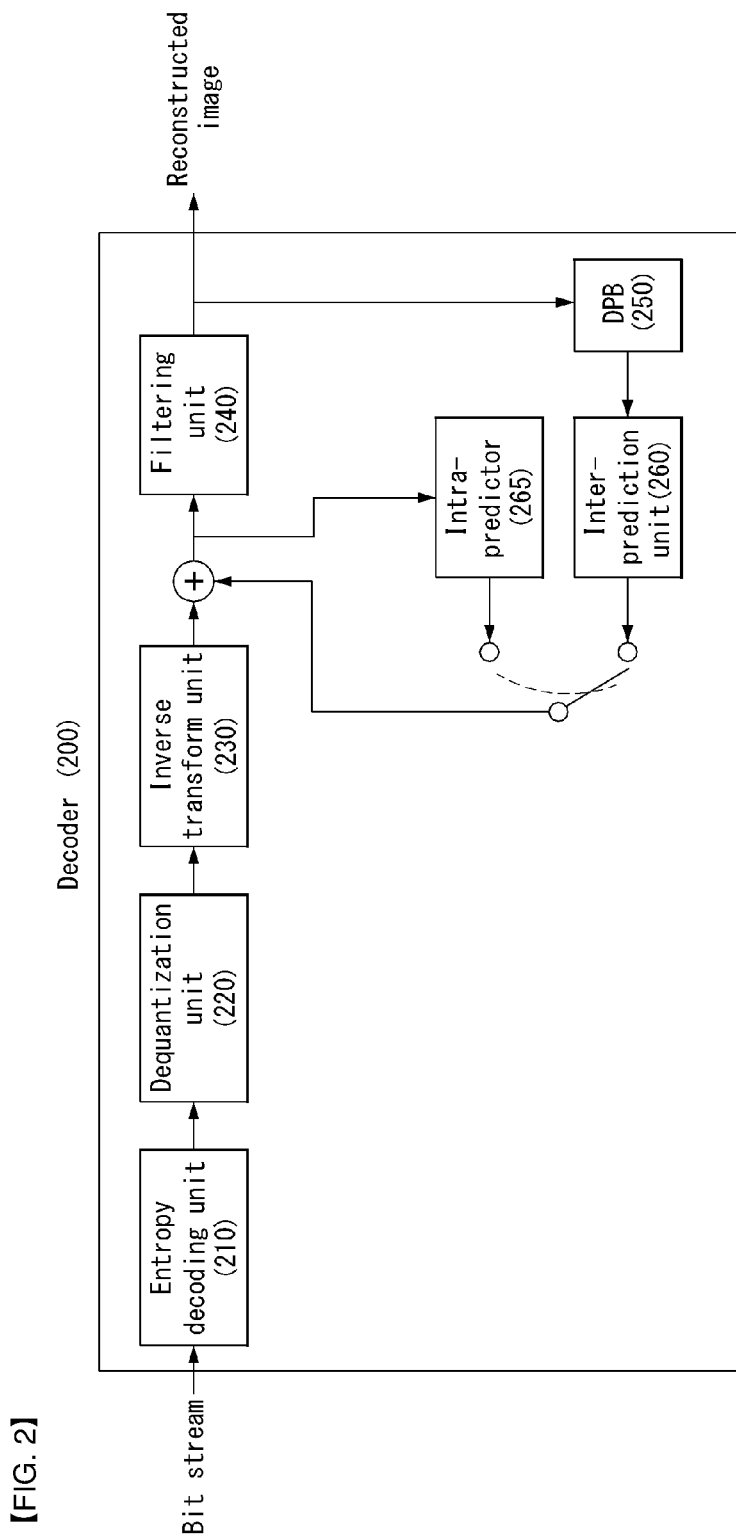
[FIG. 2]

[FIG. 3a]
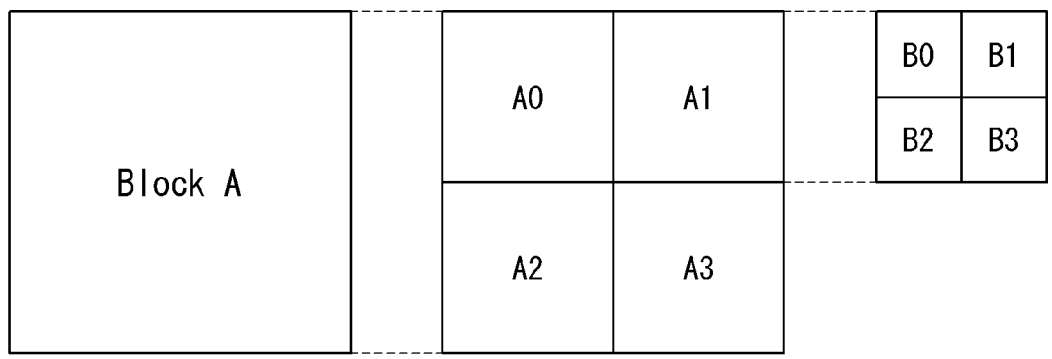
[FIG. 3b]
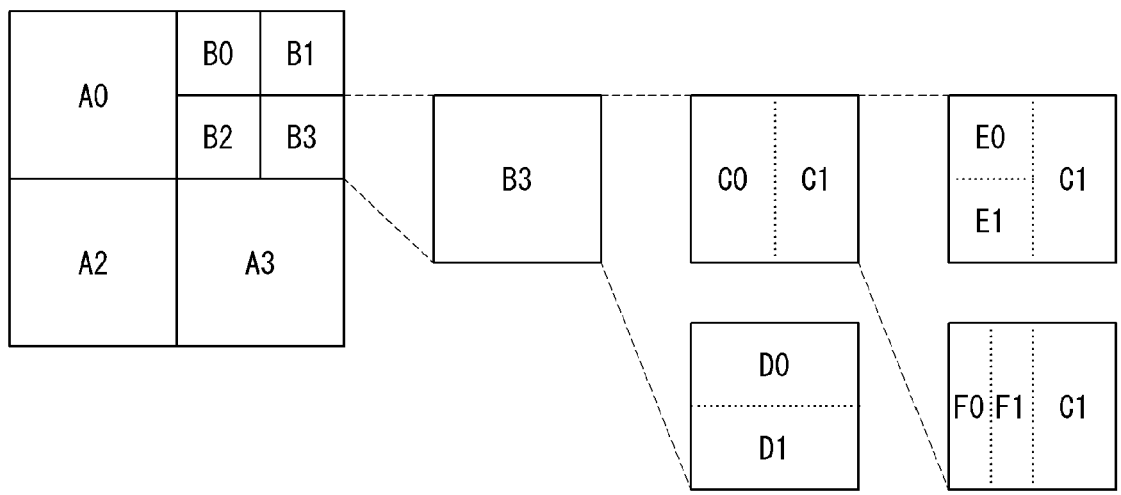

[FIG. 3c]
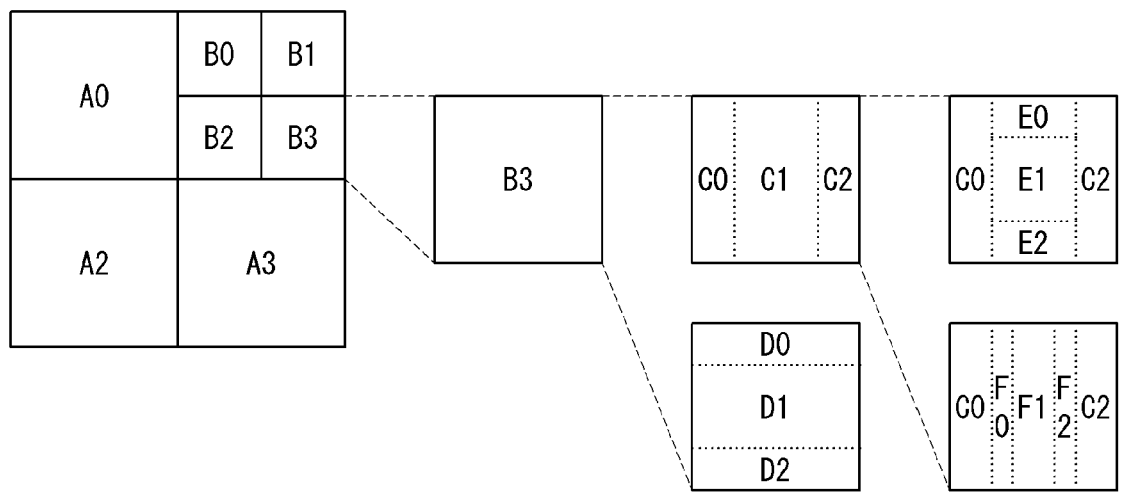
[FIG. 3d]
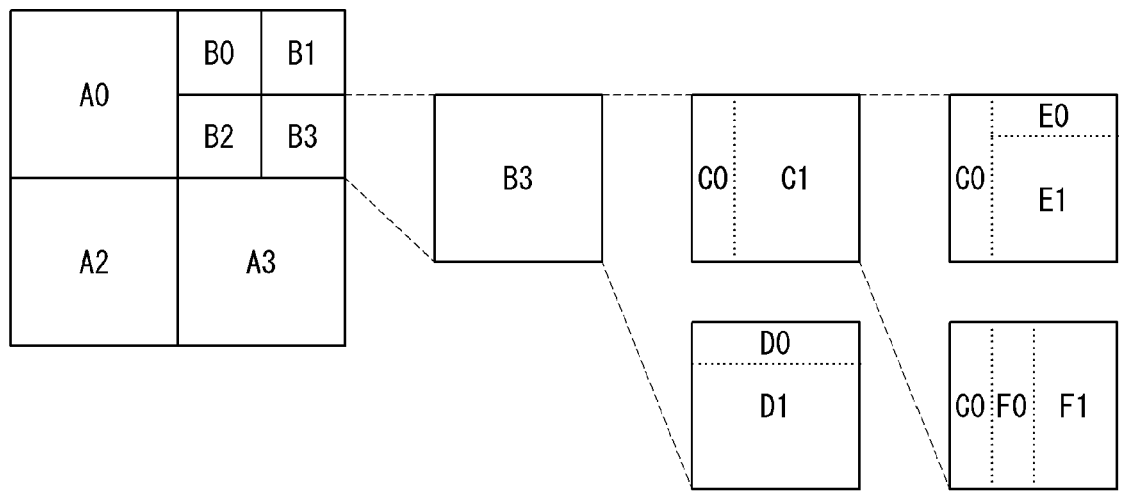

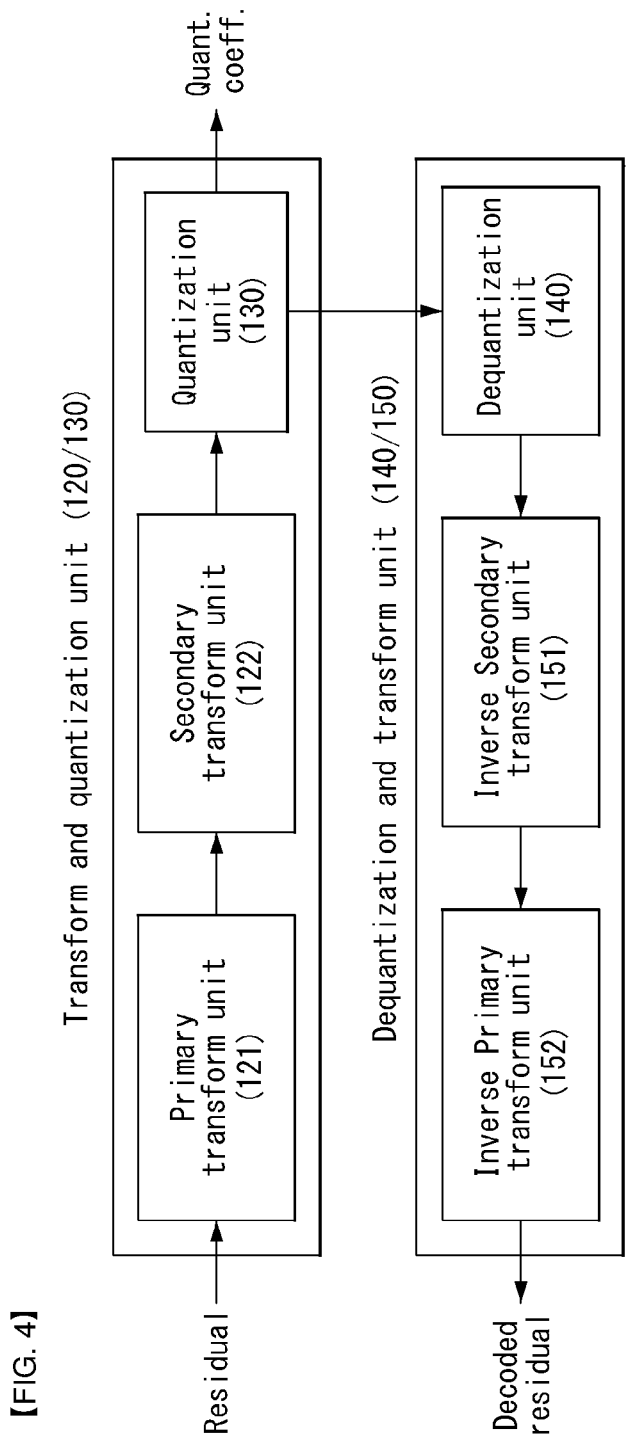
[FIG. 4]

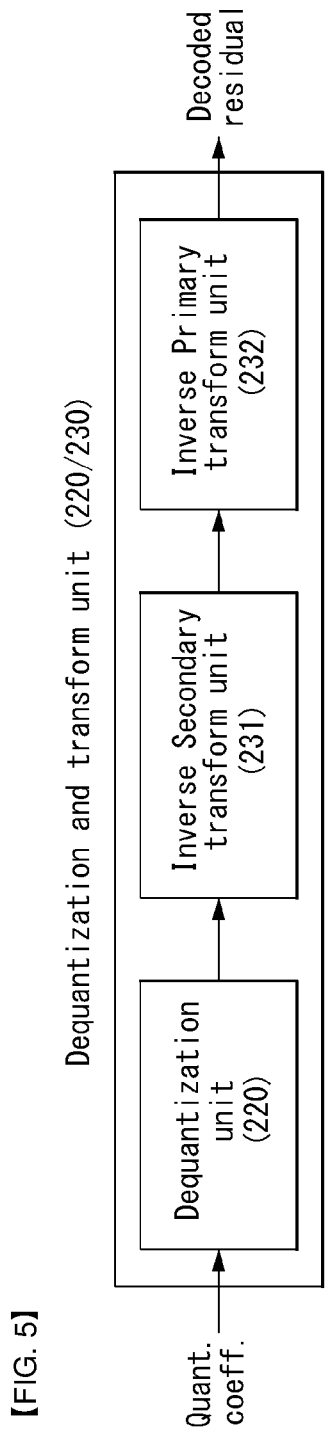
[FIG. 5]

[FIG. 6]

| Configuration group | Index | Horizontal (row) transform | Vertical (column) transform | 35 intra Prediction modes | 67 intra Prediction modes |
|---|---|---|---|---|---|
| Group 0 (G0) | 0 | DST7 | DST7 | 0 | 0 |
| | 1 | DCT5 | DST7 | | |
| | 2 | DST7 | DCT5 | | |
| | 3 | DCT5 | DCT5 | | |
| Group 1 (G1) | 0 | DST7 | DST7 | 1, 3, 5, 7, 13, 15, 17, 19, 21, 23, 29, 31, 33 | 1, 3, 5, 7, 9, 11, 13, 23, 25, 27, 29, 31, 33, 35, 37, 39, 41, 43, 45, 55, 57, 59, 61, 63, 65 |
| | 1 | DST1 | DST7 | | |
| | 2 | DST7 | DST1 | | |
| | 3 | DST1 | DST1 | | |
| Group 2 (G2) | 0 | DST7 | DST7 | 2, 4, 6, 14, 16, 18, 20, 22, 30, 32, 34 | 2, 4, 6, 8, 10, 12, 24, 26, 28, 30, 32, 34, 36, 38, 40, 42, 44, 56, 58, 60, 64, 66 |
| | 1 | DCT8 | DST7 | | |
| | 2 | DST7 | DCT8 | | |
| | 3 | DCT8 | DCT8 | | |
| Group 3 (G3) | 0 | DST7 | DST7 | 8, 9, 10, 11, 12 (Neighboring angles to horizontal directions) | 14, 15, 16, 17, 18, 19, 20, 21, 22 (Neighboring angles to horizontal directions) |
| | 1 | DCT5 | DST7 | | |
| | 2 | DST7 | DCT8 | | |
| | 3 | DCT5 | DCT8 | | |
| Group 4 (G4) | 0 | DST7 | DST7 | 24, 25, 26, 27, 28 (Neighboring angles to vertical directions) | 46, 47, 48, 49, 50, 51, 52, 53, 54 (Neighboring angles to vertical directions) |
| | 1 | DCT8 | DST7 | | |
| | 2 | DST7 | DCT5 | | |
| | 3 | DCT8 | DCT5 | | |
| Group 5 (G5) | 0 | DST7 | DCT8 | Inter prediction | Inter prediction |
| | 1 | DST7 | DCT8 | | |
| | 2 | DCT8 | DST7 | | |
| | 3 | DST7 | DST7 | | |

[FIG. 7]
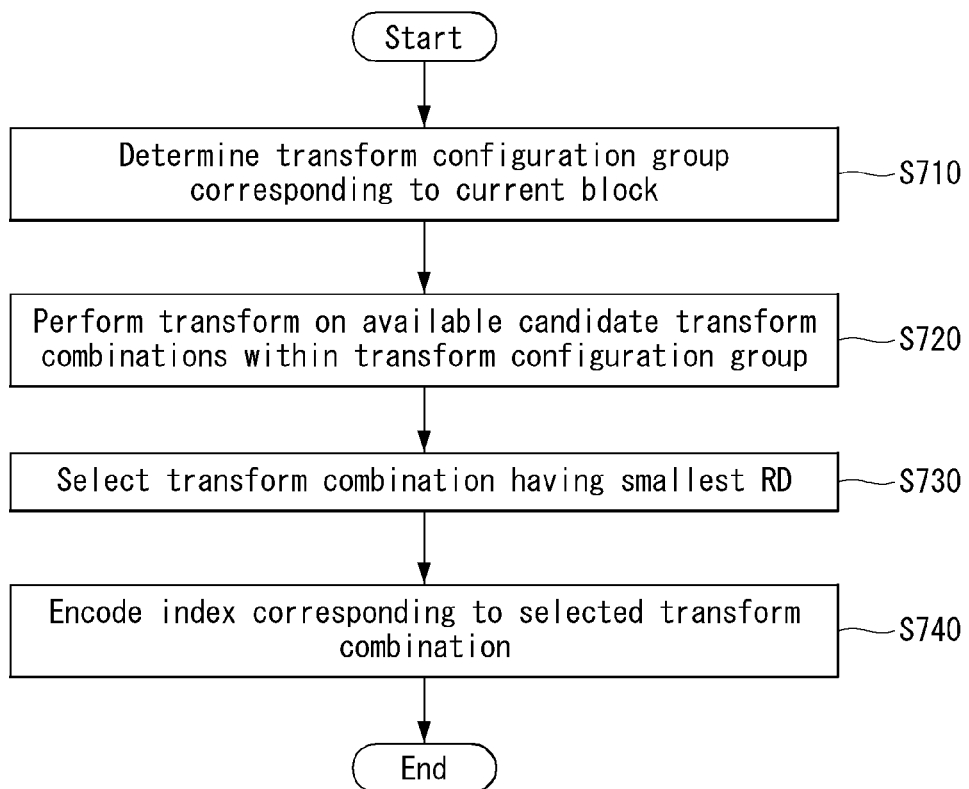

[FIG. 8]
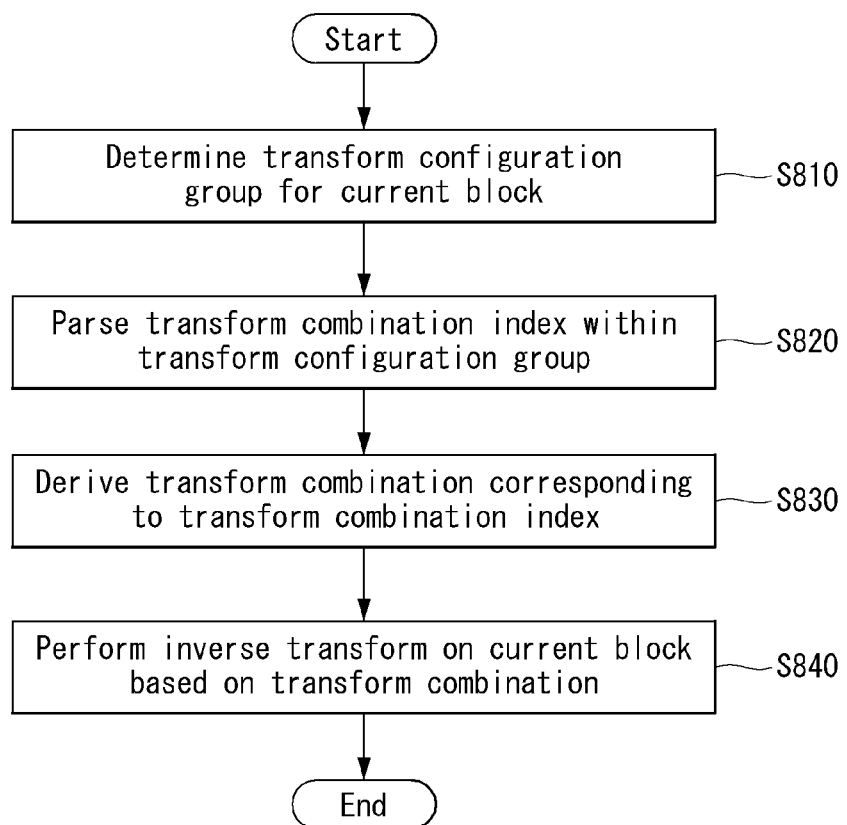

[FIG. 9]
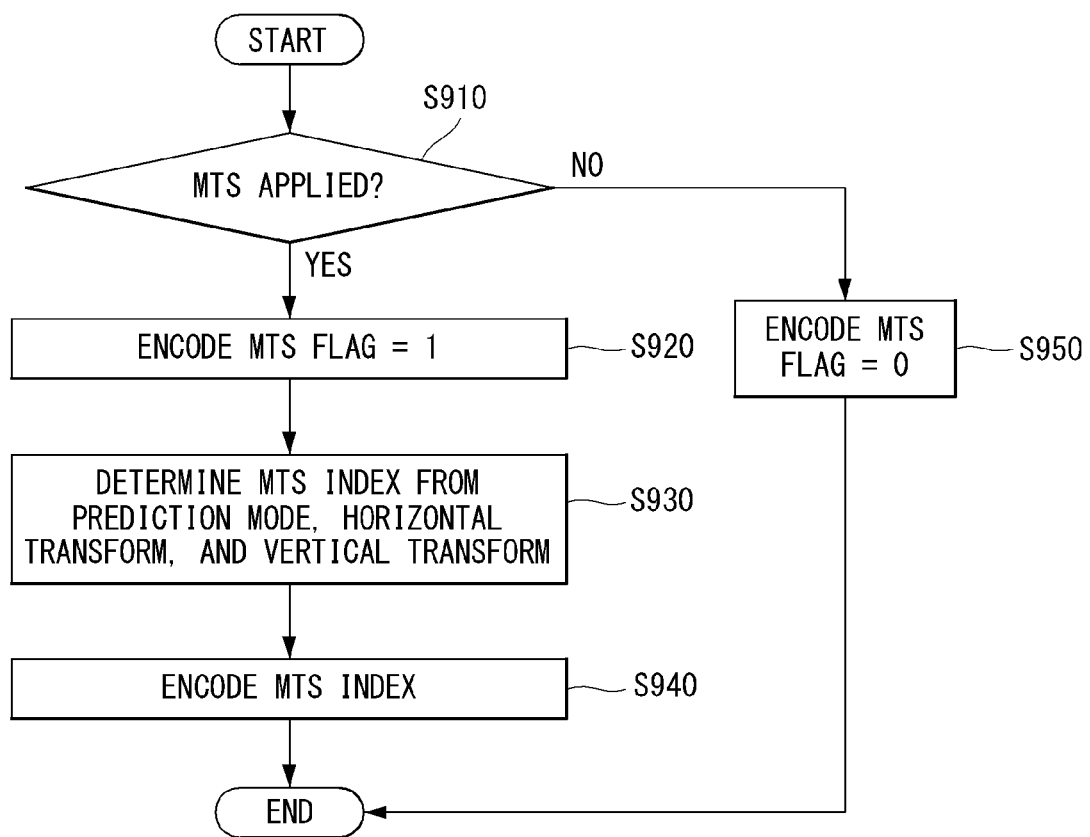

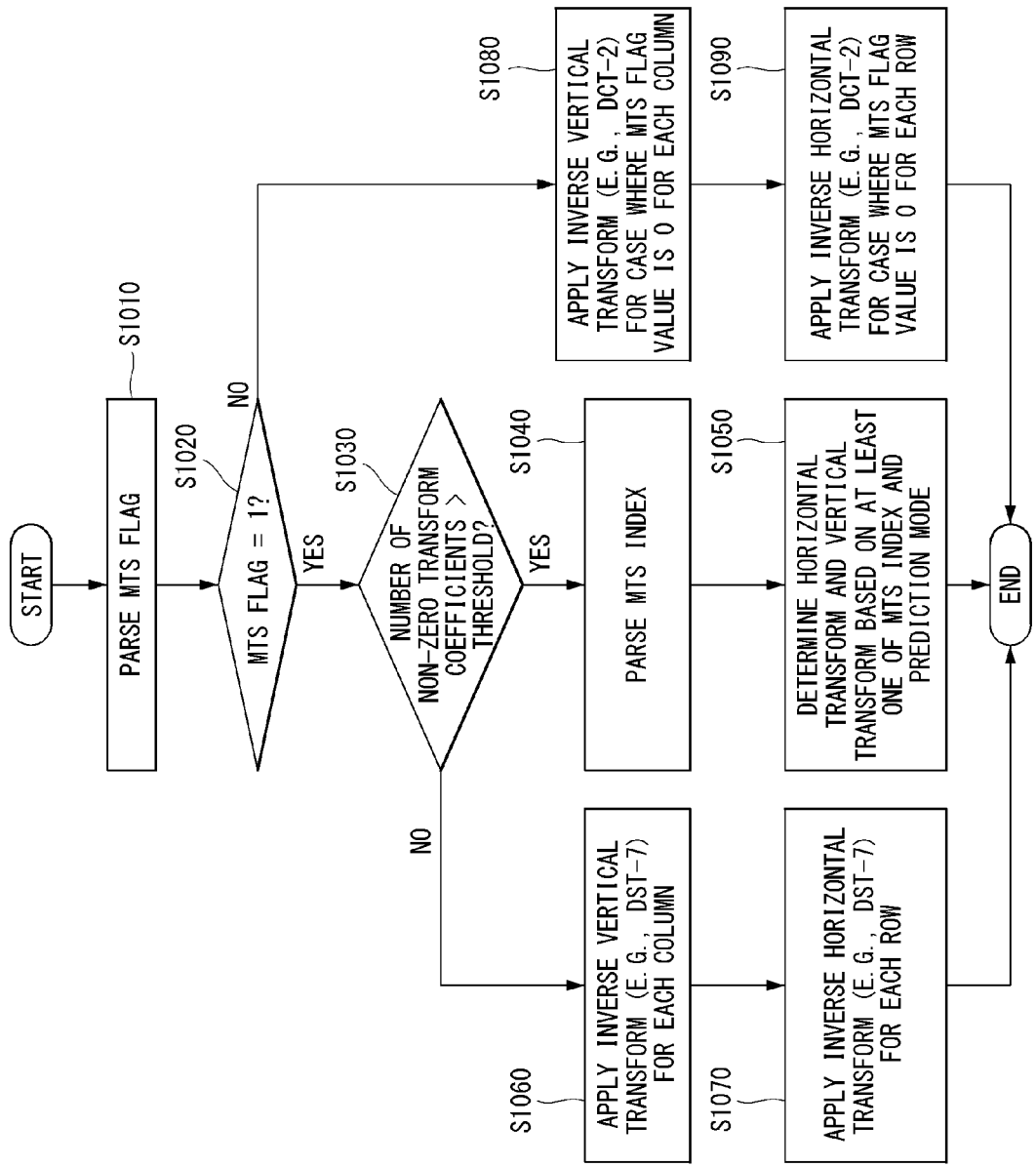

[FIG. 11]
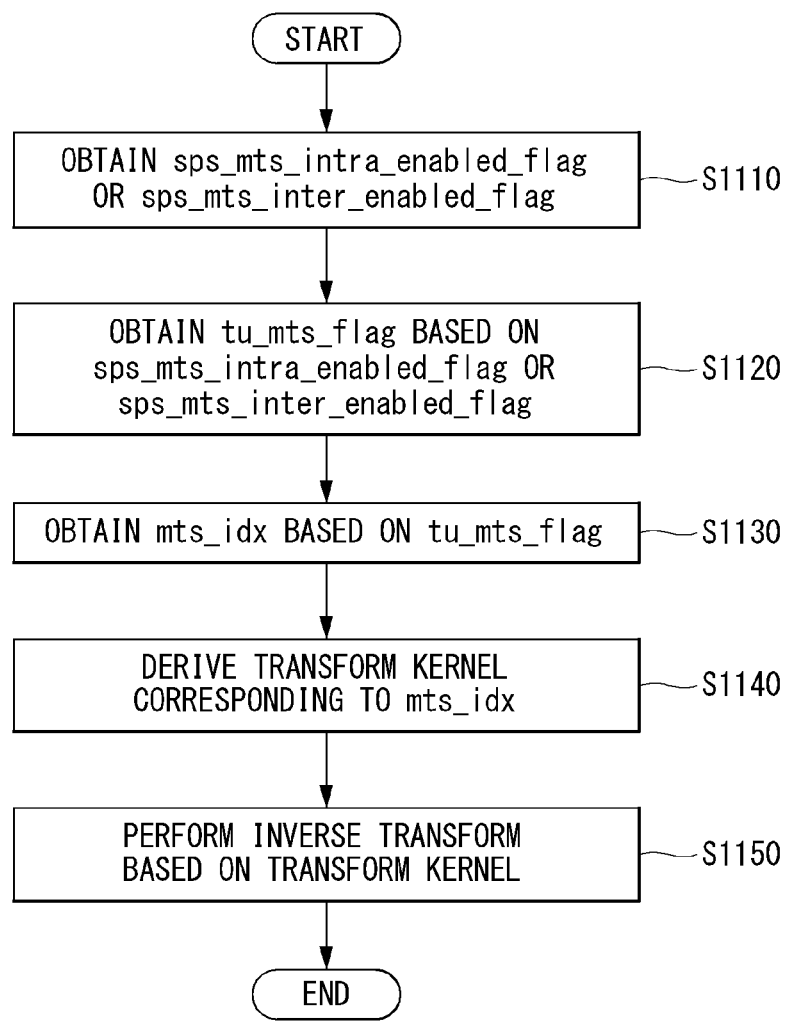

[FIG. 12]

| intra mode | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|
| set | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
| intra mode | 34 | 35 | 36 | 37 | 38 | 39 | 40 | 41 | 42 | 43 | 44 | 45 | 46 | 47 | 48 | 49 | 50 | 51 | 55 | 53 | 54 | 55 | 56 | 57 | 58 | 59 | 60 | 61 | 62 | 63 | 64 | 65 | 66 | 67 (LM) |
| set | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | NULL |

[FIG. 13]
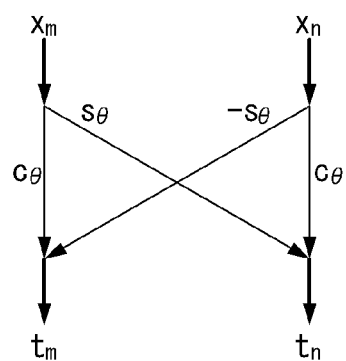

[FIG. 14]
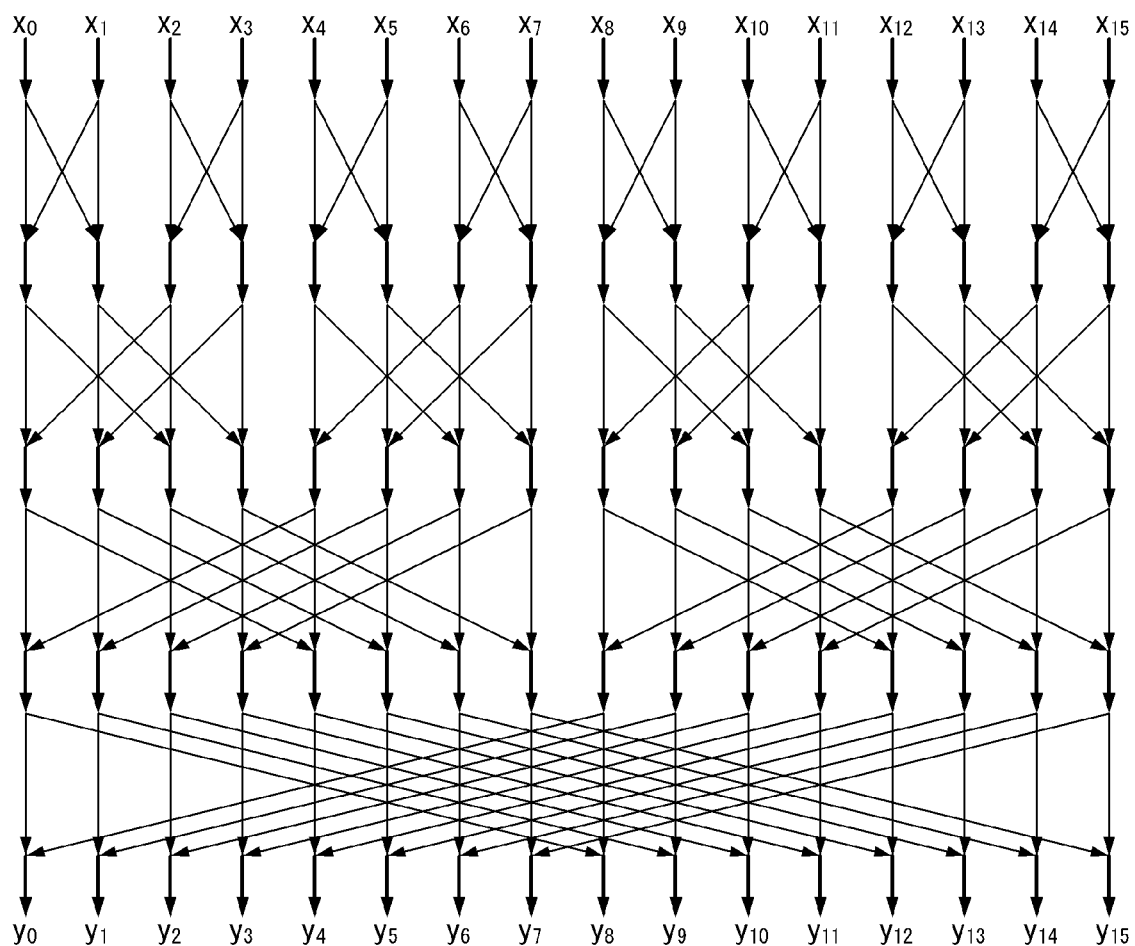

[FIG. 15]
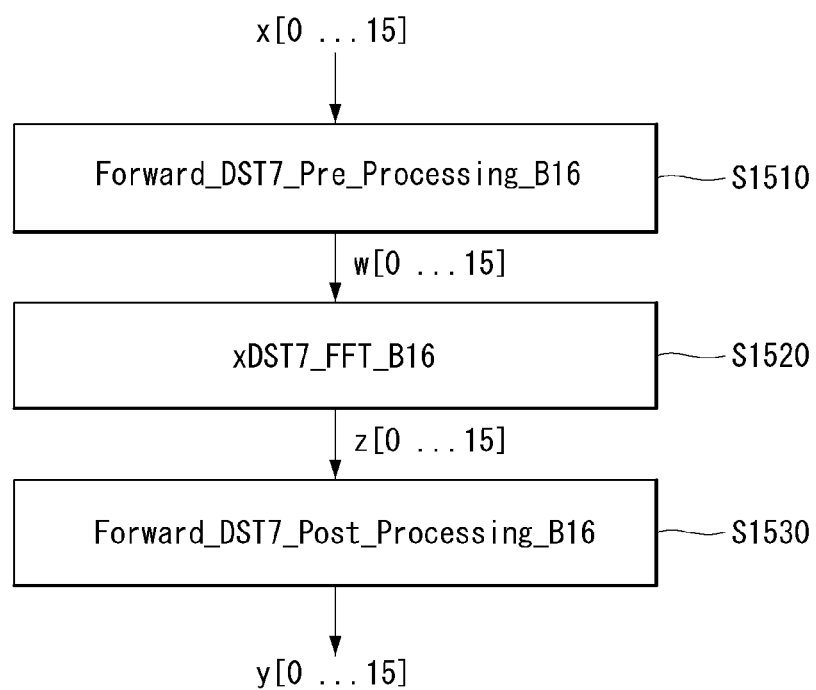

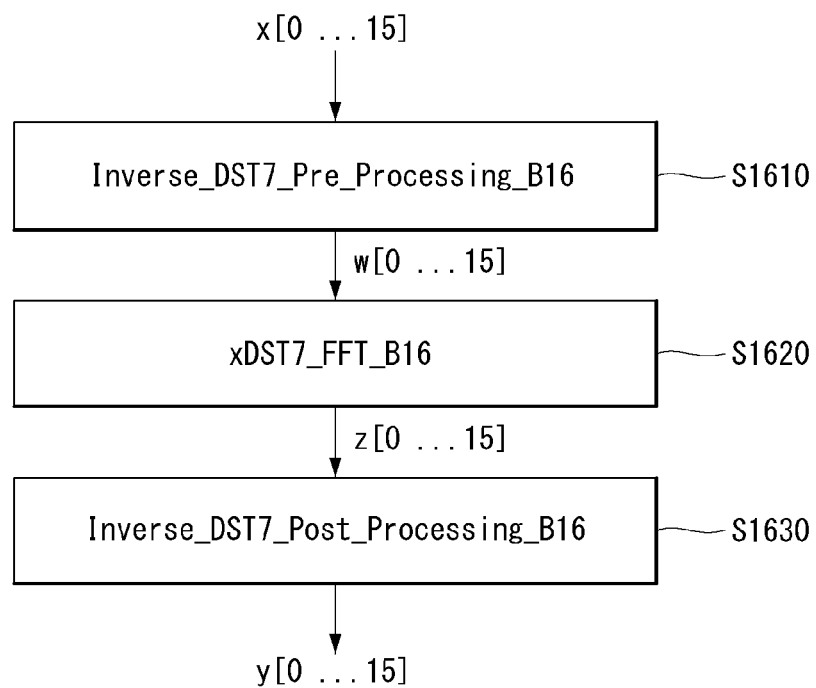
[FIG. 16]

[FIG. 17]
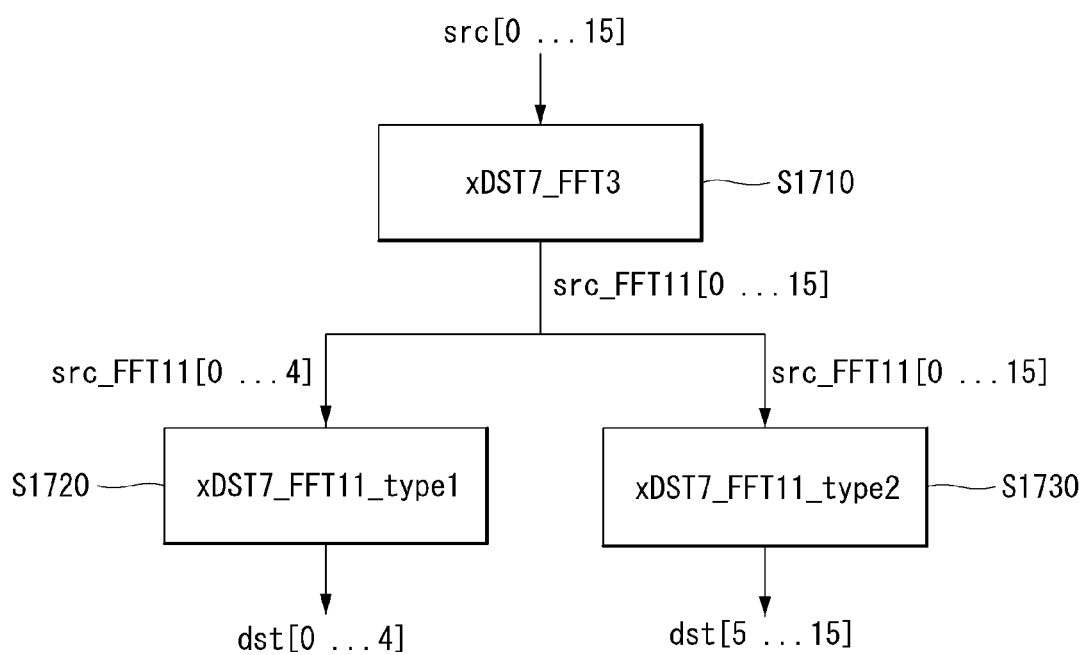

[FIG. 18]
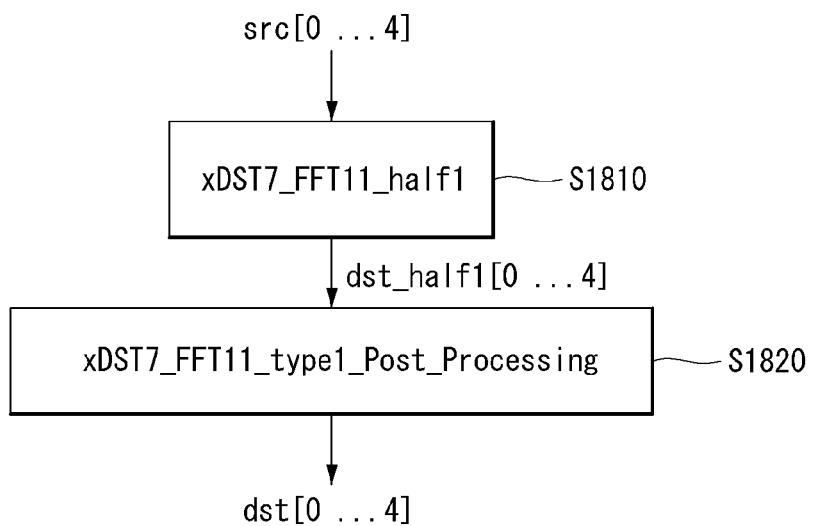

[FIG. 19]
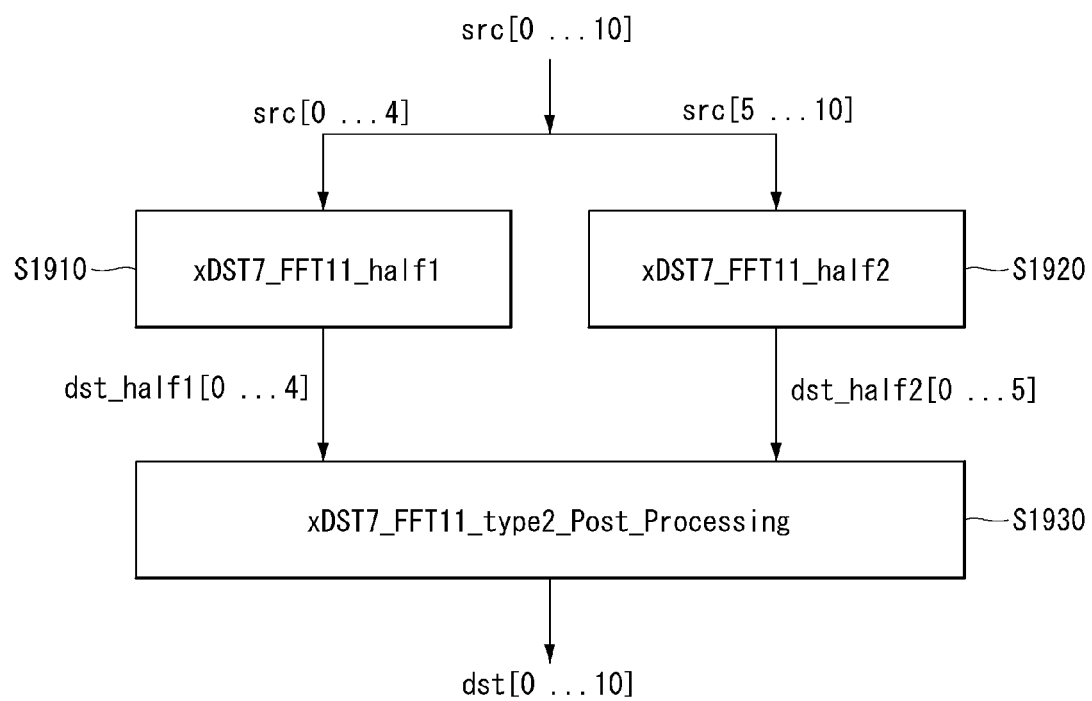

[FIG. 20]
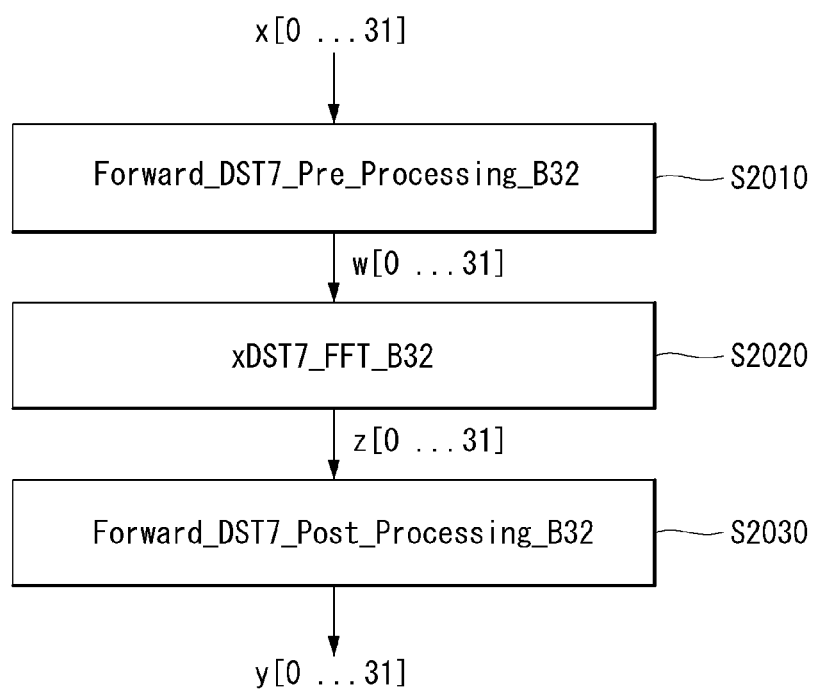

[FIG. 21]
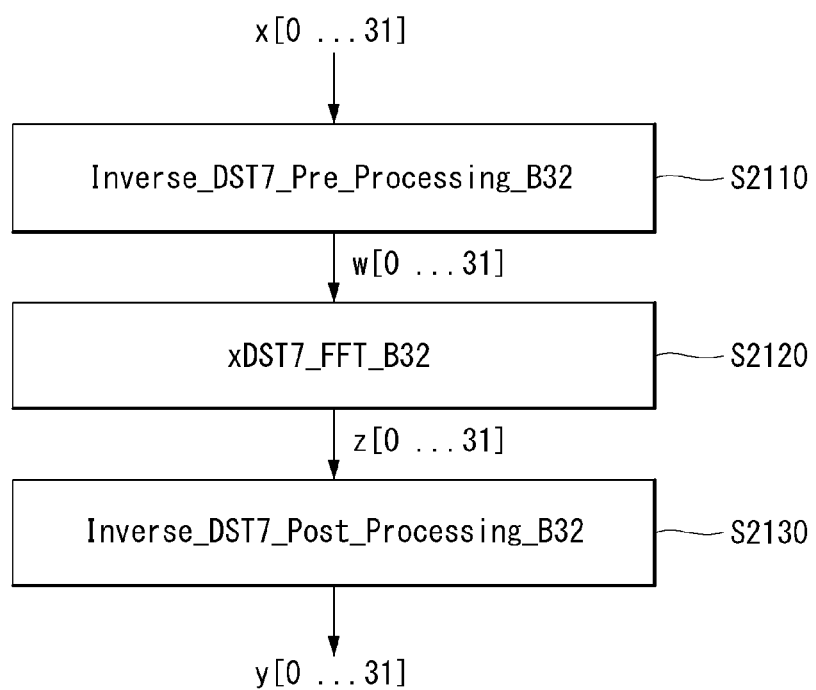

[FIG. 22]
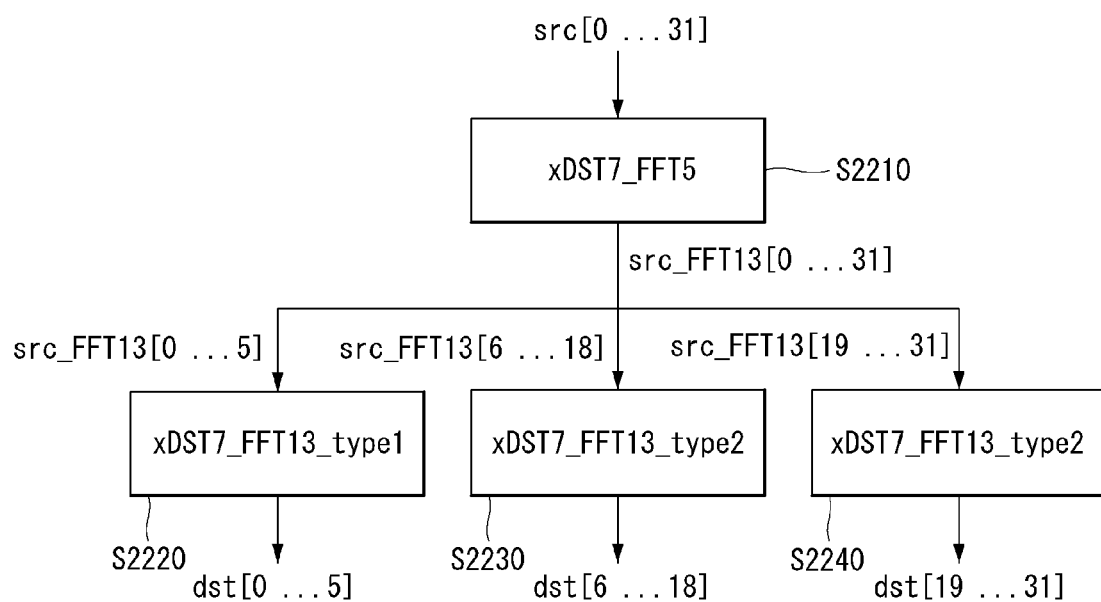

[FIG. 23]
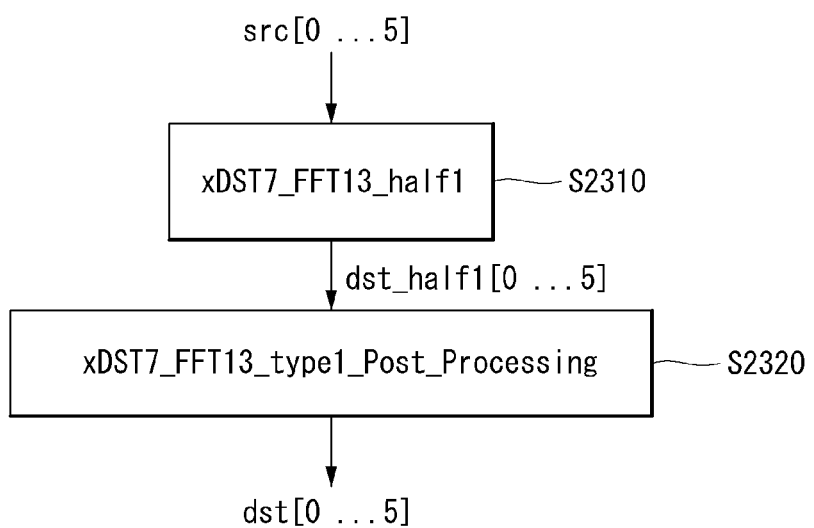

[FIG. 24]
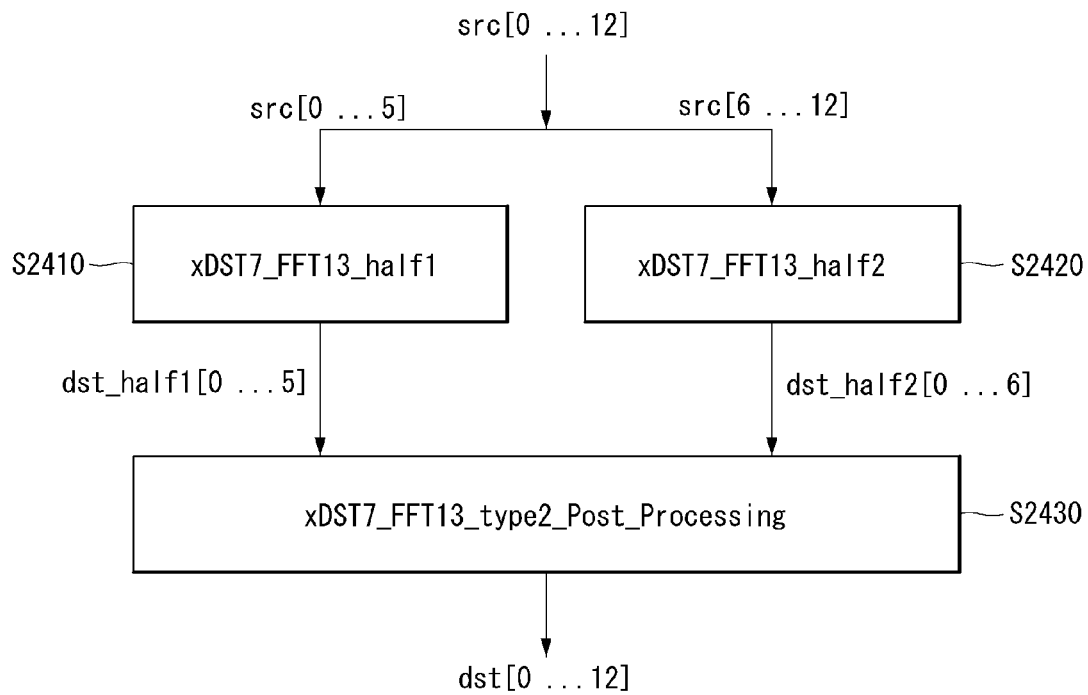

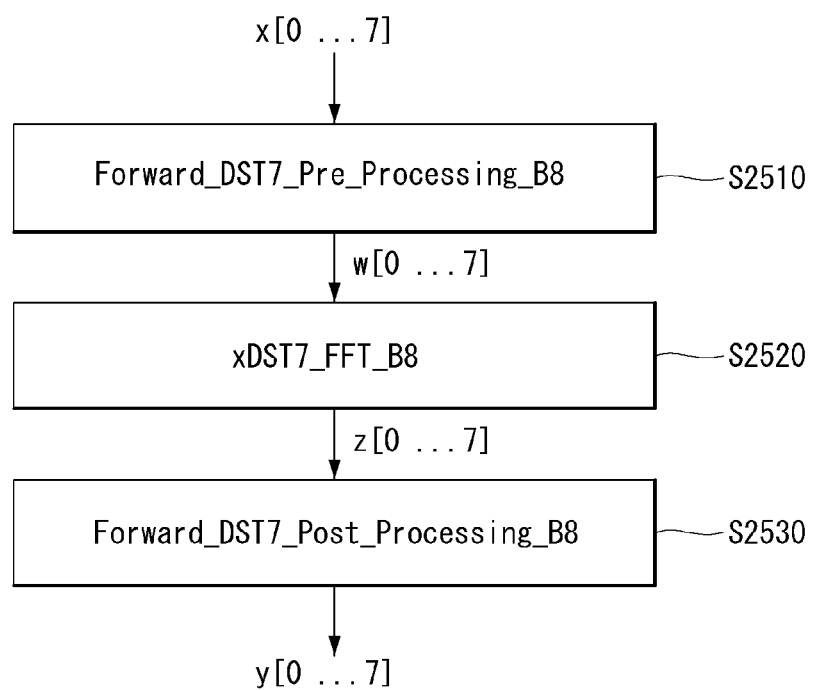
[FIG. 25]

[FIG. 26]
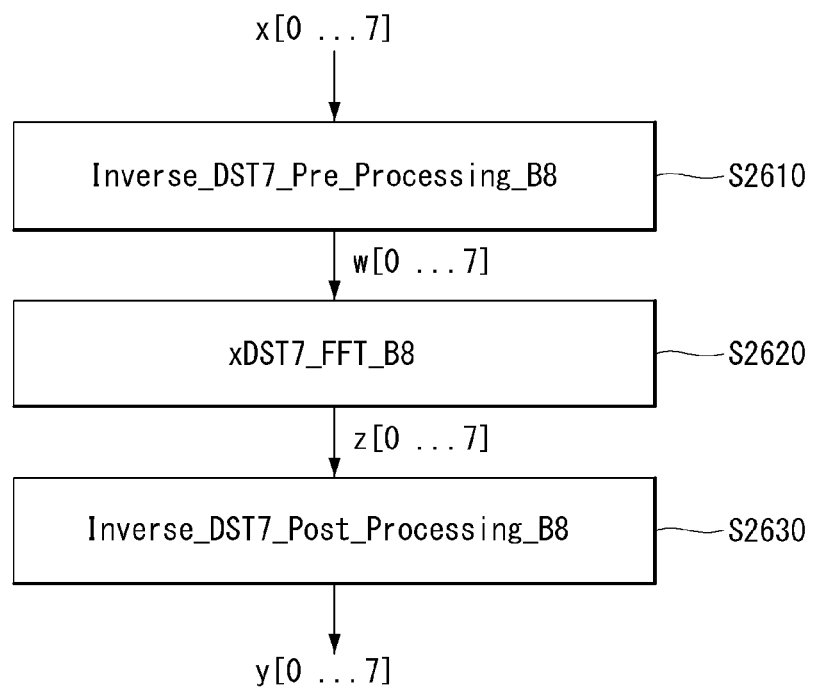

[FIG. 27]
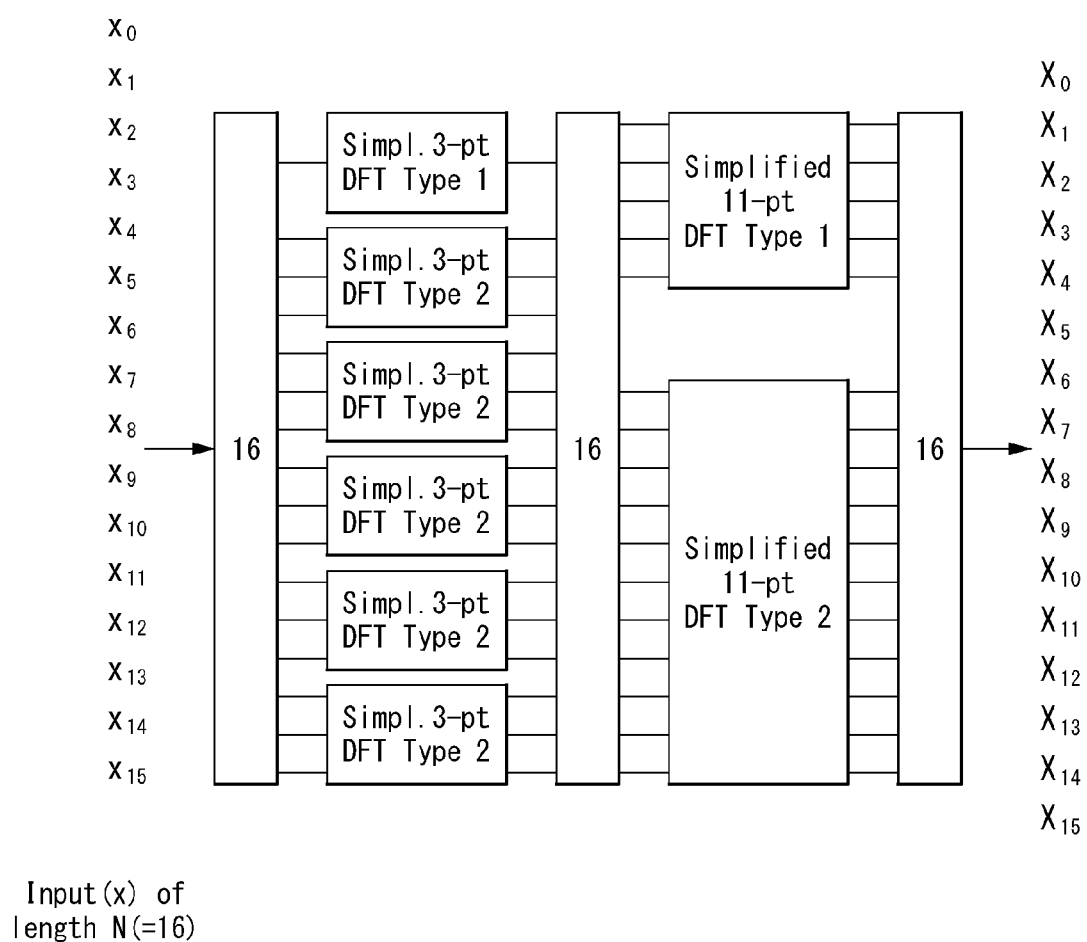

[FIG. 28]
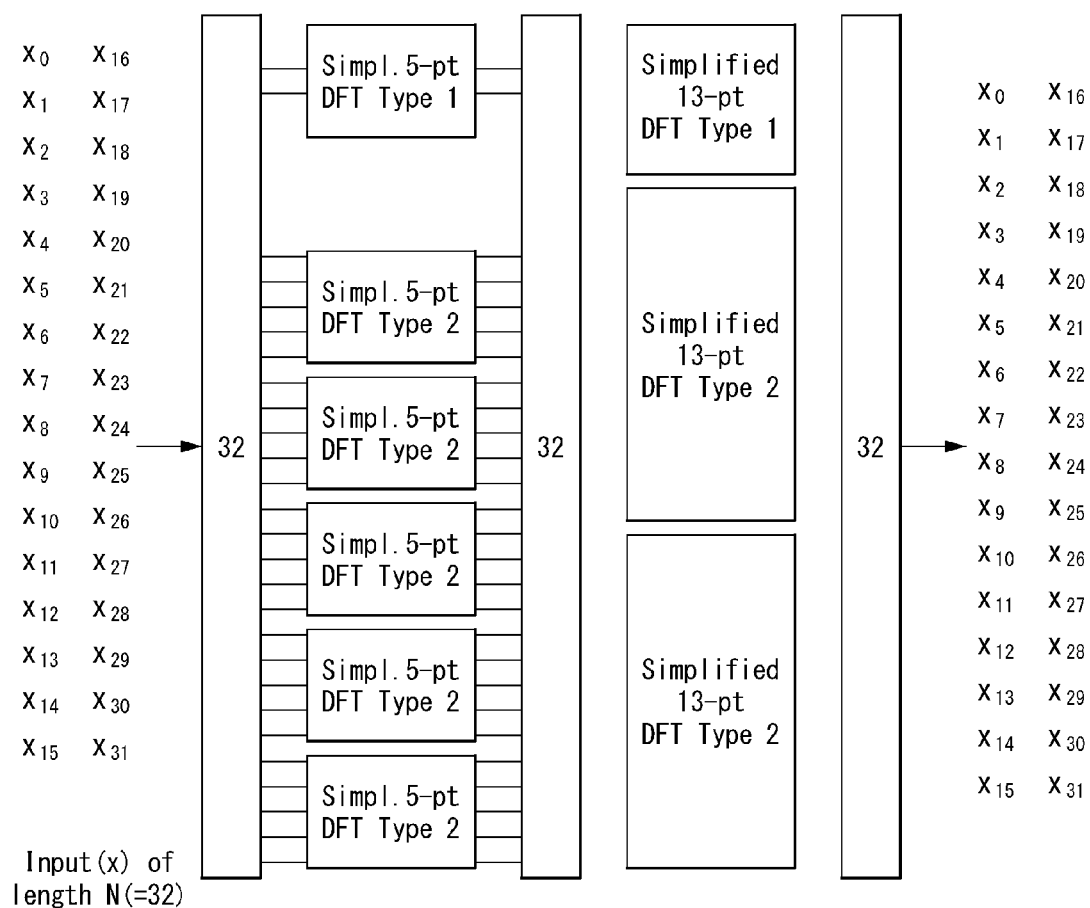

[FIG. 29]
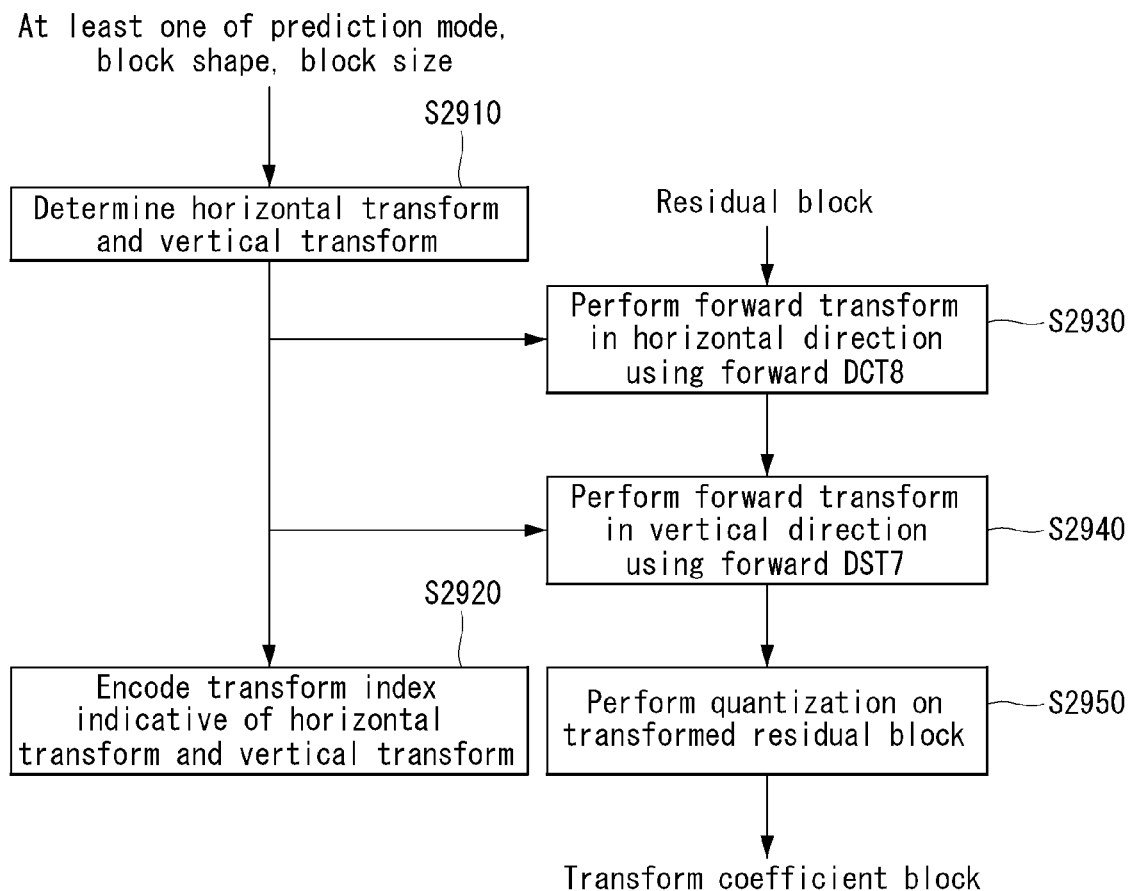

[FIG. 30]
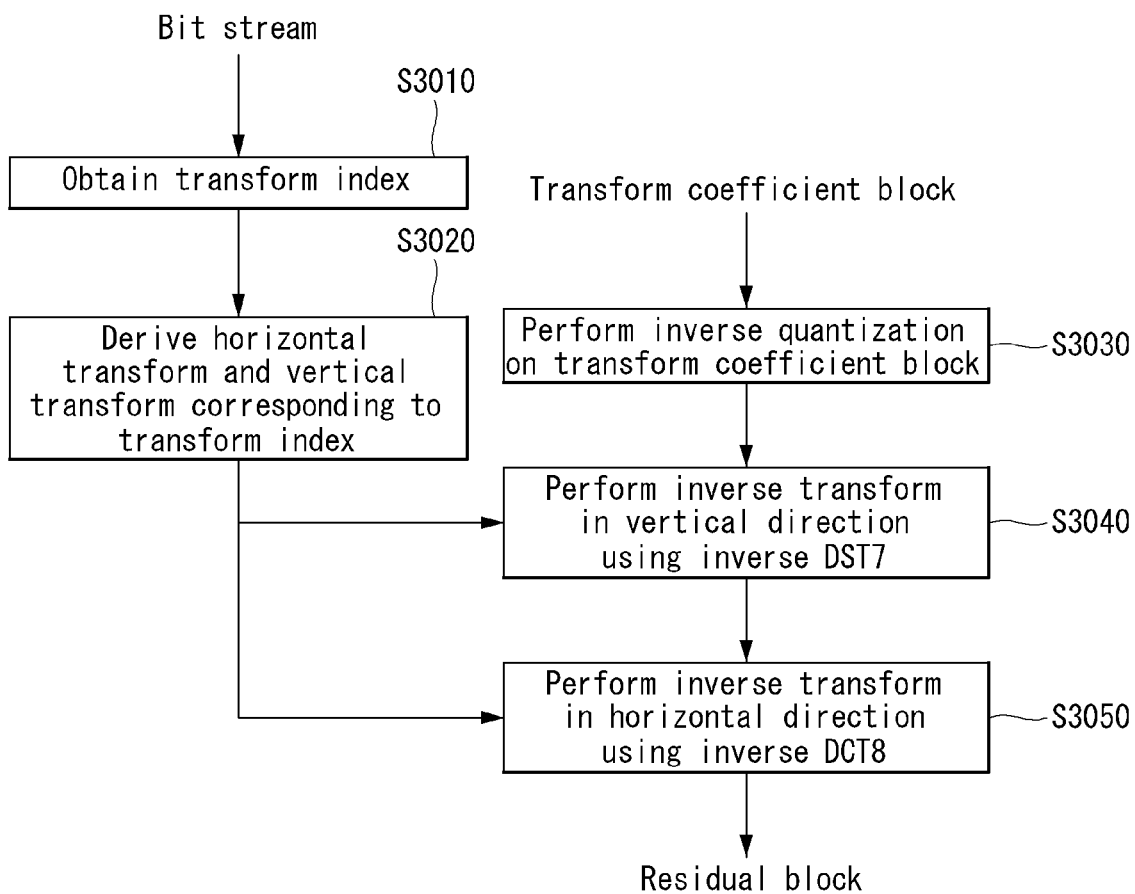

[FIG. 31]
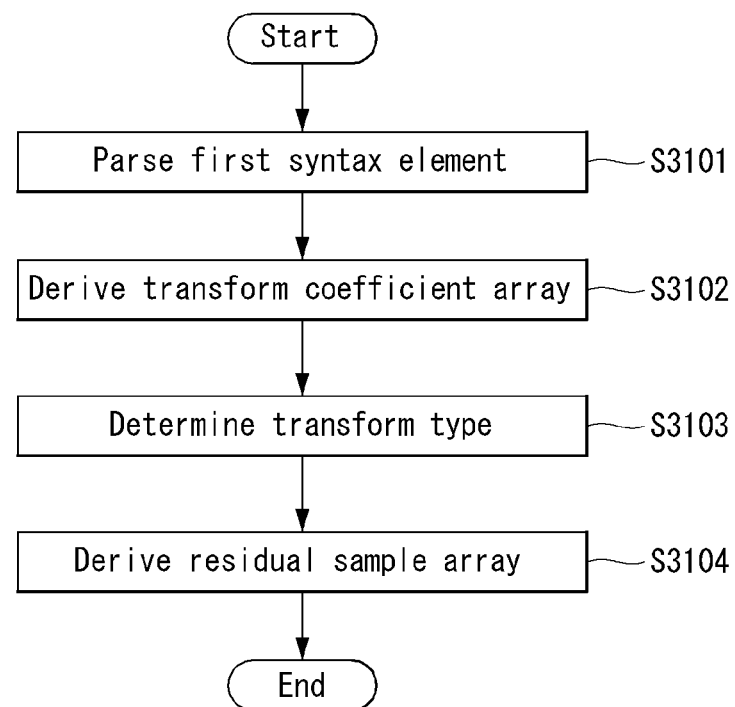

[FIG. 32]
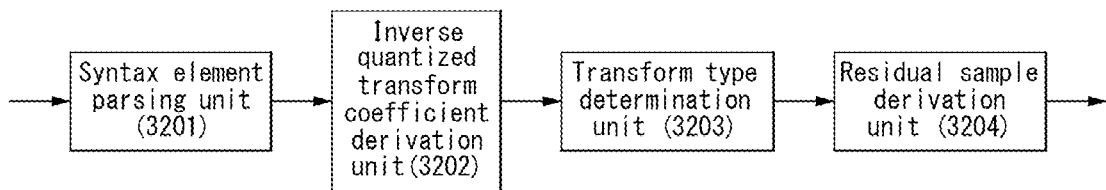

[FIG. 33]
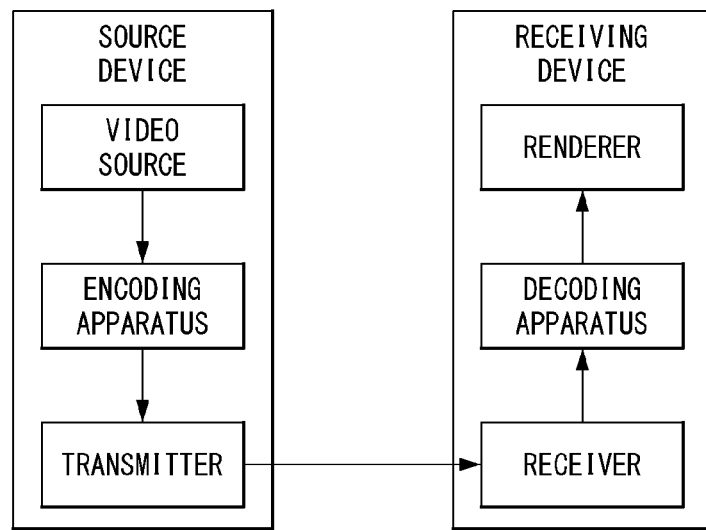

[FIG. 34]
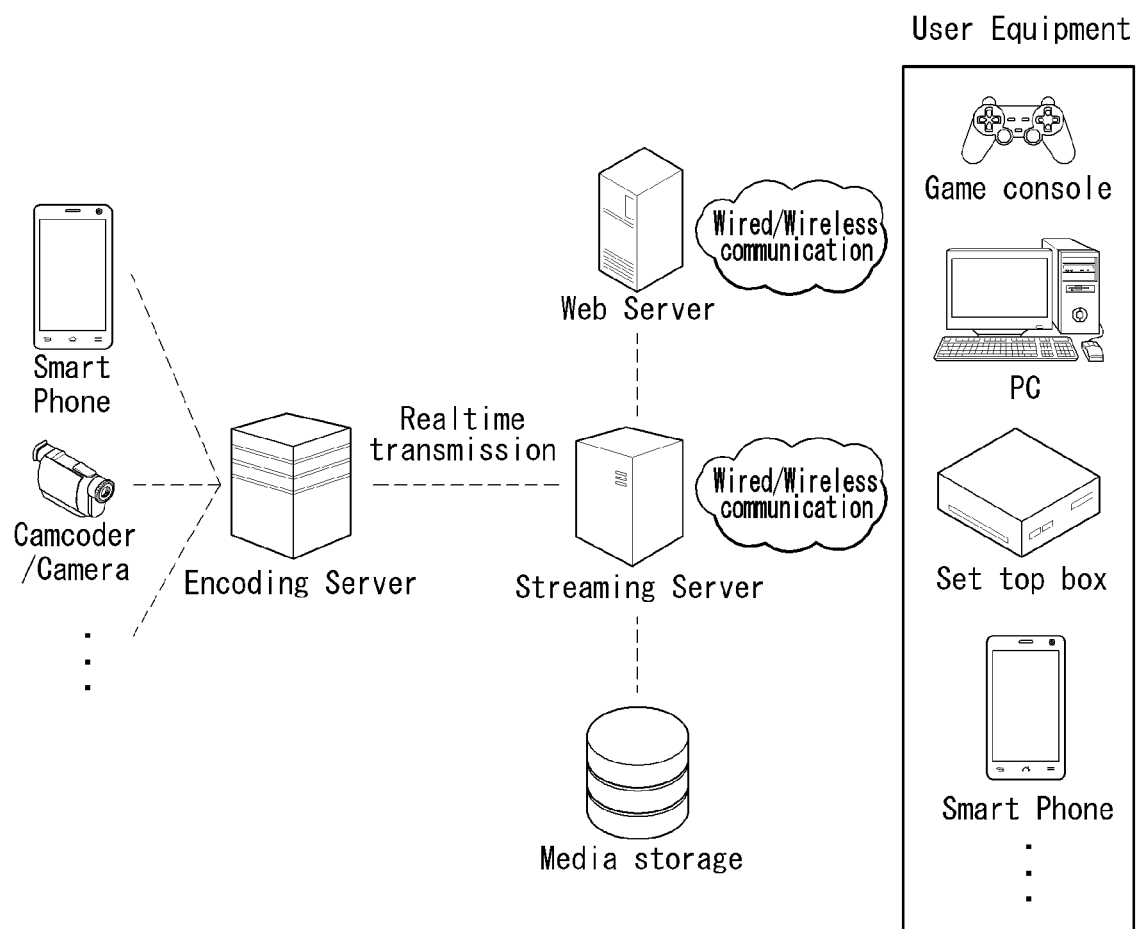

IMAGE ENCODING/DECODING METHOD AND DEVICE THEREFOR

CROSS-REFERENCE TO RELATED APPLICATIONS

This application is the Continuation Application of U.S. patent application Ser. No. 17/716,772, filed which is a Continuation Application of U.S. patent application Ser. No. 17/266,407, filed Feb. 5, 2021, which is National Stage filing under 35 U.S.C. 371 of International Application No. PCT/KR2019/009990, filed on Aug. 8, 2019, which claims the benefit of U.S. Provisional Application No. 62/716,355, filed on Aug. 8, 2018, the contents of which are all hereby incorporated by reference herein in their entirety.

TECHNICAL FIELD

The present disclosure relates to a method and apparatus for encoding/decoding a video and, more particularly, to a technology for performing a transform/inverse transform based on a Multiple Transform Selection (MTS).

BACKGROUND ART

Next-generation video content will have characteristics of a high spatial resolution, a high frame rate, and high dimensionality of scene representation. In order to process such content, technologies, such as memory storage, a memory access rate, and processing power, will be remarkably increased.

Accordingly, it is necessary to design a new coding tool for more efficiently processing next-generation video content. Particularly, it is necessary to design a more efficient transform in terms of coding efficiency and complexity when a transform is applied.

DISCLOSURE

Technical Problem

The present disclosure is intended to propose an operation algorithm having low complexity for a transform kernel for video compression.

The present disclosure is intended to propose a method of designing discrete sine transform-7 (DST7) having low complexity.

The present disclosure is intended to propose a method of designing forward DST7 and inverse DST7 as a discrete Fourier transform (DFT).

The present disclosure is intended to propose a method of implementing DST7 through a one-dimensional DFT or a two-dimensional DFT.

The present disclosure is intended to propose a method of implementing DST7 using only an integer operation by applying various scaling methods.

The present disclosure is intended to propose a method of designing DST7 having a length 8, 16, or 32, through a method of implementing DST7 using a DFT and a method of implementing DST7 using only an integer operation.

The present disclosure is intended to propose an encoder/decoder structure for incorporating a new transform design.

The present disclosure is intended to propose an overall transform process according to an embodiment proposed in the present disclosure.

Technical Solution

In an aspect of the present disclosure, a method of decoding a video signal based on a Multiple Transform Selection (MTS) may include parsing a first syntax element indicating whether the MTS is applied to an inverse transform of a current block, wherein the MTS indicates a transform mode using another transform type other than a predefined default transform type in the current block, deriving an inverse quantized transform coefficient array with the width and height of the current block by performing inverse quantization on the current block, determining a vertical transform type applied to a vertical direction and horizontal transform type applied to a horizontal direction of the current block based on the first syntax element, and deriving a residual sample array with the width and height of the current block by performing an inverse transform on the inverse quantized transform coefficient array using the vertical transform type and the horizontal transform type.

Preferably, the default transform type may be configured as DCT2, and the remaining transform types other than the default transform type may be configured as DST7 and DCT8.

Preferably, if the first syntax element indicates that the MTS is not applied to the inverse transform of the current block, the vertical transform type and the horizontal transform type may be determined as DCT2. If the first syntax element indicates that the MTS is applied to the inverse transform of the current block, each of the vertical transform type and the horizontal transform type may be determined as any one of DST7 and DCT8.

Preferably, the method further includes parsing a second syntax element indicating whether the MTS is available for an intra coding block and a third syntax element indicating whether the MTS is available for an inter coding block. When the second syntax element is 1, the first syntax element may be present in a transform unit syntax for the intra coding block, and when the third syntax element is 1, the first syntax element may be present in a transform unit syntax for the inter coding block.

Preferably, deriving the residual sample array may includes performing a one-dimensional transform process in the vertical direction on each of columns of the inverse quantized transform coefficient array using the vertical transform type, and performing, using the horizontal transform type, a one-dimensional transform process in the horizontal direction on each of rows of an intermediate sample array output by the one-dimensional transform process for each of the columns.

Preferably, performing the one-dimensional transform process in the horizontal direction may further include clipping an intermediate sample value output by the one-dimensional transform process for each of the columns based on a minimum value and maximum value of a predefined coefficient.

In another aspect of the present disclosure, an apparatus for decoding a video signal based on a Multiple Transform Selection (MTS) may include a syntax element parsing unit configured to parse a first syntax element indicating whether the MTS is applied to an inverse transform of a current block, wherein the MTS indicates a transform mode using another transform type other than a predefined default transform type in the current block, an inverse quantized transform coefficient derivation unit configured to derive an inverse quantized transform coefficient array with the width and height of the current block by performing inverse quantization on the current block, a transform type determination unit configured to determine a vertical transform type applied to a vertical direction and horizontal transform type applied to a horizontal direction of the current block based on the first syntax element, and a residual sample derivation unit configured to derive a residual sample array with the width and height of the current block by performing an inverse transform on the inverse quantized transform coefficient array using the vertical transform type and the horizontal transform type.

Preferably, the default transform type may be configured as DCT2, and the remaining transform types other than the default transform type may be configured as DST7 and DCT8.

Preferably, if the first syntax element indicates that the MTS is not applied to the inverse transform of the current block, the vertical transform type and the horizontal transform type may be determined as DCT2. If the first syntax element indicates that the MTS is applied to the inverse transform of the current block, each of the vertical transform type and the horizontal transform type may be determined as any one of DST7 and DCT8.

Preferably, the syntax element parsing unit may be configured to parse a second syntax element indicating whether the MTS is available for an intra coding block and a third syntax element indicating whether the MTS is available for an inter coding block. When the second syntax element is 1, the first syntax element may be present in a transform unit syntax for the intra coding block, and when the third syntax element is 1, the first syntax element may be present in a transform unit syntax for the inter coding block.

Preferably, the residual sample derivation unit may be configured to perform a one-dimensional transform process in the vertical direction on each of columns of the inverse quantized transform coefficient array using the vertical transform type and to perform, using the horizontal transform type, a one-dimensional transform process in the horizontal direction on each of rows of an intermediate sample array output by the one-dimensional transform process for each of the columns.

Preferably, the residual sample derivation unit may be configured to clip an intermediate sample value output by the one-dimensional transform process for each of the columns based on a minimum value and maximum value of a predefined coefficient.

Advantageous Effects

The present disclosure can reduce a memory use and operation complexity by providing the method of designing discrete sine transform-7 (DST7) having low complexity.

Furthermore, the present disclosure can reduce the complexity of DST7 through an FFT algorithm by designing forward DST7 and inverse DST7 as DFTs when encoding a still image or a moving image.

As described above, operation complexity can be reduced and coding efficiency can be improved through the new operation algorithm having low complexity.

DESCRIPTION OF DRAWINGS

FIG. 1 is a block diagram illustrating the configuration of an encoder for encoding a video signal according to an embodiment of the present disclosure.

FIG. 2 is a block diagram illustrating the configuration of a decoder for decoding a video signal according to an embodiment of the present disclosure.

FIG. 3 illustrates embodiments to which the disclosure may be applied, FIG. 3a is a diagram for describing a block split structure based on a quadtree (hereinafter referred to as a "QT"), FIG. 3b is a diagram for describing a block split structure based on a binary tree (hereinafter referred to as a "BT"), FIG. 3c is a diagram for describing a block split structure based on a ternary tree (hereinafter referred to as a "TT"), and FIG. 3d is a diagram for describing a block split structure based on an asymmetric tree (hereinafter referred to as an "AT").

FIG. 4 is an embodiment to which the disclosure is applied and illustrates a schematic block diagram of a transform and quantization unit 120/130 and a dequantization and transform unit 140/150 within an encoder.

FIG. 5 is an embodiment to which the disclosure is applied and illustrates a schematic block diagram of a dequantization and transform unit 220/230 within a decoder.

FIG. 6 is a table showing a transform configuration group to which Multiple Transform Selection (MTS) is applied as an embodiment to which the present disclosure is applied.

FIG. 7 is a flowchart showing an encoding process in which Multiple Transform Selection (MTS) is performed as an embodiment to which the present disclosure is applied.

FIG. 8 is a flowchart showing a decoding process in which Multiple Transform Selection (MTS) is performed as an embodiment to which the present disclosure is applied.

FIG. 9 is a flowchart for describing a process of encoding an MTS flag and an MTS index as an embodiment to which the present disclosure is applied.

FIG. 10 is a flowchart for describing a decoding process in which a horizontal transform or vertical transform is applied to a row or a column based on an MTS flag and an MTS index as an embodiment to which the present disclosure is applied.

FIG. 11 is a flowchart of performing an inverse transform based on a transform related parameter as an embodiment to which the present disclosure is applied.

FIG. 12 is a table showing allocation of a transform set for each intra prediction mode in an NSST as an embodiment to which the present disclosure is applied.

FIG. 13 is a calculation flow diagram for Givens rotation as an embodiment to which the present disclosure is applied.

FIG. 14 illustrates one round configuration in 4×4 NSST constituted by a givens rotation layer and permutations as an embodiment to which the present disclosure is applied.

FIG. 15 is an embodiment to which the present disclosure is applied, and illustrates a flowchart in which forward DST7 having a length 16 is designed using a discrete Fourier transform (DFT).

FIG. 16 is an embodiment to which the present disclosure is applied, and illustrates a flowchart in which inverse DST7 having a length 16 is designed using a discrete Fourier transform (DFT).

FIGS. 17 to 19 are embodiments to which the present disclosure is applied, and illustrate flowcharts in which an xDST7_FFT_B16 function of FIGS. 15 and 16 is applied.

FIG. 20 is an embodiment to which the present disclosure is applied, and illustrates a flowchart in which forward DST7 having a length 32 is designed using a discrete Fourier transform (DFT).

FIG. 21 is an embodiment to which the present disclosure is applied, and illustrates a flowchart in which forward DST7 having a length 32 is designed using a discrete Fourier transform (DFT).

FIGS. 22 to 24 are embodiments to which the present disclosure is applied, and illustrates a flowchart in which the xDST7_FFT_B16 function of FIGS. 15 and 16 is applied.

FIG. 25 is an embodiment to which the present disclosure is applied, and illustrates a flowchart in which forward DST7 having a length 8 is designed using a discrete Fourier transform (DFT).

FIG. 26 is an embodiment to which the present disclosure is applied, and illustrates a flowchart in which inverse DST7 having a length 8 is designed using a discrete Fourier transform (DFT).

FIG. 27 is an embodiment to which the present disclosure is applied, and illustrates a block diagram of 16×16 DST7 to which a 33-point DFT has been applied.

FIG. 28 is an embodiment to which the present disclosure is applied, and illustrates a block diagram of a 32×32 DST7 to which a 65-point DFT has been applied.

FIG. 29 is an embodiment to which the present disclosure is applied, and illustrates an encoding flowchart in which forward discrete sine transform-7 (DST7) and forward discrete cosine transform-8 (DCT8) are performed as discrete Fourier transforms (DFT).

FIG. 30 is an embodiment to which the present disclosure is applied, and illustrates a decoding flowchart in which inverse discrete sine transform-7 (DST7) and inverse discrete cosine transform-8 (DCT8) are performed as discrete Fourier transforms (DFT).

FIG. 31 is a flowchart illustrating a method of decoding a video signal based on a Multiple Transform Selection (MTS) according to an embodiment to which the present disclosure is applied.

FIG. 32 is a diagram illustrating an apparatus for decoding a video signal based on a Multiple Transform Selection (MTS) according to an embodiment to which the present disclosure is applied.

FIG. 33 illustrates a video coding system to which the present disclosure is applied.

FIG. 34 is an embodiment to which the present disclosure is applied and illustrates a structural diagram of a content streaming system.

MODE FOR INVENTION

Hereinafter, a configuration and operation of an embodiment of the present disclosure will be described in detail with reference to the accompanying drawings, a configuration and operation of the present disclosure described with reference to the drawings are described as an embodiment, and the scope, a core configuration, and operation of the present disclosure are not limited thereto.

Further, terms used in the present disclosure are selected from currently widely used general terms, but in a specific case, randomly selected terms by an applicant are used. In such a case, in a detailed description of a corresponding portion, because a meaning thereof is clearly described, the terms should not be simply construed with only a name of terms used in a description of the present disclosure and a meaning of the corresponding term should be comprehended and construed.

Further, when there is a general term selected for describing the disclosure or another term having a similar meaning, terms used in the present disclosure may be replaced for more appropriate interpretation. For example, in each coding process, a signal, data, a sample, a picture, a frame, and a block may be appropriately replaced and construed. Further, in each coding process, partitioning, decomposition, splitting, and division may be appropriately replaced and construed.

In the present disclosure, Multiple Transform Selection (MTS) may refer to a method for performing transform using at least two transform types. This may also be expressed as an Adaptive Multiple Transform (AMT) or Explicit Multiple Transform (EMT), and likewise, mts_idx may also be expressed as AMT_idx, EMT_idx, tu_mts_idx, AMT_TU_idx, EMT_TU_idx, transform index, or transform combination index and the present disclosure is not limited to the expressions.

FIG. 1 is a schematic block diagram of an encoder in which encoding of a video signal is performed as an embodiment to which the present disclosure is applied.

Referring to FIG. 1, the encoder 100 may be configured to include an image division unit 110, a transform unit 120, a quantization unit 130, a dequantization unit 140, an inverse transform unit 150, a filtering unit 160, a decoded picture buffer (DPB) 170, an inter-prediction unit 180, an intra-prediction unit 185, and an entropy encoding unit 190.

The image division unit 110 may divide an input image (or picture or frame) input into the encoder 100 into one or more processing units. For example, the processing unit may be a Coding Tree Unit (CTU), a Coding Unit (CU), a Prediction Unit (PU), or a Transform Unit (TU).

However, the terms are only used for the convenience of description of the present disclosure and the present disclosure is not limited to the definition of the terms. In addition, in the present disclosure, for the convenience of the description, the term coding unit is used as a unit used in encoding or decoding a video signal, but the present disclosure is not limited thereto and may be appropriately interpreted according to the present disclosure.

The encoder 100 subtracts a prediction signal (or a prediction block) output from the inter-prediction unit 180 or the intra-prediction unit 185 from the input image signal to generate a residual signal (or a residual block) and the generated residual signal is transmitted to the transform unit 120.

The transform unit 120 may generate a transform coefficient by applying a transform technique to the residual signal. A transform process may be applied to a quadtree structure square block and a block (square or rectangle) divided by a binary tree structure, a ternary tree structure, or an asymmetric tree structure.

The transform unit 120 may perform a transform based on a plurality of transforms (or transform combinations), and the transform scheme may be referred to as Multiple Transform Selection (MTS). The MTS may also be referred to as an Adaptive Multiple Transform (AMT) or an Enhanced Multiple Transform (EMT).

The MTS (or AMT or EMT) may refer to a transform scheme performed based on a transform (or transform combinations) adaptively selected from the plurality of transforms (or transform combinations).

The plurality of transforms (or transform combinations) may include transforms (or transform combinations) described with reference to FIG. 6 of the present disclosure. In the present disclosure, the transform or the transform type may be written like DCT-Type 2, DCT-II, DCT-2, DCT2, for example.

The transform unit 120 may perform the following embodiments.

The present disclosure provides a method of designing forward DST7 and inverse DST7 as discrete Fourier transforms (DFT).

The transform unit 120 may implement DST7 through a one-dimensional DFT or a two-dimensional DFT.

Furthermore, the transform unit 120 may implement DST7 using only an integer operation by applying various scaling methods.

Furthermore, the transform unit 120 may design DST7 having a length 8, 16, or 32 through a method of implementing DST7 using a DFT and a method of implementing DST7 using only an integer operation.

Detailed embodiments thereof will be described in more detail in the present disclosure.

The quantization unit 130 may quantize the transform coefficient and transmits the quantized transform coefficient to the entropy encoding unit 190 and the entropy encoding unit 190 may entropy-code a quantized signal and output the entropy-coded quantized signal as a bit stream.

Although the transform unit 120 and the quantization unit 130 are described as separate functional units, the present disclosure is not limited thereto and may be combined into one functional unit. The dequantization unit 140 and the inverse transform unit 150 may also be similarly combined into one functional unit.

A quantized signal output from the quantization unit 130 may be used for generating the prediction signal. For example, inverse quantization and inverse transform are applied to the quantized signal through the dequantization unit 140 and the inverse transform unit 1850 in a loop to reconstruct the residual signal. The reconstructed residual signal is added to the prediction signal output from the inter-prediction unit 180 or the intra-prediction unit 185 to generate a reconstructed signal.

Meanwhile, deterioration in which a block boundary is shown may occur due to a quantization error which occurs during such a compression process. Such a phenomenon is referred to as blocking artifacts and this is one of key elements for evaluating an image quality. A filtering process may be performed in order to reduce the deterioration. Blocking deterioration is removed and an error for the current picture is reduced through the filtering process to enhance the image quality.

The filtering unit 160 applies filtering to the reconstructed signal and outputs the applied reconstructed signal to a reproduction device or transmits the output reconstructed signal to the decoded picture buffer 170. The inter-prediction unit 170 may use the filtered signal transmitted to the decoded picture buffer 180 as the reference picture. As such, the filtered picture is used as the reference picture in the inter prediction mode to enhance the image quality and the encoding efficiency.

The decoded picture buffer 170 may store the filtered picture in order to use the filtered picture as the reference picture in the inter-prediction unit 180.

The inter-prediction unit 180 performs a temporal prediction and/or spatial prediction in order to remove temporal redundancy and/or spatial redundancy by referring to the reconstructed picture. In this case, since the reference picture used for prediction is a transformed signal that is quantized and inverse quantized in units of the block at the time of encoding/decoding in the previous time, blocking artifacts or ringing artifacts may exist.

Accordingly, the inter-prediction unit 180 may interpolate a signal between pixels in units of a sub-pixel by applying a low-pass filter in order to solve performance degradation due to discontinuity or quantization of such a signal. In this case, the sub-pixel means a virtual pixel generated by applying an interpolation filter and an integer pixel means an actual pixel which exists in the reconstructed picture. As an interpolation method, linear interpolation, bi-linear interpolation, wiener filter, and the like may be adopted.

An interpolation filter is applied to the reconstructed picture to enhance precision of prediction. For example, the inter-prediction unit 180 applies the interpolation filter to the integer pixel to generate an interpolated pixel and the prediction may be performed by using an interpolated block constituted by the interpolated pixels as the prediction block.

Meanwhile, the intra-prediction unit 185 may predict the current block by referring to samples in the vicinity of a block which is to be subjected to current encoding. The intra-prediction unit 185 may perform the following process in order to perform the intra prediction. First, a reference sample may be prepared, which is required for generating the prediction signal. In addition, the prediction signal may be generated by using the prepared reference sample. Thereafter, the prediction mode is encoded. In this case, the reference sample may be prepared through reference sample padding and/or reference sample filtering. Since the reference sample is subjected to prediction and reconstruction processes, a quantization error may exist. Accordingly, a reference sample filtering process may be performed with respect to each prediction mode used for the intra prediction in order to reduce such an error.

The prediction signal generated through the inter-prediction unit 180 or the intra-prediction unit 185 may be used for generating the reconstructed signal or used for generating the residual signal.

FIG. 2 is a schematic block diagram of a decoder in which decoding of a video signal is performed as an embodiment to which the present disclosure is applied.

Referring to FIG. 2, the decoder 200 may be configured to include a parsing unit (not illustrated), an entropy decoding unit 210, a dequantization unit 220, an inverse transform unit 230, a filtering unit 240, a decoded picture buffer (DPB) unit 250, an inter-prediction unit 260, and an intra-prediction unit 265.

In addition, a reconstructed video signal output through the decoder 200 may be reproduced through a reproduction device.

The decoder 200 may receive the signal output from the encoder 100 of FIG. 1 and the received signal may be entropy-decoded through the entropy decoding unit 210.

The dequantization unit 220 obtains the transform coefficient from an entropy-decoded signal by using quantization step size information.

The inverse transform unit 230 inversely transforms the transform coefficient to obtain the residual signal.

In this case, the present disclosure provides a method for configuring a transform combination for each transform configuration group divided by at least one of a prediction mode, a block size or a block shape and the inverse transform unit 230 may perform inverse transform based on the transform combination configured by the present disclosure. Further, the embodiments described in the present disclosure may be applied.

The inverse transform unit 230 may perform the following embodiments.

The present disclosure provides a method of designing forward DST7 and inverse DST7 as discrete Fourier transforms (DFT).

The inverse transform unit 230 may implement DST7 through a one-dimensional DFT or a two-dimensional DFT.

Furthermore, the inverse transform unit 230 may implement DST7 using only an integer operation by applying various scaling methods.

Furthermore, the inverse transform unit 230 may design DST7 having a length 8, 16, or 32 through a method of implementing DST7 using a DFT and a method of implementing DST7 using only an integer operation.

In an embodiment, the inverse transform unit 230 may derive a transform combination corresponding to a transform index, and may perform an inverse transform on a current block in a vertical or horizontal direction using DST7 or DCT8. In this case, the transform combination may be composed of a horizontal transform and a vertical transform, and the horizontal transform and the vertical transform may correspond to any one of the DST7 or the DCT8.

In an embodiment, when a 33-point discrete Fourier transform (DFT) is applied to the DST7, the step of dividing one row or one column of the DST7 into two partial vector signals; and the step of applying 11-point DFT type 1 or 11-point DFT type 2 to the two partial vector signals may be included.

In an embodiment, when one row or one column of the DST7 is represented as src[0 ... 15], the two partial vector signals may be divided into src[0 ... 4] and src[5 ... 15].

In an embodiment, when a 65-point discrete Fourier transform (DFT) is applied to the DST7, the step of dividing one row or one column of the DST7 into three partial vector signals; and the step of applying 13-point DFT type 1 or 13-point DFT type 2 to the three partial vector signals may be included.

In an embodiment, when one row or one column of the DST7 is represented as src[0 ... 31], the three partial vector signals may be divided into src[0 ... 5], src[6 ... 18] and src[19 ... 31].

In an embodiment, among the three partial vector signals, the 13-point DFT type 1 may be applied to the src[0 ... 5], and the 13-point DFT type 2 may be applied to the src[6 ... 18] and src[19 ... 31].

Meanwhile, the inverse transform unit 230 may perform an inverse primary transform on a transform coefficient block in a vertical direction using a vertical primary transform, and may perform an inverse primary transform on the transform coefficient block in a horizontal direction using a horizontal primary transform.

Furthermore, in the present embodiment, after a vertical transform, a horizontal transform is applied, but the present disclosure is not limited thereto. That is, after a horizontal transform is applied, a vertical transform may be applied.

In an embodiment, a combination of the horizontal transform and the vertical transform may include at least one of embodiments of FIG. 6.

Although the dequantization unit 220 and the inverse transform unit 230 are described as separate functional units, the present disclosure is not limited thereto and may be combined into one functional unit.

The obtained residual signal is added to the prediction signal output from the inter-prediction unit 260 or the intra-prediction unit 265 to generate the reconstructed signal.

The filtering unit 240 applies filtering to the reconstructed signal and outputs the applied reconstructed signal to a generation device or transmits the output reconstructed signal to the decoded picture buffer unit 250. The inter-prediction unit 250 may use the filtered signal transmitted to the decoded picture buffer unit 260 as the reference picture.

In the present disclosure, the embodiments described in the transform unit 120 and the respective functional units of the encoder 100 may be equally applied to the inverse transform unit 230 and the corresponding functional units of the decoder, respectively.

FIG. 3 illustrates embodiments to which the disclosure may be applied, FIG. 3a is a diagram for describing a block split structure based on a quadtree (hereinafter referred to as a "QT"), FIG. 3b is a diagram for describing a block split structure based on a binary tree (hereinafter referred to as a "BT"), FIG. 3c is a diagram for describing a block split structure based on a ternary tree (hereinafter referred to as a "TT"), and FIG. 3d is a diagram for describing a block split structure based on an asymmetric tree (hereinafter referred to as an "AT").

In video coding, one block may be split based on a quadtree (QT). Furthermore, one subblock split by the QT may be further split recursively using the QT. A leaf block that is no longer QT split may be split using at least one method of a binary tree (BT), a ternary tree (TT) or an asymmetric tree (AT). The BT may have two types of splits of a horizontal BT (2N×N, 2N×N) and a vertical BT (N×2N, N×2N). The TT may have two types of splits of a horizontal TT (2N×1/2N, 2N×N, 2N×1/2N) and a vertical TT (½N×2N, N×2N, ½N×2N). The AT may have four types of splits of a horizontal-up AT (2N×1/2N, 2N×3/2N), a horizontal-down AT (2N×3/2N, 2N×1/2N), a vertical-left AT (½N×2N, 3/2N×2N), and a vertical-right AT (3/2N×2N, ½N×2N). Each BT, TT, or AT may be further split recursively using the BT, TT, or AT.

FIG. 3a shows an example of a QT split. A block A may be split into four subblocks A0, A1, A2, and A3 by a QT. The subblock A1 may be split into four subblocks B0, B1, B2, and B3 by a QT.

FIG. 3b shows an example of a BT split. A block B3 that is no longer split by a QT may be split into vertical BTs C0 and C1 or horizontal BTs D0 and D1. As in the block C0, each subblock may be further split recursively like the form of horizontal BTs E0 and E1 or vertical BTs F0 and F1.

FIG. 3c shows an example of a TT split. A block B3 that is no longer split by a QT may be split into vertical TTs C0, C1, and C2 or horizontal TTs D0, D1, and D2. As in the block C1, each subblock may be further split recursively like the form of horizontal TTs E0, E1, and E2 or vertical TTs F0, F1, and F2.

FIG. 3d shows an example of an AT split. A block B3 that is no longer split by a QT may be split into vertical ATs C0 and C1 or horizontal ATs D0 and D1. As in the block C1, each subblock may be further split recursively like the form of horizontal ATs E0 and E1 or vertical TTs F0 and F1.

Meanwhile, BT, TT, and AT splits may be split together. For example, a subblock split by a BT may be split by a TT or AT. Furthermore, a subblock split by a TT may be split by a BT or AT. A subblock split by an AT may be split by a BT or TT. For example, after a horizontal BT split, each subblock may be split into vertical BTs or after a vertical BT split, each subblock may be split into horizontal BTs. The two types of split methods are different in a split sequence, but have the same finally split shape.

Furthermore, if a block is split, the sequence that the block is searched may be defined in various ways. In general, the search is performed from left to right or from top to bottom. To search a block may mean a sequence for determining whether to split an additional block of each split subblock or may mean a coding sequence of each subblock if a block is no longer split or may mean a search sequence when information of another neighbor block is referred in a subblock.

FIGS. 4 and 5 are embodiments to which the disclosure is applied. FIG. 4 illustrates a schematic block diagram of a transform and quantization unit 120/130 and a dequantization and transform unit 140/150 within the encoder, and FIG. 5 illustrates a schematic block diagram of a dequantization and transform unit 220/230 within the decoder.

Referring to FIG. 4, the transform and quantization unit 120/130 may include a primary transform unit 121, a secondary transform unit 122 and the quantization unit 130. The dequantization and transform unit 140/150 may include the dequantization unit 140, an inverse secondary transform unit 151 and an inverse primary transform unit 152.

Referring to FIG. 5, the dequantization and transform unit 220/230 may include the dequantization unit 220, an inverse secondary transform unit 231 and an inverse primary transform unit 232.

In the disclosure, when a transform is performed, the transform may be performed through a plurality of steps. For example, as in FIG. 4, two steps of a primary transform and a secondary transform may be applied or more transform steps may be used according to an algorithm. In this case, the primary transform may be referred to as a core transform.

The primary transform unit 121 may apply a primary transform on a residual signal. In this case, the primary transform may be pre-defined in a table form in the encoder and/or the decoder.

A discrete cosine transform type 2 (hereinafter "DCT2") may be applied to the primary transform.

Alternatively, a discrete sine transform-type 7 (hereinafter called "DST7") may be applied to a specific case. For example, in the intra prediction mode, the DST7 may be applied to a 4×4 block.

Further, the primary transform may adopt combinations of various transforms DST 7, DCT 8, DST 1, and DCT 5 of the Multiple Transform Selection (MTS). For example, FIG. 6 may be adopted.

The secondary transform unit 122 may apply the secondary transform to a primary transformed signal and here, the secondary transform may be predefined in the table in the encoder and/or the decoder.

As an embodiment, the secondary transform may conditionally adopt a non-separable secondary transform (hereinafter, referred to as 'NSST'). For example, the NSST may be applied only to the intra prediction block and may have a transform set applicable to each prediction mode group.

In this case, the prediction mode group may be configured based on symmetry with respect to a prediction direction. For example, since prediction mode 52 and prediction mode 16 are symmetrical based on prediction mode 34 (diagonal direction), the same transform set may be applied by forming one group. In this case, when the transform for prediction mode 52 is applied, input data is transposed and then applied because prediction mode 52 has the same transform set as prediction mode 16.

Meanwhile, since the symmetry for the direction does not exist in the case of a planar mode and a DC mode, each mode has a different transform set and the corresponding transform set may include two transforms. In respect to the remaining direction modes, each transform set may include three transforms.

As another embodiment, the secondary transform may adopt combinations of various transforms DST 7, DCT 8, DST 1, and DCT 5 of the Multiple Transform Selection (MTS). For example, FIG. 6 may be adopted.

In another embodiment, DST7 may be applied as a primary transform.

In another embodiment, DCT8 may be applied as a primary transform.

As another embodiment, the NSST may not be applied to the entire primary transformed block but may be applied only to a top-left 8×8 area. For example, when the block size is 8×8 or more, 8×8 NSST is applied and when the block size is less than 8×8, 4×4 NSST is applied and in this case, the block is divided into 4×4 blocks and then, the 4×4 NSST is applied to each of the divided blocks.

As another embodiment, even in the case of 4×N/N×4 (N>=16), the 4×4 NSST may be applied.

The NSST, 4×4 NSST and 8×8 NSST are more specifically described through FIGS. 12 to 15 and other embodiments within the disclosure.

The quantization unit 130 may perform quantization for the secondary transformed signal.

The dequantization and inverse transform units 140 and 150 perform the above-described process in reverse, and a redundant description thereof will be omitted.

FIG. 5 is a schematic block diagram of a dequantization unit 220 and an inverse transform unit 230 in a decoder.

Referring to FIG. 5 above, the dequantization and inverse transform units 220 and 230 may include a dequantization unit 220, an inverse secondary transform unit 231, and an inverse primary transform unit 232.

The dequantization unit 220 obtains the transform coefficient from an entropy-decoded signal by using quantization step size information.

The inverse secondary transform unit 231 performs an inverse secondary transform for the transform coefficients. In this case, the inverse secondary transform represents an inverse transform of the secondary transform described with reference to FIG. 4 above.

As another embodiment, the secondary transform may adopt combinations of various transforms DST 7, DCT 8, DST 1, and DCT 5 of the Multiple Transform Selection (MTS). For example, FIG. 6 may be adopted.

The inverse primary transform unit 232 performs an inverse primary transform for the inverse secondary transformed signal (or block) and obtains the residual signal. In this case, the inverse primary transform represents the inverse transform of the primary transform described with reference to FIG. 4 above.

As an embodiment, the primary transform may adopt combinations of various transforms DST 7, DCT 8, DST 1, and DCT 5 of the Multiple Transform Selection (MTS). For example, FIG. 6 may be adopted.

As an embodiment of the present disclosure, the DST 7 may be applied to the primary transform.

As an embodiment of the present disclosure, the DCT 8 may be applied to the primary transform.

The present disclosure may provide a method for configuring a transform combination for each transform configuration group divided by at least one of a prediction mode, a block size or a block shape and the inverse primary transform unit 232 may perform the inverse transform based on the transform combination configured by the present disclosure. Further, the embodiments described in the present disclosure may be applied.

FIG. 6 is a table showing a transform configuration group to which Multiple Transform Selection (MTS) is applied as an embodiment to which the present disclosure is applied.

Transform configuration group to which Multiple Transform Selection (MTS) is applied In the present disclosure, a j-th transform combination candidate for transform configuration group $G_i$ is represented by a pair shown in Equation 1 below.

$$(H(G_i,j), V(G_i,j)) \qquad \text{[Equation 1]}$$

wherein $H(G_i, j)$ indicates the horizontal transform for the j-th candidate, and $V(G_i, j)$ indicates the vertical transform for the j-th candidate. For example, in FIG. 6, $H(G_3, 2)$=DST 7, $V(G_3, 2)$=DCT 8 may be represented. Depending on a context, a value assigned to $H(G_i, j)$ or $V(G_i, j)$ may be a nominal value to distinguish transformations, as in the example above or may be an index value indicating the transform or may be a 2 dimensional (D) matrix for the transform.

Further, in the present disclosure, a 2D matrix value for DCT and DST may be represented as shown in Equation 2 and 3 below.

$$\text{DCT type 2: } C_N^{II}, \text{ DCT type 8: } C_N^{VIII} \quad \text{[Equation 2]}$$

$$\text{DST type 7: } S_N^{VII}, \text{ DST type 4: } S_N^{IV} \quad \text{[Equation 3]}$$

wherein whether the transform is DST or DCT is represented by S or C, a type number is represented as a superposition in the form of a Roman number, and N of a lower subscript indicates that the transform is an N×N transform. Further, in the 2D matrix such as the $C_N^{II}$ and $S_N^{IV}$, it is assumed that column vectors form a transform basis.

Referring to FIG. 6, the transform configuration groups may be determined based on the prediction mode and the number of groups may be a total of six groups G0 to G5. In addition, G0 to G4 correspond to a case where intra prediction is applied, and G5 represents transform combinations (or transform sets and transform combination sets) applied to the residual block generated by the inter prediction.

One transform combination may include a horizontal transform (or row transform) applied to rows of a corresponding 2D block and a vertical transform (or column transform) applied to columns.

In this case, each of all of the transform configuration groups may have four transform combination candidates. The four transform combinations may be selected or determined through transform combination indexes of 0 to 3 and the transform combination index may be encoded and transmitted from the encoder to the decoder.

As an embodiment, the residual data (or residual signal) obtained through the intra prediction may have different statistical characteristics according to the intra prediction mode. Therefore, as illustrated in FIG. 6 above, transforms other than a general cosine transform (e.g., DCT2) may be applied to each intra prediction mode.

Referring to FIG. 6 above, a case of using 35 intra prediction modes and a case of using 67 intra prediction modes are illustrated. A plurality of transform combinations may be applied to each transform configuration group divided in each intra prediction mode column. For example, the plurality of transform combinations may include four (row direction transforms and column direction transforms) combinations. As a specific example, DST-7 and DST-5 may be applied in a row (horizontal) direction and a column (vertical) direction in group 0, and as a result, a total of four combinations are available.

Since a total of four transform kernel combinations may be applied to each intra prediction mode, a transform combination index for selecting one of the transform kernel combinations may be transmitted every transform unit. In the present disclosure, the transform combination index may be called MTS index and expressed as mts_idx.

Further, in addition to the transform kernels presented in FIG. 6 above, a case where DCT2 is optimal for both the row direction and the column direction due to characteristics of the residual signal may occur. Accordingly, the MTS flag is defined for each coding unit to adaptively perform the transform. In this case, when the MTS flag is 0, DCT2 may be applied to both the row direction and the column direction and when the MTS flag is 1, one of four combinations may be selected or determined through the MTS index.

As an embodiment, when the MTS flag is 1, if the number of non-zero transform coefficients for one transform unit is not greater than a threshold, the DST-7 may be applied to both the row direction and the column direction without applying the transform kernels of FIG. 6 above. For example, the threshold may be configured to 2, which may be configured differently based on the block size or the size of the transform unit. This is also applicable to other embodiments in the present disclosure.

As an embodiment, if the number of non-zero transform coefficients is not greater than the threshold by first parsing the transform coefficient values, an additional information transmission amount may be reduced by applying the DST-7 without parsing the MTS index.

As an embodiment, when the MTS flag is 1, if the number of non-zero transform coefficients is greater than the threshold for one transform unit, the MTS index may be parsed and the horizontal transform and the vertical transform may be determined based on the MTS index.

As an embodiment, the MTS may be applied only when both a width and a height of the transform unit are equal to or smaller than 32.

As an embodiment, FIG. 6 above may be preconfigured through off-line training.

As an embodiment, the MTS index may be defined as one index which may simultaneously indicate the horizontal transform and the vertical transform. Alternatively, the MTS index may separately define a horizontal transform index and a vertical transform index.

In an embodiment, the MTS flag or the MTS index may be defined in at least one level of a sequence, a picture, a slice, a block, a coding unit, a transform unit or a prediction unit. For example, the MTS flag or the MTS index may be defined in at least one level of a coding unit or a transform unit.

FIG. 7 is a flowchart showing an encoding process in which Multiple Transform Selection (MTS) is performed as an embodiment to which the present disclosure is applied.

In the present disclosure, an embodiment in which transforms are a separately applied to the horizontal direction and the vertical direction is basically described, but the transform combination may be constituted even by non-separable transforms.

Alternatively, the transform combination may be configured by a mixture of separable transforms and non-separable transforms. In this case, when the non-separable transform is used, row/column transform selection or horizontal/vertical direction selection may not be required and only when the separable transform is selected, the transform combinations of FIG. 6 above may be used.

Further, schemes proposed by the present disclosure may be applied regardless of the primary transform or the secondary transform. That is, there is no limit that the schemes should be applied only to any one of both the primary transform and the secondary transform and the schemes may be applied to both the primary transform and the secondary transform. In this case, the primary transform may mean a transform for transforming the residual block first and the secondary transform may mean a transform for applying the transform to the block generated as a result of the primary transform.

First, the encoder may determine the transform configuration group corresponding to the current block (S710). In this case, the transform configuration group may mean the transform configuration group of FIG. 6 above and the present disclosure is not limited thereto and the transform configuration group may include other transform combinations.

The encoder may perform a transform for candidate transform combinations available in the transform configuration group (S720).

As a result of performing the transform, the encoder may determine or select a transform combination having a smallest rate distortion (RD) cost (S730).

The encoder may encode the transform combination index corresponding to the selected transform combination (S740).

FIG. 8 is a flowchart showing a decoding process in which Multiple Transform Selection (MTS) is performed as an embodiment to which the present disclosure is applied.

First, the decoder may determine the transform configuration group for the current block (S810).

The decoder may parse (or obtain) the transform combination index from the video signal and here, the transform combination index may correspond to any one of the plurality of transform combinations in the transform configuration group (S820). For example, the transform configuration group may include Discrete Sine Transform type (DST) 7 and Discrete Cosine Transform type (DST) 8. The transform combination index may be referred to as the MTS index.

As an embodiment, the transform configuration group may be configured based on at least one of the prediction mode, the block size, or the block shape of the current block.

The decoder may derive the transform combination corresponding to the transform combination index (S830). In this case, the transform combination may include the horizontal transform and the vertical transform, and may include at least one of the DST-7 or the DCT-8.

Further, the transform combination may mean the transform combination described with reference to FIG. 6 above, but the present disclosure is not limited thereto. That is, the transform combination may be configured by other transform combinations depending on other embodiments in the present disclosure.

The decoder may perform the inverse transform for the current block based on the transform combination (S840). When the transform combination includes the row (horizontal) transform and the column (vertical) transform, the column (vertical) transform may be applied after applying the row (horizontal) transform first. However, the present disclosure is not limited thereto and the transform order may be reversed or when the transform combination includes the non-separable transforms, the non-separable transform may be immediately applied.

As an embodiment, when the vertical transform or the horizontal transform is the DST-7 or the DCT-8, the inverse transform of the DST-7 or the inverse transform of the DCT-8 may be applied to each column and then applied to each row.

As an embodiment, in respect to the vertical transform or the horizontal transform, different transform may be applied to each row and/or to each column.

As an embodiment, the transform combination index may be obtained based on the MTS flag indicating whether the MTS is performed. That is, the transform combination index may be obtained when the MTS is performed according to the MTS flag.

As an embodiment, the decoder may check whether the number of non-zero transform coefficients is greater than the threshold. In this case, the transform combination index may be obtained when the number of non-zero transform coefficients is greater than the threshold.

As an embodiment, the MTS flag or the MTS index may be defined in at least one level of a sequence, a picture, a slice, a block, a coding unit, a transform unit, or a prediction unit.

As an embodiment, the inverse transform may be applied only when both the width and the height of the transform unit are equal to or smaller than 32.

On the other hand, as another embodiment, a process of determining the transform configuration group and a process of parsing the transform combination index may be performed at the same time. Alternatively, step S810 above may be preconfigured and omitted in the encoder and/or the decoder.

FIG. 9 is a flowchart for describing a process of encoding an MTS flag and an MTS index as an embodiment to which the present disclosure is applied.

The encoder may determine whether the Multiple Transform Selection (MTS) is applied to the current block (S910).

When the Multiple Transform Selection (MTS) is applied, the encoder may encode MTS flag=1 (S920).

In addition, the encoder may determine the MTS index based on at least one of the prediction mode, the horizontal transform, and the vertical transform of the current block (S930). In this case, the MTS index may mean an index indicating any one of the plurality of transform combinations for each intra prediction mode and the MTS index may be transmitted for each transform unit.

When the MTS index is determined, the encoder may encode the MTS index (S940).

On the other hand, when the Multiple Transform Selection (MTS) is not applied, the encoder may encode MTS flag=0 (S950).

FIG. 10 is a flowchart for describing a decoding process in which a horizontal transform or vertical transform is applied to a row or a column based on an MTS flag and an MTS index as an embodiment to which the present disclosure is applied.

The decoder may parse the MTS flag from the bit stream (S1010). In this case, the MTS flag may indicate whether the Multiple Transform Selection (MTS) is applied to the current block.

The decoder may determine whether the Multiple Transform Selection (MTS) is applied to the current block based on the MTS flag (S1020). For example, it may be checked whether the MTS flag is 1.

When the MTS flag is 1, the decoder may check whether the number of non-zero transform coefficients is greater than (or equal to or greater than) the threshold (S1030). For example, the threshold may be configured to 2, which may be configured differently based on the block size or the size of the transform unit.

When the number of non-zero transform coefficients is greater than the threshold, the decoder may parse the MTS index (S1040). In this case, the MTS index may mean any one of the plurality of transform combinations for each intra prediction mode or inter prediction mode and the MTS index may be transmitted for each transform unit. Alternatively, the MTS index may mean an index indicating any one transform combination defined in a preconfigured transform combination table and here, the preconfigured transform combination table may mean FIG. 6 above, but the present disclosure is limited thereto.

The decoder may derive or determine the horizontal transform and the vertical transform based on at least one of the MTS index and the prediction mode (S1050).

Alternatively, the decoder may derive the transform combination corresponding to the MTS index. For example, the decoder may derive or determine the horizontal transform and the vertical transform corresponding to the MTS index.

Meanwhile, when the number of non-zero transform coefficients is not greater than the threshold, the decoder may apply a preconfigured vertical inverse transform for each column (S1060). For example, the vertical inverse transform may be the inverse transform of the DST7.

In addition, the decoder may apply a preconfigured horizontal inverse transform for each row (S1070). For example, the horizontal inverse transform may be the inverse transform of the DST7. That is, when the number of non-zero transform coefficients is not greater than the threshold, a transform kernel preconfigured by the encoder or decoder may be used. For example, the transform kernel (e.g., DCT-2) that is not defined in the transform combination table illustrated in FIG. 6 above, but is widely used may be used.

Meanwhile, when the MTS flag is 0, the decoder may apply the preconfigured vertical inverse transform for each column (S1080). For example, the vertical inverse transform may be the inverse transform of the DCT2.

In addition, the decoder may apply the preconfigured horizontal inverse transform for each row (S1090). For example, the horizontal inverse transform may be the inverse transform of the DCT2. That is, when the MTS flag is 0, the transform kernel preconfigured in the encoder or decoder may be used. For example, the transform kernel that is not defined in the transform combination table illustrated in FIG. 6 above, but is widely used may be used.

FIG. 11 is a flowchart of performing an inverse transform based on a transform related parameter as an embodiment to which the present disclosure is applied.

The decoder to which the present disclosure is applied may obtain sps_mts_intra_enabled_flag or sps_mts_inter_enabled_flag (S1110). In this case, sps_mts_intra_enabled_flag indicates whether tu_mts_flag exists in a residual coding syntax of an intra coding unit. For example, when sps_mts_intra_enabled_flag=0, tu_mts_flag does not exist in the residual coding syntax of the intra coding unit and when sps_mts_intra_enabled_flag=0, tu_mts_flag exists in the residual coding syntax of the intra coding unit. In addition, sps_mts_inter_enabled_flag indicates whether tu_mts_flag exists in the residual coding syntax of the inter coding unit. For example, when sps_mts_inter_enabled_flag=0, tu_mts_flag does not exist in the residual coding syntax of the inter coding unit and when sps_mts_inter_enabled_flag=0, tu_mts_flag exists in the residual coding syntax of the inter coding unit.

The decoder may obtain tu_mts_flag based on sps_mts_intra_enabled_flag or sps_mts_inter_enabled_flag (S1120). For example, when sps_mts_intra_enabled_flag=1 or sps_mts_inter_enabled_flag=1, the decoder may obtain tu_mts_flag. In this case, tu_mts_flag indicates whether multiple transform selection (hereinafter, referred to as "MTS") is applied to a residual sample of a luma transform block. For example, when tu_mts_flag=0, the MTS is not applied to the residual sample of the luma transform block and when tu_mts_flag=1, the MTS is applied to the residual sample of the luma transform block.

As another example, at least one of the embodiments of the present disclosure may be applied to the tu_mts_flag.

The decoder may obtain mts_idx based on tu_mts_flag (S1130). For example, when tu_mts_flag=1, the decoder may obtain mts_idx. In this case, mts_idx indicates which transform kernel is applied to luma residual samples along the horizontal and/or vertical direction of a current transform block.

For example, at least one of the embodiments of the present disclosure may be applied to mts_idx. As a specific example, at least one of the embodiments of FIG. 6 above may be applied.

The decoder may derive the transform kernel corresponding to mts_idx (S1140). For example, the transform kernel corresponding to the mts_idx may be defined by being divided into the horizontal transform and the vertical transform.

As another example, different transform kernels may be applied to the horizontal transform and the vertical transform. However, the present disclosure is not limited thereto, and the same transform kernel may be applied to the horizontal transform and the vertical transform.

As an embodiment, mts_idx may be defined as shown in Table 1 below.

TABLE 1

| mts_idx[x0][y0] | trTypeHor | trTypeVer |
| --- | --- | --- |
| 0 | 0 | 0 |
| 1 | 1 | 1 |
| 2 | 2 | 1 |
| 3 | 1 | 2 |
| 4 | 2 | 2 |

In addition, the decoder may perform the inverse transform based on the transform kernel (S1150).

In FIG. 11, an embodiment in which in order to determine whether to apply MTS, a transform kernel is determined by obtaining tu_mts_flag and then obtaining mts_idx based on a value of the obtained tu_mts_flag is chiefly described, but the present disclosure is not limited thereto. For example, the decoder may determine a transform kernel by directly parsing mts_idx without tu_mts_flag parsing. In this case, Table 1 may be used. That is, when an mts_idx value indicates 0, DCT-2 may be applied in a horizontal/vertical direction. When an mts_idx value indicates a value other than 0, DST-7 and/or DCT-8 may be applied based on an mts_idx value.

As another embodiment of the present disclosure, a decoding process of performing the transform process is described.

The decoder may check a transform size nTbS (S10). In this case, the transform size nTbS may be a variable representing a horizontal sample size of scaled transform coefficients.

The decoder may check a transform kernel type trType (S20). In this case, the transform kernel type trType may be a variable representing the type of transform kernel and various embodiments of the present disclosure may be applied. The transform kernel type trType may include a horizontal transform kernel type trTypeHor and a vertical transform kernel type trTypeVer.

Referring to Table 1 above, when the transform kernel type trType is 0, the transform kernel type may represent DCT2, when the transform kernel type trType is 1, the transform kernel type may represent DST7, and when the transform kernel type trType is 2, the transform kernel type may represent DCT8.

The decoder may perform a transform matrix multiplication based on at least one of the transform size nTbS or the transform kernel type (S30).

As another example, when the transform kernel type is 1 and the transform size is 4, a predetermined transform matrix 1 may be applied when performing the transform matrix multiplication.

As another example, when the transform kernel type is 1 and the transform size is 8, a predetermined transform matrix 2 may be applied when performing the transform matrix multiplication.

As another example, when the transform kernel type is 1 and the transform size is 16, a predetermined transform matrix 3 may be applied when performing the transform matrix multiplication.

As another example, when the transform kernel type is 1 and the transform size is 32, a predefined transform matrix 4 may be applied when performing the transform matrix multiplication.

Similarly, when the transform kernel type is 2 and the transform size is 4, 8, 16, or 32, predefined transform matrices 5, 6, 7, and 8 may be applied, respectively.

In this case, each of the predefined transform matrices 1 to 8 may correspond to any one of various types of transform matrices. As an example, the transform matrix of the type illustrated in FIG. 6 above may be applied.

The decoder may derive a transform sample based on the transform matrix multiplication (S40).

The embodiments may be used, but the present disclosure is not limited thereto. The above embodiments and other embodiments of the present disclosure may be combined and used.

FIG. 12 is a table showing allocation of a transform set for each intra prediction mode in an NSST as an embodiment to which the present disclosure is applied.

Non-Separable Secondary Transform (NSST)

The secondary transform unit may apply the secondary transform to a primary transformed signal and here, the secondary transform may be defined in the table in the encoder and/or the decoder.

As an embodiment, the secondary transform may conditionally adopt a non-separable secondary transform (hereinafter, referred to as 'NSST'). For example, the NSST may be applied only to the intra prediction block and may have a transform set applicable to each prediction mode group.

In this case, the prediction mode group may be configured based on symmetry with respect to a prediction direction. For example, since prediction mode 52 and prediction mode 16 are symmetrical based on prediction mode 34 (diagonal direction), the same transform set may be applied by forming one group. In this case, when the transform for prediction mode 52 is applied, input data is transposed and then applied because prediction mode 52 has the same transform set as prediction mode 16.

Meanwhile, since the symmetry for the direction does not exist in the case of a planar mode and a DC mode, each mode may have a different transform set and the corresponding transform set may include two transforms. In respect to the remaining directional modes, each transform set may include three transforms. However, the present disclosure is not limited thereto, and each transform set may include a plurality of transforms.

FIG. 13 is a calculation flow diagram for Givens rotation as an embodiment to which the present disclosure is applied.

As another embodiment, the NSST may not be applied to the entire primary transformed block but may be applied only to a top-left 8×8 area. For example, when the block size is 8×8 or more, 8×8 NSST is applied and when the block size is less than 8×8, 4×4 NSST is applied and in this case, the block is divided into 4×4 blocks and then, the 4×4 NSST is applied to each of the divided blocks.

As another embodiment, even in the case of 4×N/N×4 (N>=16), the 4×4 NSST may be applied.

Since both the 8×8 NSST and the 4×4 NSST follow a transformation combination configuration described in the present disclosure and are the non-separable transforms, the 8×8 NSST receives 64 data and outputs 64 data and the 4×4 NSST has 16 inputs and 16 outputs.

Both the 8×8 NSST and the 4×4 NSST are configured by a hierarchical combination of Givens rotations. A matrix corresponding to one Givens rotation is shown in Equation 4 below and a matrix product is shown in Equation 5 below.

$$R_\theta = \begin{bmatrix} \cos\theta & -\sin\theta \\ \sin\theta & \cos\theta \end{bmatrix}$$ [Equation 4]

$$t_m = x_m \cos\theta - x_n \sin\theta$$ [Equation 5]

$$t_n = x_n \sin\theta + x_m \cos\theta$$

As illustrated in FIG. 13 above, since one Givens rotation rotates two data, in order to process 64 data (for the 8×8 NSST) or 16 data (for the 4×4 NSST), a total of 32 or 8 Givens rotations are required.

Therefore, a bundle of 32 or 8 is used to form a Givens rotation layer. Output data for one Givens rotation layer is transferred as input data for a next Givens rotation layer through a determined permutation.

FIG. 14 illustrates one round configuration in 4×4 NSST constituted by a givens rotation layer and permutations as an embodiment to which the present disclosure is applied.

Referring to FIG. 14 above, it is illustrated that four Givens rotation layers are sequentially processed in the case of the 4×4 NSST. As illustrated in FIG. 14 above, the output data for one Givens rotation layer is transferred as the input data for the next Givens rotation layer through a determined permutation (i.e., shuffling).

As illustrated in FIG. 14 above, patterns to be permutated are regularly determined and in the case of the 4×4 NSST, four Givens rotation layers and the corresponding permutations are combined to form one round.

In the case of the 8×8 NSST, six Givens rotation layers and the corresponding permutations form one round. The 4×4 NSST goes through two rounds and the 8×8 NSST goes through four rounds. Different rounds use the same permutation pattern, but applied Givens rotation angles are different. Accordingly, angle data for all Givens rotations constituting each transform need to be stored.

As a last step, one permutation is further finally performed on the data output through the Givens rotation layers, and corresponding permutation information is stored separately for each transform. In forward NSST, the corresponding permutation is performed last and in inverse NSST, a corresponding inverse permutation is applied first on the contrary thereto.

In the case of the inverse NSST, the Givens rotation layers and the permutations applied to the forward NSST are performed in the reverse order and rotation is performed by taking a negative value even for an angle of each Givens rotation.

FIG. 15 is an embodiment to which the present disclosure is applied, and illustrates a flowchart in which forward DST7 having a length 16 is designed using a discrete Fourier transform (DFT).

Embodiment 1: Design and Implementation of DST7 Having Length 16

The present disclosure provides detailed embodiments in which DST7 is designed using a DFT. The embodiments of the present disclosure may also be used for a DCT8 design, and may also be applied to an MTS configuration.

Signals (information) transferred between blocks shown in the flowchart of FIG. 15 may be scalar values and may have a vector form. For example, the vector may be written like x[0 . . . N−1]. This illustrates a signal (information) composed of N elements like x[0 . . . N−1]=[x[0] x[1] . . . x[N−2] x[N−1]]. A partial signal of the vector x[0 . . . N−1] may be indicated like x[i . . . j]. For example, the partial signal may be indicated like x[5 . . . 10]=[x[5] x[6] x[7] x[8] x[9] x[10]] as one part of x[0 . . . 15].

FIG. 15 illustrates a flowchart in which DST7 is implemented with respect to one row or column of a length 16. In this case, DST7 having the length 16 is written as DST7_B16. Forward DST7 is written as forward DST7_B16. Inverse DST7 is written as inverse DST7_B16.

Furthermore, input data is x[0 . . . 15], and the final output data may be written as y[0 . . . 15].

When the input data x[0 . . . 15] is input, the encoder performs pre-processing on forward DST7 having a length 16 (S1510).

The encoder may apply a DFT to output w[0 . . . 15] at step S1510 (S1520). In this case, the step S1520 of applying the DFT is specifically described with reference to FIGS. 17 to 19.

The encoder may perform post-processing on output z[0 . . . 15] at step S1520, and may output the final output data y[0 . . . 15] (S1530).

FIG. 16 is an embodiment to which the present disclosure is applied, and illustrates a flowchart in which inverse DST7 having a length 16 is designed using a discrete Fourier transform (DFT).

FIG. 16 illustrates a flowchart in which inverse DST7 is implemented with respect to one row or column of a length 16. In this case, input data is x[0 . . . 15], and the final output data may be written as y[0 . . . 15].

When input data x[0 . . . 15] is input, the decoder performs pre-processing on inverse DST7 having a length 16 (S1610).

The decoder may apply a DFT to an output at step S1610 (S1620). In this case, the step S1620 of applying the DFT is specifically described with reference to FIGS. 17 to 19.

The decoder may perform post-processing on an output at step S1620, and may output the final output data y[0 . . . 15] (S1630).

FIGS. 17 to 19 are embodiments to which the present disclosure is applied, and illustrate flowcharts in which an xDST7_FFT_B16 function of FIGS. 15 and 16 is applied.

Referring to FIG. 17, src[0 . . . 15] is input to an xDST7_FFT3 block, and src_FFT11[0 . . . 15] is output (S1710). The outputted src_FFT11[0 . . . 15] may be divided into two partial signals and transmitted.

For example, the src_FFT11[0 . . . 4] may be transmitted to an xDST7_FFT11_type1 block. The src_FFT11[5 . . . 15] may be transmitted to an xDST7_FFT11_type2 block.

The xDST7_FFT11_type1 block may receive src_FFT11[0 . . . 4], and outputs dst[0 . . . 4] (S1720).

The xDST7_FFT11_type2 block receives the src_FFT11[5 . . . 15], and outputs dst[5 . . . 15] (S1730).

In this case, an implementation of the xDST7_FFT11_type1 block is specifically described with reference to FIG. 18, and an implementation of the xDST7_FFT11_type2 block is specifically described with reference to FIG. 19.

Referring to FIG. 18, src[0 . . . 4] is input to an xDST7_FFT11_half1 block, and dst_half1[0 . . . 4] is output (S1810).

The outputted dst_half1[0 . . . 4] is input to an xDST7_FFT11_type1 block, and dst[0 . . . 4] is output (S1820).

Referring to FIG. 19, src[0 . . . 10] may be divided into two partial signals and transmitted. For example, the src[0 . . . 4] may be transmitted to an xDST7_FFT11_half1 block. The src[5 . . . 10] may be transmitted to an xDST7_FFT11_half2 block.

The xDST7_FFT11_half1 block receives the src[0 . . . 4], and outputs dst_half1[0 . . . 4] (S1910).

The xDST7_FFT11_half2 block receives the src[5 . . . 10], and outputs dst_half2[0 . . . 5] (S1920).

The encoder/decoder may perform post-processing on the output at step S1920 through an xDST7_FFT11_type2_Post_Processing block, and may output the final output data dst[0 . . . 10] (S1930).

The src_FFT11[5 . . . 15] of FIG. 17 corresponds to the src[0 . . . 10] of FIG. 19. That is, assignment is performed like src[0]=src_FFT11[5], src[1]=src_FFT11[6], . . . , src[10]=src_FFT11[15].

Furthermore, in the xDST7_FFT11_type2_Post_Processing block of FIG. 19, dst_half1[0 . . . 4] and dst_half2[0 . . . 5] are sequentially input from the left. They correspond to the input parameters src half1[0 . . . 4], src half2[0 . . . 5], respectively. This will be specifically described in a table indicating an operation of each block.

As described above, the block diagrams of FIGS. 15 and 16 may be connected to the block diagrams of FIGS. 17 to 19 and interpreted.

Detailed operations of the functions of FIGS. 15 to 19 may be described by Table 2 to Table 10.

TABLE 2

Operation of Forward_DST7_Pre_Processing_B16 function

| | |
|---|---|
| Name | Forward_DST7_Pre_Processing_B16 |
| Input | src[0 . . . 15] |
| Output | dst[0 . . . 15] |
| Operation | dst[0] = src[10]; dst[1] = src[8]; dst[2]= src[1]; dst[3] = −src[12]; |
| | dst[4] = −src[14]; dst[5] = src[6]; dst[6] = src[3]; dst[7] = src[5]; |
| | dst[8] = −src[15]; dst[9] = src[4]; dst[10] = src[2]; dst[11] = src[7]; |
| | dst[12] = −src[13]; dst[13] = −src[11]; dst[14] = src[0]; dst[15] = src[9]; |

TABLE 3

Operation of Forward_DST7_Post_Processing_B16 function

| | |
|---|---|
| Name | Forward_DST7_Post_Processing_B16 |
| Input | src[0 . . . 15] |
| Output | dst[0 . . . 15] |
| Operation | int aiReordIdx[16] = {12, 0, 14, 10, 2, 5, 8, 4, 7, 6, 3, 9, 15, 1, 11, 13}; |
| | for (int i = 0; i < 16; i++) |
| | dst[i] = (int)((src[aiReordIdx[i]] + rnd_factor) >> final_shift); |

In Table 3, an rnd_factor=1<<(final_shift−1) value may be used. Furthermore, in FIGS. 15 and 16, when a function for applying DST7 is used for all the rows or columns of one block, if a value called "shift" has been transmitted through a parameter, a final_shift=shift−1 value may be used.

TABLE 4

Operation of Inverse_DST7_Pre_Processing_B16 function

| | |
|---|---|
| Name | Inverse_DST7_Pre_Processing_B16 |
| Input | src[0 . . . 15] |
| Output | dst[0 . . . 15] |
| Operation | dst[0] = src[5]; dst[1] = src[4]; dst[2] = src[15]; dst[3] = −src[6]; dst[4] = −src[7]; dst[5] = src[3]; dst[6] = src[14]; dst[7] = src[13]; dst[8] = −src[8]; dst[9] = src[2]; dst[10] = src[1]; dst[11] = src[12]; dst[12] = −src[9]; dst[13] = −src[10]; dst[14] = src[0]; dst[15] = src[11]; |

TABLE 5

Operation of Inverse_DST7_Post_Processing_B16 function

| | |
|---|---|
| Name | Inverse_DST7_Post_Processing_B16 |
| Input | src[0 . . . 15] |
| Output | dst[0 . . . 15] |
| Operation | int aiReordIdx[16] = {12, 13, 0, 11, 14, 1, 10, 15, 2, 9, 5, 3, 8, 6, 4, 7}; for (int i = 0; i < 16; i++) dst[i] = Clip3(outputMinimum, outputMaximum, (int) ((src[aiReordIdx[i]] + rnd_factor) >> final_shift)); |

In Table 5, an rnd_factor=1<<(final_shift−1) value may be used. Furthermore, in FIGS. 15 and 16, when a function for applying DST7 to all the rows or columns of one block is used, if a value called "shift" has been transmitted through a parameter, final_shift=shift−1 value may be used.

In Table 5, outputMinimum and outputMaximum indicate a minimum value and maximum value which may be included in an output value, respectively. The Clip3 function performs an operation of Clip3(A, B, C)_(C<A) ? A:(C>B) ? B:C. That is, the Clip3 function clips the C value so that the C value must be present in a range from A to B.

TABLE 6

Operation of xDST7_FFT3 function

| | |
|---|---|
| Name | xDST7_FFT3 |
| Input | src[0 . . . 15] |
| Output | dst[0 . . . 15] |
| Operation | int C3 = −443; dst[10] = ((−src[0] * C3) + rnd_factor) >> shift; for (Int i = 0; i < 5; i++) { dst[i] = (((src[3*i + 1] + src[3*i + 2] + src[3*i + 3]) << 9) + rnd_factor) >> shift; dst[5 + i] = ((((src[3*i + 1] << 1) − src[3*i + 2] − src[3*i + 3]) << 8) + rnd_factor) >> shift; dst[11 + i] = (((src[3*i + 2] − src[3*i + 3]) * C3) + rnd_factor) >> shift; } |

In Table 6, a 03 value means a round $$\left(\sin\left(\frac{2\pi}{3}\right) \cdot 2^9\right)$$

value, and illustrates a multiplication coefficient has been scaled by $2^9$. In Table 6, since shift=10, rnd_factor=1<<(shift−1)=$2^9$ is applied, dst[i] and dst[5+i] may be calculated like Equation 6.

$dst[i]=(src[3*i+1]+src[3*i+2]+src[3*i+3]+1)>>1$ $dst[5+i]=(src[3*i+1]<<1)−src[3*i+2]−src[3*i+3]+2)>>2$ [Equation 6]

TABLE 7

Operation of xDST7_FFT11_half1 function

| | |
|---|---|
| Name | xDST7_FFT11_half1 |
| Input | src[0 . . . 4] |
| Output | dst[0 . . . 4] |
| Operation | int C11R[5] = {193, 324, 353, 269, 100}; dst[0] = src[0] * C11R[1] + src[1] * C11R[3] − src[2] * C11R[4] − src[3] * C11R[2] − src[4] * C11R[0]; dst[1] = src[0] * C11R[2] − src[1] * C11R[4] − src[2] * C11R[1] + src[3] * C11R[0] + src[4] * C11R[3]; dst[2] = −src[0] * C11R[3] + src[1] * C11R[2] − src[2] * C11R[0] − src[3] * C11R[4] + src[4] * C11R[1]; dst[3] = src[0] * C11R[4] − src[1] * C11R[0] + src[2] * C11R[3] − src[3] * C11R[1] + src[4] * C11R[2]; dst[4] = src[0] * C11R[0] + src[1] * C11R[1] + src[2] * C11R[2] + src[3] * C11R[3] + src[4] * C11R[4]; |

In Table 7, the array C11R illustrates values calculated through round $$\left(\frac{1}{\sqrt{2\times 16+1}}\cdot\sin\left(\frac{2\pi i}{11}\right)\cdot 2^{11}\right), \quad i = 1, 2, 3, 4, 5.$$

TABLE 8

Operation of xDST7_FFT11_half2 function

| Name | xDST7_FFT11_half2 |
|---|---|
| Input | src[0 . . . 5] |
| Output | dst[0 . . . 5] |
| Operation | int C11I[6] = {357, 300, 148, −51, −233, −342}; |
| | dst[0] = (src[0] + src[1] + src[2] + src[3] + src[4] + src[5]) * C11I[0]; |
| | dst[1] = src[0] * C11I[0] + src[1] * C11I[2] + src[2] * C11I[4] + src[3] * C11I[5] + src[4] * C11I[3] + src[5] * C11I[1]; |
| | dst[2] = src[0] * C11I[0] + src[1] * C11I[3] + src[2] * C11I[5] + src[3] * C11I[2] + src[4] * C11I[1] + src[5] * C11I[4]; |
| | dst[3] = src[0] * C11I[0] + src[1] * C11I[4] + src[2] * C11I[3] + src[3] * C11I[1] + src[4] * C11I[5] + src[5] * C11I[2]; |
| | dst[4] = src[0] * C11I[0] + src[1] * C11I[5] + src[2] * C11I[1] + src[3] * C11I[4] + src[4] * C11I[2] + src[5] * C11I[3]; |
| | dst[5] = src[0] * C11I[0] + src[1] * C11I[1] + src[2] * C11I[2] + src[3] * C11I[3] + src[4] * C11I[4] + src[5] * C11I[5]; |

In Table 8, the array C11R illustrates values calculated through round $$\left(\frac{1}{\sqrt{2\times 16+1}}\cdot\cos\left(\frac{2\pi i}{11}\right)\cdot 2^{11}\right), \quad i = 0, 1, 2, 3, 4, 5.$$

TABLE 9

Operation of xDST7_FFT11_type1_Post_Processing function

| Name | xDST7_FFT11_type1_Post_Processing |
|---|---|
| input | src[0 . . . 4] |
| output | dst[0 . . . 4] |
| operation | dst[0] = src[4]; dst[1] = −src[0]; dst[2] = src[1]; |
| | dst[3] = src[2]; dst[4] = src[3]; |

TABLE 10

Operation of xDST7_FFT11_type2_Post_Processing function

| Name | xDST7_FFT11_type2_Post_Processing |
|---|---|
| input | src_half1[0 . . . 4], src_half2[0 . . . 5] |
| output | dst[0 . . . 10] |
| operation | dst[0] = −src_half2[0]; |
| | dst[1] = src_half2[5] − src_half1[4]; |
| | dst[2] = −(src_half2[1] − src_half1[0]); |
| | dst[3] = src_half2[2] − src_half1[1]; |
| | dst[4] = −(src_half2[3] + src_half1[2]); |
| | dst[5] = src_half2[4] − src_half1[3]; |
| | dst[6] = −(src_half2[4] + src_half1[3]); |
| | dst[7] = src_half2[3] − src_half1[2]; |
| | dst[8] = src_half2[2] + src_half1[1]; |
| | dst[9] = −(src_half2[1] + src_half1[0]); |
| | dst[10] = src_half2[5] + src_half1[4]; |

If DST7 is applied to a 16×16 two-dimensional block in a horizontal direction (or vertical direction), the flowcharts of FIGS. 15 and 16 may be used for 16 rows (or columns).

FIG. 20 is an embodiment to which the present disclosure is applied, and illustrates a flowchart in which forward DST7 having a length 32 is designed using a discrete Fourier transform (DFT).

Embodiment 2: Design and Implementation of DST7 Having a Length 32

The present disclosure provides detailed embodiments in which DST7 is designed using a DFT. The embodiments of the present disclosure may also be used for a DCT8 design, and may also be applied to an MTS configuration.

FIG. 20 illustrates a flowchart in which DST7 is implemented with respect to one row or column of a length 32. In this case, the DST7 having the length 32 is written as DST7_B32, forward DST7 is written as forward DST7_B32, and inverse DST7 is written as inverse DST7_B32.

Furthermore, input data is x[0 . . . 31], and the final output data may be written as y[0 . . . 31].

When the input data x[0 . . . 31] is input, the encoder performs pre-processing on the forward DST7 having the length 32 (S2010).

The encoder may apply a DFT to output w[0 . . . 31] at step S2010 (S2020). In this case, step S2020 of applying the DFT is specifically described with reference to FIGS. 22 to 24.

The encoder may perform post-processing on an output z[0 . . . 31]) at step S2020, and may output the final output data y[0 . . . 31] (S2030).

FIG. 21 is an embodiment to which the present disclosure is applied, and illustrates a flowchart in which forward DST7 having a length 32 is designed using a discrete Fourier transform (DFT).

FIG. 21 illustrates a flowchart in which inverse DST7 is implemented with respect to one row or column of a length 32. In this case, input data is x[0 . . . 31], and the final output data may be written as y[0 . . . 31].

When the input data x[0 . . . 31] is input, the decoder performs pre-processing on forward DST7 having a length 32 (S2110).

The decoder may apply a DFT to an output w[0 . . . 31] at step S2110 (S2120). In this case, step S2120 of applying the DFT is specifically described with reference to FIGS. 22 to 24.

The decoder may perform post-processing on an output z[0 . . . 31] at step S2120, and may output the final output data y[0 . . . 31] (S2130).

FIGS. 22 to 24 are embodiments to which the present disclosure is applied, and illustrates a flowchart in which the xDST7_FFT_B16 function of FIGS. 15 and 16 is applied.

Referring to FIG. 22, src[0 . . . 31] is input to an xDST7_FFT5 block, and src_FFT13[0 . . . 31] is output (S2210). The outputted src_FFT13[0 . . . 31] may be divided into three partial signals and transmitted.

For example, the src_FFT13[0 . . . 5] may be transmitted to an xDST7_FFT13_type1 block, the src_FFT13[6 . . . 18] may be transmitted to an xDST7_FFT13_type2 block, and the src_FFT13[19 . . . 31] may be transmitted to another xDST7_FFT13_type2 block.

The xDST7_FFT13_type1 block receives the src_FFT13[0 . . . 5], and outputs dst[0 . . . 5] (S2220).

The xDST7_FFT13_type2 block receives the src_FFT13[6 . . . 18], and outputs dst[6 . . . 18] (S2230).

The xDST7_FFT13_type2 block receives the src_FFT13 [19 . . . 31], and outputs dst[19 . . . 31] (S2240).

In this case, an implementation of the xDST7_FFT13_type1 block is specifically described with reference to FIG. 23, and an implementation of the xDST7_FFT13_type2 block is specifically described with reference to FIG. 24.

Referring to FIG. 23, src[0 . . . 5] is input to an xDST7_FFT13_half1 block, and dst_half1[0 . . . 5] is output (S2310).

The outputted dst_half1[0 . . . 5] is input to an xDST7_FFT13_type1_Post_Processing block, which outputs dst[0 . . . 5] (S2320).

Referring to FIG. 24, src[0 . . . 12] may be divided into two partial signals and transmitted. For example, the src[0 . . . 5] may be transmitted to an xDST7_FFT13_half1 block, and the src[6 . . . 12] may be transmitted to an xDST7_FFT13_half2 block.

The xDST7_FFT13_half1 block receives the src [0 . . . 5], and outputs dst_half1[0 . . . 5] (S2410).

The xDST7_FFT13_half2 block receives the src[6 . . . 12], and outputs dst_half2 [0 . . . 6] (S2420).

The encoder/decoder may perform post-processing the outputs at steps S2410 and S2420 through an xDST7_FFT13_type2_Post_Processing block, and may output the final output data dst[0 . . . 12] (S1930).

src_FFT13[0 . . . 5] of FIG. 22 corresponds to src[0 . . . 5] of FIG. 23. That is, assignment is performed like src[0]=src_FFT13[0], src[1]=src_FFT13[1], . . . , src[5]=src_FFT13[5].

Furthermore, src_FFT13[6 . . . 18] or src_FFT13[19 . . . 31] of FIG. 22 corresponds to src[0 . . . 12] of FIG. 24. For example, assignment is performed like src[0]=src_FFT13 [6], src[1]=src_FFT13[7], . . . , src[12]=src_FFT13[18].

Furthermore, in the xDST7_FFT13_type2_Post_Processing block of FIG. 24, dst_half1[0 . . . 5] and dst_half2[0 . . . 6] are sequentially input from the left. They correspond to input parameters src_half1[0 . . . 5], src_half2[0 . . . 6], respectively. This will be specifically described in a table indicating an operation of each block.

As described above, the block diagrams of FIGS. 20 and 21 may be connected to the block diagrams of FIGS. 22 to 24 and interpreted.

Detailed operations of the functions of FIGS. 20 to 24 may be described by Table 11 to Table 18 below.

TABLE 11

Operation of Forward_DST7_Pre_Processing_B32 function

| | |
|---|---|
| Name | Forward_DST7_Pre_Processing_B32 |
| Input | src[0 . . . 31] |
| Output | dst[0 . . . 31] |
| Operation | int aiFFTInReordIdx[32] = {12, 25, −14, 1, 10, −23, 27, 29, −16, 3, 8, −21, −19, 31, −18, 5, 6, 4, −17, 30, −20, 7, 9, 2, −15, 28, −22, −24, 11, 0, −13, 26}; <br> for (int i = 0; i < 32; i++) { <br> int index = aiFFTInReordIdx[i]; <br> dst[i] = (index < 0) ? −src[−index]: src[index]; <br> } |

TABLE 12

Operation of Forward_DST7_Post_Processing_B32 function

| | |
|---|---|
| Name | Forward_DST7_Post_Processing_B32 |
| Input | src[0 . . . 31] |
| Output | dst[0 . . . 31] |
| Operation | int aiFFTOutReordIdx[32] = {−27, −17, 0, 15, 25, −29, −6, 2, 13, 23, −31, −8, 4, 11, 21, −20, −10, 5, 9, 19, −22, −12, 3, 7, 30, −24, −14, 1, 18, 28, −26, −16}; <br> for (int i = 0; i < 32; i++) { <br> int index = aiFFTOutReordIdx[i]; <br> dst[i] = (int)((((index < 0) ? −src[−index]: src[index]) + rnd_factor) >> final_shift); <br> } |

In Table 12, an rnd_factor=1<<(final_shift−1) value may be used. Furthermore, in FIGS. 20 and 21, when a function for applying DST7 to all the rows or columns of one block, if a value called "shift" has been transmitted through a parameter, final-shift=shift−1 value may be used.

TABLE 13

Operation of Inverse_DST7_Pre_Processing_B32 function

| | |
|---|---|
| Name | Inverse_DST7_Pre_Processing_B32 |
| Input | src[0 . . . 31] |
| Output | dst[0 . . . 31] |

TABLE 13-continued

Operation of Inverse_DST7_Pre_Processing_B32 function

Operation  int aiFFTInReordIdx[32] = {6, 19, -7, 31, 5, -20, 18, 17, -8, 30, 4, -21,
-22, 16, -9, 29, 3, 2, -23, 15, -10, 28, 27, 1, -24, 14, -11, -12, 26, 0, -25,
13};
for (int i = 0; i < 32; i++) {
int index = aiFFTInReordIdx[i];
dst[i] = (index < 0) ? -src[-index]: src[index];
}

TABLE 14

Operation of Inverse_DST7_Post_Processing_B32 function

Name    Inverse_DST7_Post_Processing_B32
Input   src[0 . . . 31]
Output  dst[0 . . . 31]
Operation  int aiFFTOutReordIdx[32] = {-27, -16, -17, -26, 0, 28, 15, 18, 25, 1, -29,
-14, -6, -24, 2, 30, 13, 7, 23, 3, -31, -12, -8, -22, 4, 19, 11, 9, 21, 5, -20,
-10};
for (int i = 0; i < 32; i++) {
int index = aiFFTOutReordIdx[i];
    dst[i] = Clip3(outputMinimum, outputMaximum, (Int)((((index < 0) ? -
src[-index]: src[index]) + rnd_factor)>> final_shift));
}

In Table 14, an rnd_factor=1<<(final_shift−1) value may be used. Furthermore, in FIGS. 20 and 21, when a function for applying DST7 to all the rows or columns of one block, if a value called "shift" has been transmitted through a parameter, final_shift=shift−1 value may be used.

In Table 14, outputMinimum and outputMaximum indicate a minimum value and a maximum value which may be included in an output value, respectively. The Clip3 function performs an operation of Clip3(A, B, C)=(C<A) ? A:(C>B) ? B:C. That is, the Clip3 function clips the C value so that the C value must be present in a range from A to B.

TABLE 15

Operation of xDST7_FFT13_half1 function

Name    xDST7_FFT13_half1
Input   src[0 . . . 5]
Output  dst[0 . . . 5]
Operation  Int C13R[6] = {167, 296, 357, 336, 238, 86};
dst[0] = -src[0] * C13R[0] - src[1] * C13R[1] - src[2] * C13R[2] - src[3] *
C13R[3] - src[4] * C13R[4] - src[5] * C13R[5];
dst[1] = -src[0] * C13R[1] - src[1] * C13R[3] - src[2] * C13R[5] + src[3] *
C13R[4] + src[4] * C13R[2] + src[5] * C13R[0];
dst[2] = -src[0] * C13R[2] - src[1] * C13R[5] + src[2] * C13R[3] + src[3] *
C13R[0] - src[4] * C13R[1] - src[5] * C13R[4];
dst[3] = -src[0] * C13R[3] + src[1] * C13R[4] + src[2] * C13R[0] - src[3] *
C13R[2] + src[4] * C13R[5] + src[5] * C13R[1]
dst[4] = -src[0] * C13R[4] + src[1] * C13R[2] - src[2] * C13R[1] + src[3] *
C13R[5] + src[4] * C13R[0] - src[5] * C13R[3];
dst[5] = -src[0] * C13R[5] + src[1] * C13R[0] - src[2] * C13R[4] + src[3] *
C13R[1] - src[4] * C13R[3] + src[5] * C13R[2];

In Table 15, the array C13R illustrates values calculated through round $$\left(\frac{1}{\sqrt{2 \times 32 + 1}} \cdot \sqrt{2} \cdot \sin\left(\frac{2\pi i}{13}\right) \cdot 2^{11}\right), \quad i = 1, 2, 3, 4, 5, 6.$$

TABLE 16

Operation of xDST7_FFT13_half2 function

| | |
|---|---|
| Name | xDST7_FFT13_half2 |
| Input | src[0 . . . 6] |
| Output | dst[0 . . . 6] |
| Operation | int C13I[7] = {359, 318, 204, 43, −127, −269, −349};<br>dst[0] = (src[0] + src[1] + src[2] + src[3] + src[4] + src[5] + src[6]) * C13I[0];<br>dst[1] = src[0] * C13I[0] + src[1] * C13I[1] + src[2] * C13I[2] + src[3] * C13I[3] + src[4] * C13I[4] + src[5] * C13I[5] + src[6] * C13I[6];<br>dst[2] = src[0] * C13I[0] + src[1] * C13I[2] + src[2] * C13I[4] + src[3] * C13I[6] + src[4] * C13I[5] + src[5] * C13I[3] + src[6] * C13I[1];<br>dst[3] = src[0] * C13I[0] + src[1] * C13I[3] + src[2] * C13I[6] + src[3] * C13I[4] + src[4] * C13I[1] + src[5] * C13I[2] + src[6] * C13I[5];<br>dst[4] = src[0] * C13I[0] + src[1] * C13I[4] + src[2] * C13I[5] + src[3] * C13I[1] + src[4] * C13I[3] + src[5] * C13I[6] + src[6] * C13I[2];<br>dst[5] = src[0] * C13I[0] + src[1] * C13I[5] + src[2] * C13I[3] + src[3] * C13I[2] + src[4] * C13I[6] + src[5] * C13I[1] + src[6] * C13I[4];<br>dst[6] = src[0] * C13I[0] + src[1] * C13I[6] + src[2] * C13I[1] + src[3] * C13I[5] + src[4] * C13I[2] + src[5] * C13I[4] + src[6] * C13I[3]; |

In Table 16, the array C13I illustrates values calculated through round $$\left(\frac{1}{\sqrt{2 \times 32 + 1}} \cdot \sqrt{2} \cdot \cos\left(\frac{2\pi i}{13}\right) \cdot 2^{11}\right), \quad i = 0, 1, 2, 3, 4, 5, 6.$$

TABLE 17

Operation of xDST7_FFT13_type1_Post_Processing function

| | |
|---|---|
| Name | xDST7_FFT 13_type1_Post_Processing |
| Input | src[0 . . . 5] |
| Output | dst[0 . . . 5] |
| Operation | dst[0] = −src[0]; dst[1] = src[1]; dst[2] = −src[2];<br>dst[3] = src[3]; dst[4] = −src[4]; dst[5] = src[5]; |

TABLE 18

Operation of xDST7_FFT13_type2_Post_Processing function

| | |
|---|---|
| Name | xDST7_FFT13_type2_Post_Processing |
| Input | src_half1[0 . . . 5], src_half2[0 . . . 6] |
| Output | dst[0 . . . 12] |
| Operation | dst[0] = src_half2[0];<br>for (int i = 0; i < 6; i++) {<br>  dst[1 + i] = src_half1[i] + src_half2[1 + i];<br>}<br>for (int i = 0; i < 6; i++) {<br>  dst[7 + i] = −src_half1[5 − i] + src_half2[6 − i];<br>} |

If DST7 is applied to one 32×32 two-dimensional block in a horizontal direction (or vertical direction), the flowcharts of FIGS. 20 and 21 may be used for 32 rows (or columns).

FIG. 25 is an embodiment to which the present disclosure is applied, and illustrates a flowchart in which forward DST7 having a length 8 is designed using a discrete Fourier transform (DFT).

Embodiment 3: Design and Implementation of DST7 Having a Length 8

The present disclosure provides detailed embodiments in which DST7 is designed using a DFT. The embodiments of the present disclosure may also be used for a DCT8 design, and may also be applied to an MTS configuration.

FIG. 25 illustrates a flowchart in which DST7 is implemented with respect to one row or column of a length 8. In this case, the DST7 having the length 8 is written as DST7_B8, forward DST7 is written as forward DST7_B8, and inverse DST7 is written as inverse DST7_B8.

Furthermore, input data is x[0 . . . 7], and the final output data may be written as y[0 . . . 7].

When the input data x[0 . . . 7] is input, the encoder performs pre-processing on forward DST7 having a the length 8 (S2510).

The encoder may apply a DFT to an output w[0 . . . 7] at step S2510 (S2520). In this case, step S2520 of applying the DFT is specifically described with reference to FIGS. 27 and 28.

The encoder may perform post-processing on the output z[0 . . . 7]) at step S2520, and may output the final output data y[0 . . . 7] (S2530).

FIG. 26 is an embodiment to which the present disclosure is applied, and illustrates a flowchart in which inverse DST7 having a length 8 is designed using a discrete Fourier transform (DFT).

FIG. 26 illustrates a flowchart in which inverse DST7 is implemented with respect to one row or column of a length 8. In this case, input data is x[0 . . . 7], and the final output data may be written as y[0 . . . 7].

When the input data x[0 . . . 7] is input, the decoder performs pre-processing on inverse DST7 having a length 8 (S2610).

The decoder may apply a DFT to an output w[0 . . . 7] at step S2610 (S2620). In this case, step S2620 of applying the DFT is specifically described with reference to FIGS. 27 and 28.

The decoder may perform post-processing on an output z[0 . . . 7] at step S2620, and may output the final output data y[0 . . . 7] (S2630).

Detailed operations of the functions of FIGS. 25 and 26 may be described by Table 19 to Table 23 below.

TABLE 19

| | |
|---|---|
| Operation of Forward_DST7_Pre_Processing_B8 function | |
| Name | Forward_DST7_Pre_Processing_B8 |
| Input | src[0 . . . 7] |
| Output | dst[0 . . . 7] |
| Operation | dst[0] = src[1]; dst[1] = src[5];<br>dst[2] = −src[0]; dst[3] = −src[2];<br>dst[4] = −src[7]; dst[5] = src[6];<br>dst[6] = −src[3]; dst[7] = −src[4] |

TABLE 20

| | |
|---|---|
| Operation of Forward_DST7_Post_Processing_B8 function | |
| Name | Forward_DST7_Post_Processing_B8 |
| Input | src[0 . . . 7] |
| Output | dst[0 . . . 7] |
| Operation | int aiReordIdx[8] = {0, 2, 4, 6, 7, 5, 3, 1};<br>for (int i = 0; i < 8; i++) {<br>  dst[i] = (int)((src[aiReordIdx[i]] + rnd_factor) >> shift);<br>} |

In Table 20, an rnd_factor=1<<(shift−1) value may be used. In this case, a shift value is a value transferred through a parameter when a function for applying DST7 to all the rows or columns of one block is used.

TABLE 21

| | |
|---|---|
| Operation of Inverse_DST7_Pre_Processing_B8 function | |
| Name | Inverse_DST7_Pre_Processing_B8 |
| Input | src[0 . . . 7] |
| Output | dst[0 . . . 7] |
| Operation | dst[0] = src[7]; dst[1] = src[5];<br>dst[2] = −src[0]; dst[3] = −src[1];<br>dst[4] = −src[4]; dst[5] = src[3];<br>dst[6] = −src[6]; dst[7] = −src[2]; |

TABLE 22

| | |
|---|---|
| Operation of Inverse_DST7_Post_Processing_B8 function | |
| Name | Inverse_DST7_Post_Processing_B8 |
| input | src[0 . . . 7] |
| output | dst[0 . . . 7] |
| operation | for (Int i = 0; i < 8; i++) {<br>  dst[i] = Clip3(outputMinimum, outputMaximum,<br>  (Int)((src[i]) + rnd_factor) >> shift);<br>} |

In Table 22, an rnd_factor=1<<(shift−1) value may be used. In this case, a shift value is a value transferred through a parameter when a function for applying DST7 to all the rows or columns of one block is used.

In Table 5, outputMinimum and outputMaximum indicate a minimum value and a maximum value which may be included in an output value, respectively. The Clip3 function performs an operation of Clip3(A, B, C), (C<A) ? A:(C>B) ? B:C. That is, the Clip3 function clips the C value so that the C value must be present in a range from A to B.

TABLE 23

| | |
|---|---|
| Operation of xDST7_FFT_B8 function | |
| Name | xDST7_FFT_B8 |
| Input | src[0 . . . 7] |
| Output | dst[0 . . . 7] |
| Operation | int C8[8] = {127, 237, 314, 350, 338, 280, 185, 65};<br>dst[0] = src[0] * C8[0] + src[1] * C8[2] − src[2] * C8[7] − src[3] * C8[6] − src[4] * C8[3] + src[5] * C8[4] − src[6] * C8[1] − src[7] * C8[5];<br>dst[1] = −src[0] * C8[1] − src[1] * C8[5] − src[2] * C8[0] − src[3] * C8[2] + src[4] * C8[7] + src[5] * C8[6] + src[6] * C8[3] − src[7] * C8[4];<br>dst[2] = src[0] * C8[2] − src[1] * C8[7] − src[2] * C8[6] − src[3] * C8[3] + src[4] * C8[4] − src[5] * C8[1] − src[6] * C8[5] − src[7] * C8[0];<br>dst[3] = −src[0] * C8[3] + src[1] * C8[4] − src[2] * C8[1] − src[3] * C8[5] − src[4] * C8[0] − src[5] * C8[2] + src[6] * C8[7] + src[7] * C8[6];<br>dst[4] = src[0] * C8[4] − src[1] * C8[1] − src[2] * C8[5] − src[3] * C8[0] − src[4] * C8[2] + src[5] * C8[7] + src[6] * C8[6] + src[7] * C8[3];<br>dst[5] = −src[0] * C8[5] − src[1] * C8[0] − src[2] * C8[2] + src[3] * C8[7] + src[4] * C8[6] + src[5] * C8[3] − src[6] * C8[4] + src[7] * C8[1];<br>dst[6] = src[0] * C8[6] + src[1] * C8[3] − src[2] * C8[4] + src[3] * C8[1] + src[4] * C8[5] + src[5] * C8[0] + src[6] * C8[2] − src[7] * C8[7];<br>dst[7] = −src[0] * C8[7] − src[1] * C8[6] − src[2] * C8[3] + src[3] * C8[4] − src[4] * C8[1] − src[5] * C8[5] − src[6] * C8[0] − src[7] * C8[2]. |

In Table 23, the array C8 illustrates values calculated through round $$\left(\frac{1}{\sqrt{2 \times 8 + 1}} \cdot \sqrt{2} \cdot \sin\left(\frac{2\pi i}{17}\right) \cdot 2^{10}\right), i = 1, 2, 3, 4, 5, 6, 7, 8.$$

If DST7 is applied to an 8×8 two-dimensional block in a horizontal direction (or vertical direction), the flowcharts of FIGS. 25 and 26 may be used for eight rows (or columns).

Embodiment 4: Method of Partially Applying DST7 Implementations Proposed in Embodiments 1 to 3

The DST7 implementations proposed in Embodiment 1 and Embodiment 2 may be applied to DST7 having a length 16 and DST7 having a length 32. The DST7 implementation proposed in Embodiment 3 may be applied to DST7 having a length 8, but the present disclosure is not limited thereto, and may be differently applied. For example, if the DST7 implementation proposed in Embodiment 3 is not applied, a DST7 implementation having a common matrix multiplication form may be applied.

Embodiment 5: Implementation of DST7 Using a Discrete Fourier Transform (DFT)

A matrix form of N×N DST7 may be represented like Equation 7.

[Equation 7]

$$[S_N^{VII}]_{n,k} = \frac{2}{\sqrt{2N+1}} \sin\left(\frac{\pi(2k+1)(n+1)}{2N+1}\right), n, k = 0, 1, \ldots, N-1$$

In this case, if n is a row index from 0 to N−1 and k is a column index from 0 to N−1, the matrix of Equation 7 is matched with an inverse DST7 matrix multiplied by transform coefficients in order to reconstruct the original inputs. Accordingly, the transpose matrix of Equation 7 is a forward DST7 matrix. Furthermore, forward DST7 and inverse DST7 matrices are orthogonal to each other, and each of default vectors thereof has norm 1.

A relation between the DST7 and the DFT may be represented like Equation 8 based on Equation 7.

[Equation 8]

$$\left(S_N^{VII}\right)^T = RJ[F_{2N+1}]QP[R]_{n,k} = \begin{cases} -1, & \text{if } k = 2n+1, n = 0, 1, \ldots, N-1 \\ 0, & \text{otherwise} \end{cases},$$

where $$Q = \begin{pmatrix} 0^T \\ I_N \\ -J_N \end{pmatrix}, \text{ and } [P]_{n,k} = \begin{cases} 1, & \text{if } k+1 = 2(n+1), n = 0, 1, \ldots, N/2 - 1 \\ 1, & \text{if } k+1 = 2(N-n)-1, n = N/2, \ldots, N-1 \\ 0, & \text{otherwise} \end{cases}$$

In Equation 8, R is an N×(2N+1) matrix (the number of rows×the number of columns), Q is an (2N+1)×N matrix, and P is an N×N matrix. $I_N$ indicates an N×N identity matrix, and $J_N$ indicates $$[J_N]_{ij,i,j=0,\ldots,N-1} = \begin{cases} 1, & j = N-1-i \\ 0, & \text{otherwise} \end{cases}.$$

In Equation 8, $\Im[F_{2N+1}]$ means that only the imaginary part of DFT results is taken after a DFT having a length (2N+1) is performed. Equation 8 is held only when N is an even number. More specifically, the $\Im[F_{2N+1}]$ means that when x input as forward DST7 is an N×1 vector, if $\tilde{z}=QPx$ is calculated, an (2N+1)×1 vector($\tilde{z}$) is output, and only a next imaginary part on which a DFT having a 2N+1 length is performed using a vector ($\tilde{z}$) as an input is taken.

As in Equation 8, the rearranging of N inputs and the assigning of their signs (+/−) are performed on matrices P, Q, and R so that major calculation parts become a 2N+1 length DF in forward DST7.

The present disclosure uses DST7 having a 2n×2n (N=2n) size. Accordingly, 9-point DFT, 17-point DFT, 33-point DFT, and 65-point DFTs may be applied when N=4, 8, 16, 32, respectively.

The present disclosure chiefly describes a case where N=8, 16, 32, and provides a method of introducing the design of corresponding DFTs in the form of an equivalent multi-dimensional DFT and integrating the DFTs in order to obtain low complexity DST7.

inverse N×N DST7 matched with forward DST6 may be represented as 2N+1 length DFT as in Equation 9:

[Equation 9]

$$S_N^{VII} = RJ[F_{2N+1}]QP, [R]_{n,k} = \begin{cases} 1, & \text{if } k = n+1, n = 1, 3, \ldots, N-1 \\ -1, & \text{if } k = n+1, n = 0, 2, \ldots, N-2, \\ 0, & \text{otherwise} \end{cases}$$

where $$Q = \begin{pmatrix} 0^T \\ J_N \\ -I_N \end{pmatrix}, \text{ and } [P]_{n,k} = \begin{cases} 1, & \text{if } k = n, n = 0, 1, \ldots, N-1 \\ 0, & \text{otherwise} \end{cases}$$

In this case, R is an N×(2N+1) matrix (the number of rows×the number of columns), Q is a (2N+1)×N matrix, and $I_N$ indicates an N×N identity matrix. The definition of $J_N$ is the same as that in Equation 8.

$\Im[F_{2N+1}]$ means that when x input as forward DST7 is an N×1 vector, if $z=Qx$ is calculated, a (2N+1)×1 vector($z$) is output, and only a next imaginary part on which a DFT having a 2N+1 length is performed using the vector ($z$) as an input is taken. That is, the meaning of $\Im[F_{2N+1}]$ in Equation 9 is the same as the definition in Equation 8 except that $z=QPx$ is calculated.

In Equation 9, N is an even number. Furthermore, the same 2N+1 length DFT as that in forward DST7 may be used in inverse DST7.

A trigonometric transform having a length of an even number may be applied to a codec system to which the present disclosure is applied. For example, DFTs having lengths 17, 33, 65, and 129 from Equation 8 are necessary for DST7s having lengths 8, 16, or 32 and 64, respectively. A 33-point DFT and a 65-point DFT which may be applied to the DST7 having the lengths 8 and 16 may be represented as one-dimensional DFTs as in Equation 10 and Equation 11. Equation 12 illustrates a DFT equation for a common length N.

[Equation 10]

$$X(k) = \frac{1}{\sqrt{2 \cdot 16 + 1}} \sum_{n=0}^{32} x(n) W_N^{nk}, W_N = e^{-j(2\pi/33)}$$

[Equation 11]

$$X(k) = \frac{1}{\sqrt{2 \cdot 32 + 1}} \sum_{n=0}^{64} x(n) W_N^{nk}, \ W_N = e^{-j(2\pi/65)}$$

[Equation 12]

$$X(k) = \frac{1}{\sqrt{N}} \sum_{n=0}^{N-1} x(n) W_N^{nk}, \ W_N = e^{-j(2\pi/M)}$$

For an N×N DST7 implementation, a process of applying a DFT having a length 2N+1 has been described. However, a length N instead of the length 2N+1 may be used for contents including Equations 10 and 11 for convenience of writing. Accordingly, if a DFT is applied through Equations 8 and 9, there is a need for a transform in proper writing.

Furthermore, the one-dimensional 33-point DFT and the one-dimensional 65-point DFT are also represented as equivalent two-dimensional DFTs through a simple input/output data transform, and corresponding equations thereof are the same as Equations 13 and 14.

[Equation 13]

$$\hat{X}(k_1, k_2) = \frac{1}{\sqrt{2 \cdot 16 + 1}} \sum_{n_2=0}^{10} \sum_{n_1=0}^{2} \hat{x}(n_1, n_2) W_3^{n_1 k_1} W_{11}^{n_2 k_2} = \sum_{n_2=0}^{10} \hat{y}(k_1, n_2) W_{11}^{n_2 k_2}$$

[Equation 14]

$$\hat{X}(k_1, k_2) = \frac{1}{\sqrt{2 \cdot 32 + 1}} \sum_{n_2=0}^{12} \sum_{n_1=0}^{4} \hat{x}(n_1, n_2) W_5^{n_1 k_1} W_{13}^{n_2 k_2} = \sum_{n_2=0}^{12} \hat{y}(k_1, n_2) W_{13}^{n_2 k_2}$$

wherein n indicates an index for input data, and k indicates an index for a transform coefficient. ⟨

Hereinafter, a residue of a number is written as ⟨ x⟩ $_N$=x mod N. Furthermore, four index variables $n_1$, $n_2$, $k_1$, and $k_2$ are introduced, and a relation between a 33-point DFT and a 65-point DFT may be indicated like Equations 15 and 16.

$$n = \langle 22n_1 + 12n_2 \rangle_{33}$$

$$k = \langle 11k_1 + 3k_2 \rangle_{33} \quad \text{[Equation 15]}$$

$$n = \langle 26n_1 + 40n_2 \rangle_{65}$$

$$k = \langle 13k_1 + 5k_2 \rangle_{65} \quad \text{[Equation 16]}$$

wherein n indicates an index for input data, and k indicates an index for a transform coefficient. Equation 15 indicates an index mapped to a 33-point DFT, and Equation 16 indicates an index mapped to a 65-point DFT.

Input/output data mapping between a one-dimensional DFT and a two-dimensional DFT is given like Equations 17 and 18 according to Equations 15 and 16. In the present disclosure, new input/output variables may be defined as two index arguments $\hat{x}(n_1,n_2)$ and $\hat{X}(k_1,k_2)$ like Equations 17 and 18 from Equations 15 and 16.

$$\hat{x}(n_1,n_2) = x(\langle 22n_1 + 12n_2 \rangle_{33})$$

$$\hat{X}(k_1,k_2) = X(\langle 11k_1 + 3k_2 \rangle_{33}) \quad \text{[Equation 17]}$$

$$\hat{x}(n_1,n_2) = x(\langle 26n_1 + 40n_2 \rangle_{65})$$

$$\hat{X}(k_1,k_2) = X(\langle 13k_1 + 5k_2 \rangle_{65}) \quad \text{[Equation 18]}$$

wherein ⟨ x⟩ $_N$=x mod N.

Embodiment 5-1: Indexing Method for a Two-Dimensional DFT Constituting DST7

A two-dimensional DFT has been enabled by Equations 15 and 17, but the present disclosure is not limited thereto. That is, if Equation 19 is satisfied, two-dimensional DFTs, such as Equations 13 and 14, may be formed.

$$N = N_1 N_2$$

$$n = \langle K_1 n_1 + K_2 n_2 \rangle_N$$

$$k = \langle K_3 k_1 + K_4 k_2 \rangle_N$$

$$\langle K_1 K_3 \rangle_N = N_2$$

$$\langle K_2 K_4 \rangle_N = N_1$$

$$\langle K_1 K_4 \rangle_N = \langle K_2 K_3 \rangle_N = 0 \quad \text{[Equation 19]}$$

wherein $N_1$ and $N_2$ indicate mutually prime factors. Furthermore, ⟨ x⟩ $_N$=x mod N.

A 33-point one-dimensional DFT corresponds to ($N_1$, $N_2$)=(3, 11), and a 65-point one-dimensional DFT corresponds to ($N_1$, $N_2$)=(5, 13). In both cases, since both $N_1$ and $N_2$ are mutually prime factors, Equation 19 may be applied. If $K_1$, $K_2$, $K_3$, and $K_4$ satisfy Equation 20, in Equation 19, the ⟨ $K_1 K_4$⟩ $_N$=⟨ $K_2 K_3$⟩ $_N$=0 condition is satisfied.

$$K_1 = \alpha N_2, K_2 = \beta N_1, K_3 = \gamma N_2, K_4 = \delta N_1 \quad \text{[Equation 20]}$$

Furthermore, in order to satisfy other conditions of Equation 19, a relation equation of Equation 21 needs to be satisfied.

$$\langle \alpha \gamma N_2 \rangle_{N_1} = 1, \langle \beta \delta N_1 \rangle_{N_2} = 1 \quad \text{[Equation 21]}$$

Accordingly, all α, β, γ, δ to satisfy Equation 21 can derive $K_1$, $K_2$, $K_3$, and $K_4$ to satisfy Equation 19 from Equation 20, enabling an equivalent two-dimensional DFT to be constructed. Possible embodiments of α, β, γ, δ are as follows.

1) (α, β, γ, δ)=(2, 4, 1, 1)

This corresponds to Equation 15 and is a case where ($N_1$, $N_2$)=(3, 11).

2) (α, β, γ, δ)=(2, 8, 1, 1)

This corresponds to Equation 16 and is a case where ($N_1$, $N_2$)=(5, 13).

3) (α, β, γ, δ)=(1, 1, 2, 4)

This is a case where ($N_1$, $N_2$)=(3, 11).

4) (α, β, γ, δ)=(1, 1, 2, 8)

This is a case where ($N_1$, $N_2$)=(5, 13).

If a corresponding two-dimensional DFT is configured by $K_1$, $K_2$, $K_3$, and $K_4$ derived from α, β, γ, δ that satisfies Equation 21, in a process of calculating the two-dimensional DFT, symmetries between input/output data and intermediate result values, such as those in the equations, may occur.

Accordingly, even in the case of a two-dimensional DFT having indices (i.e., having different α, β, γ, δ values) different from those of the embodiments, as a result, complexity necessary to perform DST7 can be significantly reduced by applying the method and structure proposed in the embodiments.

In summary, a DFT for a length N (N=$N_1 N_2$, $N_1$ and $N_2$ are mutually prime factors) may be calculated as a two-dimensional DFT, such as Equation 22, by index transform (i.e., a transform between a one-dimensional index and a two-dimensional index) that satisfies Equations 19 to 21.

[Equation 22]

$$\hat{X}(k_1, k_2) = \frac{1}{\sqrt{N}} \sum_{n_2=0}^{N_2-1} \sum_{n_1=0}^{N_1-1} \hat{x}(n_1, n_2) W_{N_1}^{n_1 k_1} W_{N_2}^{n_2 k_2} = \sum_{n_2=0}^{N_2-1} \hat{y}(k_1, n_2) W_{N_2}^{n_2 k_2}$$

If a two-dimensional DFT form, such as Equation 22, is used, the two-dimensional DFT can be decomposed into DFTs having a short length and operate. Accordingly, a computational load can be significantly reduced compared to an equivalent one-dimensional DFT.

Embodiment 5-2: Optimization for Low Complexity DST7 Design

According to Equations 13 and 14, the present disclosure performs a 3-point DFT of $\hat{x}(0,n_2)$, $\hat{x}(1,n_2)$, and $\hat{x}(2,n_2)$ and a 5-point DFT of $\hat{x}(0,n_2)$, $\hat{x}(1,n_2)$, $\hat{x}(2,n_2)$, $\hat{x}(3,n_2)$, and $\hat{x}(4,n_2)$ on a given n2.

The present disclosure may define a real part and imaginary part of $\hat{y}(k_1,n_2)$ like Equation 23 with respect to $\hat{y}(k_1,n_2)$ generated after the internal DFT loop of Equation 13, 14 is performed.

$$\hat{x}(k_1,n_2) = \hat{y}_R(k_1,n_2) + j \cdot \hat{y}_I(k_1,n_2) \qquad \text{[Equation 23]}$$

wherein $\hat{y}_R$ indicates the real part, and $\hat{y}_I$ indicates the imaginary part.

Likewise, input $\hat{x}(n_1,n_2)$ and output $\hat{X}(k_1,k_2)$ may be decomposed into a real part and an imaginary part, respectively.

$$\hat{x}(n_1,n_2) = \hat{x}_R(n_1,n_2) + j \cdot \hat{x}_I(n_1,n_2)$$

$$\hat{X}(k_1,k_2) = \hat{X}_R(k_1,k_2) + j \cdot \hat{X}_I(k_1,k_2) \qquad \text{[Equation 24]}$$

wherein an input $\hat{x}(n_1,n_2)$ may be pixels or residual data to which a designated transform is expected to be applied. Accordingly, actual $\hat{x}_I(n_1,n_2)$ may be assumed to have a0 value.

Under such an assumption, the present disclosure may check relations between first transformed data $\hat{y}(k_1,n_2)$ output by input symmetries imposed to a first step DFT (i.e., a 3-point DFT in the case of a 33-point DFT, and a 5-point DFT in the case of a 65-point DFT). Such symmetries are provided by the P and Q matrices of Equation 8 or 9, and are described in Equations 25 and 26.

[Equation 25]

$$x(0,n_2)=0, x(2,n_2)=-x(1,n_2) \qquad \text{Case 1)}$$

$$x(0,n_2)=-x(0,n'_2), x(1,n_2)=-x(2,n'_2), x(2,n_2)=-x(1,n'_2)$$
$$\text{for some } n'_2 \qquad \text{Case 2)}$$

[Equation 26]

$$x(0,n_2)=0, x(3,n_2)=-x(2,n_2), x(4,n_2)=-x(1,n_2) \qquad \text{Case 1)}$$

$$x(0,n_2)=-x(0,n'_2), x(1,n_2)=-x(4,n'_2), x(2,n_2)=-x(3,n'_2),$$

$$x(3,n_2)=-x(2,n'_2), x(4,n_2)=-x(1,n'_2) \text{ for some } n'_2 \qquad \text{Case 2)}$$

Furthermore, in $\hat{y}(k_1,n_2)$, first step output relations are the same as Equations 27 and 28.

$$\hat{y}_R(2,n_2)=\hat{y}_R(1,n_2)$$

$$\hat{y}_I(0,n_2)=0, \hat{y}_I(2,n_2)=-\hat{y}_I(1,n_2) \qquad \text{[Equation 27]}$$

$$\hat{y}_R(3,n_2)=\hat{y}_R(2,n_2), \hat{y}_R(4,n_2)=\hat{y}_R(1,n_2)$$

$$\hat{y}_I(0,n_2)=0, \hat{y}_I(3,n_2)=-\hat{y}_I(2,n_2), \hat{y}_I(4,n_2)=-\hat{y}_I(1,n_2) \qquad \text{[Equation 28]}$$

Equations 25 and 27 indicate relations in a 3-point FFT belonging to a 33-point DFT. Equations 26 and 28 indicate relations in a 5-point FFT belonging to a 65-point DFT.

For example, in Equations 25 and 26, Case 1 occurs when $n_2=0$, and Case 2 occurs when $n_2=11-n'_2$, $n'_2=1, 2, \ldots, 10$ ($n_2=13-n'_2$, $n'_2=1, 2, \ldots, 12$) With respect to Case 1 inputs, real parts of all outputs from the 3-point FFT (5-point FFT) become 0. The present disclosure needs to maintain one (two) imaginary part outputs because the remaining one output (two outputs) can be recovered according to Equations 27 and 28.

In Equations 25 and 26, due to the input patterns of Case 2, the present disclosure has a relation between $\hat{y}(k_1,n_2)$ and $\hat{y}(k_1,n_2)$ as in Equation 29.

$$\hat{y}_R(k_1,n_2)=-\hat{y}_R(k_1,n'_2)$$

$$\hat{y}_I(k_1,n_2)=\hat{y}_I(k_1,n'_2) \qquad \text{[Equation 29]}$$

In the case of Equation 29, relations between indices $n_2=11-n'_2$, $n'_2=1, 2, \ldots, 10$ ($n_2=13-n'_2$, $n'_2=1, 2, \ldots, 12$) of an 11-point FFT (13-point FFT) are also identically applied.

Accordingly, the present disclosure performs a 3-point FFT (5-point FFT) only when $n_2$ is in the range of [0, 5] ([0, 6]) due to Equation 29, and thus can reduce an associated computational load.

Furthermore, in each 3-point FFT (5-point FFT) calculation in the range of [1, 5] ([1, 6]), other parts of the outputs may be recovered according to Equation 21. Accordingly, only some outputs, that is, two (three) real part outputs and one (two) imaginary part output, are calculated.

Due to the symmetries present in the first step outputs (Equation 29), outputs calculated from the external loop (the second step FFT) in Equation 13, 14 are symmetrically arrayed. This can reduce a computational load. An input pattern of the external loop (the second step FFT) is the same as Equations 30 to 33.

1) Real part $$\hat{y}_R(k_1,0)=0, \hat{y}_R(k_1,6)=-\hat{y}_R(k_1,5), \hat{y}_R(k_1,7)=-\hat{y}_R(k_1,4),$$

$$\hat{y}_R(k_1,8)=-\hat{y}_R(k_1,3), \hat{y}_R(k_1,9)=-\hat{y}_R(k_1,2), \hat{y}_R(k_1,10)=-\hat{y}_R(k_1,1) \qquad \text{[Equation 30]}$$

1) Real Part $$\hat{y}_R(k_1,0)=0, \hat{y}_R(k_1,7)=-\hat{y}_R(k_1,6), \hat{y}_R(k_1,8)=-\hat{y}_R(k_1,5), \hat{y}_R(k_1,9)=-\hat{y}_R(k_1,4),$$

$$\hat{y}_R(k_1,10)=-\hat{y}_R(k_1,3), \hat{y}_R(k_1,11)=-\hat{y}_R(k_1,2), \hat{y}_R(k_1,12)=-\hat{y}_R(k_1,1) \qquad \text{[Equation 31]}$$

2) Imaginary Part $$\hat{y}_I(k_1,6)=\hat{y}_I(k_1,5), \hat{y}_I(k_1,7)=\hat{y}_I(k_1,4),$$

$$\hat{y}_I(k_1,8)=\hat{y}_I(k_1,3), \hat{y}_I(k_1,9)=\hat{y}_I(k_1,2), \hat{y}_I(k_1,10)=\hat{y}_I(k_1,1) \qquad \text{[Equation 32]}$$

2) Imaginary Part $$\hat{y}_I(k_1,7)=\hat{y}_I(k_1,6), \hat{y}_I(k_1,8)=\hat{y}_I(k_1,5), \hat{y}_I(k_1,9)=\hat{y}_I(k_1,4),$$

$$\hat{y}_I(k_1,10)=\hat{y}_I(k_1,3), \hat{y}_I(k_1,11)=\hat{y}_I(k_1,2), \hat{y}_I(k_1,12)=\hat{y}_I(k_1,1) \qquad \text{[Equation 33]}$$

Equation 30, 32 indicates input symmetries encountered in an 11-point FFT belonging to a 33-point FFT.

Equation 31, 33 indicates input symmetries encountered in a 13-point FF belonging to a 65-point FFT. According to an external loop iteration, other symmetries are also encountered among input sets of an 11-point FFT (13-point FFT). This enables output recovering for iteration from one of previous iterations.

In the present disclosure, if the vector of $\hat{y}(k_1,n_2)$ is represented as $\hat{Y}(k_1)=[\hat{y}(k_1,0)\ \hat{y}(k_1,1)\ \ldots\ \hat{y}(k_1,N_2-1)]^T = \hat{Y}_R(k_1)+j\cdot\hat{Y}_I(k_1)$, input symmetries present in an iteration process may be represented like Equation 34:

[Equation 34]

$$\hat{Y}_I(k_1)=0 \qquad \text{Case 1:}$$

$$\hat{Y}_R(k_1)=\hat{Y}_R(k'_1), \hat{Y}_I(k_1)=-\hat{Y}_I(k'_1) \qquad \text{Case 2:}$$

In a two-dimensional DFT such as a 33-point FFT (65-point FFT), k1 has a range of [0, 2] ([0, 4]).

In Equation 34, Case 1 occurs only when $k_1=0$. In Equation 34, Case 2 occurs only when $k_1=3-k'_1$, $k'_1=1,2$ ($k_1=5-k'_1$, $k'_1=1,2,3,4$).

From the symmetries in Equation 34, the output of a skipped iteration may be derived from one of previous iterations thereof. Accordingly, the number of valid iterations of an 11-point FFT (15-point FFT) in a 33-point FFT (65-point FFT) can be reduced from 3(5) to 2(3).

Furthermore, according to Equations 8 and 9, the present disclosure may take only the imaginary parts of outputs from a 33-point FFT (65-point FFT). Accordingly, in Equation 34, output patterns of respective cases may be represented like Equations 35 to 38.

[Equation 35]

$$\hat{X}_I(k_1,0)=0, \hat{X}_I(k_1,11-k_2)=-\hat{X}_I(k_1,k_2), k_2=1,2,\ldots,10 \qquad \text{Case 1:}$$

[Equation 36]

$$\hat{X}_I(k_1,0)=0, \hat{X}_I(k_1,13-k_2)=-\hat{X}_I(k_1,k_2), k_2=1,2,\ldots,12 \qquad \text{Case 1:}$$

[Equation 37]

$$\hat{X}_I(k_1,0)=\hat{X}_I(3-k_1,0), \hat{X}_I(k_1,k_2)=-\hat{X}_I(3-k_1,11-k_2), k_1=1,2, k_2=1,2,\ldots,10 \qquad \text{Case 2:}$$

[Equation 38]

$$\hat{X}_I(k_1,0)=-\hat{X}_I(5-k_1,0), \hat{X}_I(k_1,k_2)=-\hat{X}_I(5-k_1,13-k_2), k_1=1,2,3,4, k_2=1,2,\ldots,12 \qquad \text{Case 2:}$$

Equation 35, 37 indicates output symmetries in an 11-point FFT belonging to a 33-point FFT. Equation 36, 38 indicates output symmetries in a 13-point FFT belonging to a 65-point FFT.

Due to symmetries such as Equations 35 to 38, in a two-dimensional DFT, iterations after an external loop become unnecessary. In Equation 8, k indices that are finally output are k=2m+1 from the relation between forward DST7 and a DFT. In this case, the range of m is [0, 15] ([0, 31]) with respect to 16×16 DST7 (32×32 DST7).

FIGS. 27 and 28 are embodiments to which the present disclosure is applied, FIG. 27 illustrates a block diagram of 16×16 DST7 to which a 33-point DFT has been applied, and FIG. 28 illustrates a block diagram of a 32×32 DST7 to which a 65-point DFT has been applied.

Embodiment 5-3: Construction in which a Wingrad FFT Block is Replaced with a Simplified DFT Block The present embodiment proposes a construction using a common DFT instead of a Winograd FFT.

Equations for a common one-dimensional DFT are given like Equations 7 and 8 with respect to a 33-point DFT and a 65-point DFT, respectively. Furthermore, equations for common two-dimensional DFTs corresponding to a 33-point one-dimensional DFT and a 65-point one-dimensional DFT are given as Equations 13 and 14, respectively.

In FIGS. 27 to 28, a first step DFT is a 3-point DFT or a 5-point DFT. A common DFT equation for the first step DFT is as follows.

[Equation 39]

$$\hat{y}(k_1, n_2) = \hat{y}_R(k_1, n_2) + j\cdot\hat{y}_I(k_1, n_2) = \sum_{n_1=0}^{N_1-1} \hat{x}(n_1, n_2) W_{N_1}^{n_1 k_1}$$

$$\hat{y}_R(k_1, n_2) = \sum_{n_1=0}^{N_1-1} \hat{x}(n_1, n_2) \cos\left(\frac{2\pi k_1 n_1}{N_1}\right)$$

$$\hat{y}_I(k_1, n_2) = -\sum_{n_1=0}^{N_1-1} \hat{x}(n_1, n_2) \sin\left(\frac{2\pi k_1 n_1}{N_1}\right)$$

In Equation 39, a 3-point DFT is obtained when $N_1=3$, and a 5-point DFT is obtained when $N_1=5$. According to the symmetries proposed in Equation 21, a corresponding DFT has only to be calculated for a range, that is, $n_2$ is 0~(N2−1)/2, in Equation 34. That is, $N_2=11$ when $N_1=3$, and $N_2=13$ when $N_1=5$.

Case 1 in Equations 25 and 26 corresponds to the simplified 3-point DFT Type 1 of FIG. 27 and the simplified 5-point DFT Type 1 of FIG. 28. This corresponds to a case where $n_2=0$.

The simplified 3-point DFT Type 1 is given like Equation 40.

[Equation 40]

$$\hat{y}_R(k_1, 0) = 0,\ \hat{y}_I(k_1, 0) = -2\hat{x}(1, 0) \sin\left(\frac{2\pi k_1}{3}\right)$$

In Equation 40, only one multiplication is necessary because calculation is necessary for only $k_1=1$. An equation for the simplified 5-point DFT Type 1 is calculated like Equation 41 using the same method.

[Equation 41]

$$\hat{y}_R(k_1, 0) = 0,\ \hat{y}_I(k_1, 0) = -2\hat{x}(1, 0) \sin\left(\frac{2\pi k_1}{5}\right) - 2\hat{x}(2, 0) \sin\left(\frac{2\pi k_1 \cdot 2}{5}\right)$$

In Equation 41, only two multiplications are necessary because calculation is necessary for only the case $k_1=1, 2$. Furthermore, a multiplication 2 output from Equation 40, 41 is not counted as a multiplication because it can be processed by a left shift operation.

Cases 2 in Equation 25 and 26 correspond to the simplified 3-point DFT Type 2 of FIG. 27 and the simplified 5-point DFT Type 2 of FIG. 28, respectively, and correspond to cases where $n_2=1\sim5$ and $n_2=1\sim6$, respectively.

The simplified 3-point DFT Type 2 may be implemented through Equation 39. In this case, if the symmetries of Equation 27 are used, $\hat{y}_R(k_1, n_2)$ has only to be calculated only when $k_1=0$, 1, and $\hat{y}_I(k_1,n_2)$ has only to be calculated only when $k_1=1$.

Likewise, the simplified 5-point DFT Type 2 may be implemented through Equation 39. Likewise, if the symmetries of Equation 28 are used, $\hat{y}_R(k_1,n_2)$ has 5 only to be calculated only when $k1=0$, 1, 2, and $\hat{y}_I(k_1,n_2)$ has only to be calculated only when $k_1=1$, 2.

In FIGS. 27 and 28, a second step DFT is an 11-point DFT or a 13-point DFT. A common DFT equation for the second step DFT is the same as Equation 42.

[Equation 42]

$$\hat{X}(k_1, k_2) = \hat{X}_R(k_1, k_2) + j \cdot \hat{X}_I(k_1, k_2) = \sum_{n_2=0}^{N_2-1} \hat{y}(k_1, n_2) W_{N_2}^{n_2 k_2}$$

$$\hat{X}_I(k_1, k_2) = \sum_{n_2=0}^{N_2-1}\left[\hat{y}_I(k_1, n_2) \cos\left(\frac{2\pi k_2 n_2}{N_2}\right) - \hat{y}_R(k_1, n_2) \sin\left(\frac{2\pi k_2 n_2}{N_2}\right)\right]$$

In Equation 42, the 11-point DFT is obtained when $N_2=11$, and the 13-point DFT is obtained when $N_2=13$. Due to the symmetries proposed in Equations 36 to 38, a corresponding DFT has only to be calculated with respect to only the range in which $k_1$ in Equation 42 is $0\sim(N_1-1)/2$. $N_1=3$ when $N_2=11$, and $N_1=5$ when $N_2=13$.

Case 1 in Equation 34 and Equation 35 correspond to the simplified 11-point DFT Type 1 of FIG. 27. Furthermore, Case 1 of Equation 34 and Equation 36 correspond to the simplified 13-point DFT Type 1 of FIG. 28.

If the symmetries proposed in Equations 30 to 33 are used, a simplified 11-point DFT Type 1 and a simplified 13-point DFT Type 1 are calculated as in Equation 43. That is, this corresponds to a case where $k_1=0$.

[Equation 43]

$$\hat{X}_I(0, k_2) =$$

$$\sum_{n_2=1}^{\frac{N_2-1}{2}} [-2\hat{y}_R(0, n_2)] \sin\left(\frac{2\pi k_2 n_2}{N_2}\right) = -2\sum_{n_2=1}^{\frac{N_2-1}{2}} \hat{y}_R(0, n_2) \sin\left(\frac{2\pi k_2 n_2}{N_2}\right)$$

According to Equation 43, the case of the simplified 11-point DFT Type 1 requires five multiplications, and the case of the simplified 13-point DFT Type 1 requires six multiplications.

Likewise, if the symmetries proposed in Equations 30 to 33 are used, a simplified 11-point DFT Type 2 and a simplified 13-point DFT Type 2 may be obtained like Equation 44. In this case, the simplified 11-point DFT Type 2 are performed when $k_1=1$, and the simplified 13-point DFT Type 2 is performed when $k_1=1$, 2.

[Equation 44]

$$\hat{X}_I(k_1, k_2) = 2\left[\sum_{n_2=1}^{\frac{N_2-1}{2}} \hat{y}_I(k_1, n_2) \cos\left(\frac{2\pi k_2 n_2}{N_2}\right)\right] +$$

$$\hat{y}_I(k_1, 0) - 2\left[\sum_{n_2=1}^{\frac{N_2-1}{2}} \hat{y}_R(k_1, n_2) \sin\left(\frac{2\pi k_2 n_2}{N_2}\right)\right]$$

According to Equation 44, the simplified 11-point DFT Type 2 requires ten multiplications, and the simplified 13-point DFT Type 2 requires twelve multiplications.

In the multiplications appearing in Equations 40 to 44, cosine values and sine values are multiplied as DFT kernel coefficients. Since possible $N_1$ and $N_2$ values are 3, 5, 11, 13, coefficient values as in Equation 45 emerge in corresponding multiplications. In this case, the case where $i=0$ is excluded because a corresponding cosine or sine value has 0 or 1.

[Equation 45]

$$\cos\left(\frac{2\pi i}{3}\right), \sin\left(\frac{2\pi i}{3}\right), i = 1, 2$$

$$\cos\left(\frac{2\pi i}{5}\right), \sin\left(\frac{2\pi i}{5}\right), i = 1, 2, 3, 4$$

$$\cos\left(\frac{2\pi i}{11}\right), \sin\left(\frac{2\pi i}{11}\right), i = 1, 2, 3, 4, 5$$

$$\cos\left(\frac{2\pi i}{13}\right), \sin\left(\frac{2\pi i}{13}\right), i = 1, 2, 3, 4, 5, 6$$

In Equations 43 and 44, since an $n_2$ index increases only up to $(N_2-1)/2$, in the last two cases of Equation 45, an i value is limited to $(N_2-1)/2$.

The number of all coefficients appearing in Equation 45 becomes $2\times(2+4+5+6)=34$, the number of all coefficients for the 33-point DFT is $2\times(2+5)=14$, and the number of all coefficients for the 65-point DFT is $2\times(4+6)=20$. Each coefficient may be approximated in an integer form through scaling and rounding. Input data of DST7 is residual data having an integer form, and thus all of associated calculations may be performed as integer operations. Of course, since intermediate result values will also be scaled values, down scaling needs to be properly in each calculation step or each output step.

Furthermore, forms in which reference is made to a cosine value and a sine value is $$\cos\left(\frac{2\pi k_1 n_1}{N_1}\right), \sin\left(\frac{2\pi k_1 n_1}{N_1}\right), \cos\left(\frac{2\pi k_2 n_2}{N_2}\right), \sin\left(\frac{2\pi k_2 n_2}{N_2}\right).$$

Reference sequence for coefficient values may be different depending on $k_1$ and $k_2$ values.

Accordingly, a reference sequence according to $n_1$ and $n_2$ may be obtained in a table look-up form by producing a sequence table having the values $k_1$ and $k_2$ as addresses. For example, if $$N_2 = 11, k_2 = 3, \lfloor\langle k_2 n_2\rangle_{N_2}\rfloor_{n_2=1,2,\ldots,5} = [3, 6, 9, 1, 4]$$

may become a corresponding table entry. A corresponding table entry for all possible $k_2$ values may be configured.

In FIGS. 27 and 28, a rectangle having a lengthy shape indicated as 16 and 32 performs permutation and sign transform on data. Through the symmetries of the index transform proposed in Equations 15 and 16 and the input data proposed in Equations 25 and 26, each of the Simplified 3-point DFT Type 1, the Simplified 3-point DFT Type 2, the Simplified 5-point DFT Type 1, and the Simplified 5-point DFT Type 2 block in FIGS. 27 and 28 may receive corresponding data. Due to the symmetries of Equations 25 and 26, the sign of some data is converted and input.

Embodiment 6: DST7 Implementation Through Several Scaling Methods

The Simplified 3-point DFT Type 2 of FIG. 27 and the Simplified 5-point DFT Type 2 of FIG. 28 are calculated through Equation 39. More specifically, in Equation 39, a case where $n_2 \neq 0$ occurs and $$\cos\left(\frac{2\pi k_1 n_1}{N_1}\right) \text{ and } \sin\left(\frac{2\pi k_1 n_1}{N_1}\right)$$

include many cases where an absolute value is the same depending on a change in the value $n_1$. Accordingly, as in Equation 39, although the value $n_1$ increases from 0 to $N_1 - 1$, $N_1$ multiplications are not necessary. In Equation 39, when $n_2 \neq 0$ (i.e., the Simplified 3-point DFT Type 2 of FIG. 27 and the Simplified 5-point DFT Type 2 of FIG. 28), it is assumed that an A/the value B is scaled like Equation 46.

$$\frac{A}{B}\hat{y}_R(k_1, n_2) = \frac{A}{B}\sum_{n_1=0}^{N_1-1} \hat{x}(n_1, n_2)\cos\left(\frac{2\pi k_1 n_1}{N_1}\right) = \qquad \text{[Equation 46]}$$

$$\frac{1}{B}\sum_{n_1=0}^{N_1-1} \hat{x}(n_1, n_2)\left[A\cos\left(\frac{2\pi k_1 n_1}{N_1}\right)\right]$$

$$\frac{A}{B}\hat{y}_I(k_1, n_2) =$$

$$-\frac{A}{B}\sum_{n_1=0}^{N_1-1} \hat{x}(n_1, n_2)\sin\left(\frac{2\pi k_1 n_1}{N_1}\right) = \frac{1}{B}\left[-\sum_{n_1=0}^{N_1-1} \hat{x}(n_1, n_2)\left[A\sin\left(\frac{2\pi k_1 n_1}{N_1}\right)\right]\right]$$

As in the 46, the value or $$\cos\left(\frac{2\pi k_1 n_1}{N_1}\right) \text{ or } \sin\left(\frac{2\pi k_1 n_1}{N_1}\right)$$

is a floating-point number having an absolute value equal to or smaller than 1. Accordingly, if the value A is properly multiplied, an integer value or a floating-point number having sufficient accuracy can be generated. In Equation 46, 1/B that is finally multiplied may be calculated based on only a shift operation depending on a value B. Related more detailed contents are described with reference to Embodiment 7.

In Equations 40 and 41, if A/2B is multiplied instead of A/B, Equations 47 and 48 are obtained.

$$\frac{A}{2B}\hat{y}_R(k_1, 0) = 0, \ \frac{A}{2B}\hat{y}_I(k_1, 0) = \frac{1}{B}\left[-\hat{x}(1, 0)\left[A\sin\left(\frac{2\pi k_1}{3}\right)\right]\right] \qquad \text{[Equation 47]}$$

-continued $$\frac{A}{2B}\hat{y}_R(k_1, 0) = 0, \ \frac{A}{2B}\hat{y}_I(k_1, 0) = \qquad \text{[Equation 48]}$$

$$\frac{1}{B}\left[-\hat{x}(1, 0)\left[A\sin\left(\frac{2\pi k_1}{5}\right)\right] - \hat{x}(2, 0)\left[A\sin\left(\frac{2\pi k_1}{5}\right)\right]\right]$$

Even in Equations 47 and 48, an integer value or a floating-point number having sufficient accuracy can be generated by multiplying $$\cos\left(\frac{2\pi k_1 n_1}{N_1}\right) \text{ or } \sin\left(\frac{2\pi k_1 n_1}{N_1}\right)$$

by the value A. 1/B that is finally multiplied may be calculated by only a shift operation based on the value B. Related more detailed contents are described with reference to Embodiment 7.

The Simplified 11-point DFT Type 1 and the Simplified 13-point DFT Type 1 perform the operation (corresponding to $k_1=0$) described in Equation 43. Equation 49 may be obtained by multiplying a value C/2D as a scaling value.

$$\frac{C}{2D}\hat{X}_I(0, k_2) = \frac{1}{D}\sum_{n_2=1}^{\frac{N_2-1}{2}} [-\hat{y}_R(0, n_2)]\left[C\sin\left(\frac{2\pi k_2 n_2}{N_2}\right)\right] \qquad \text{[Equation 49]}$$

$$\frac{A}{B}\frac{C}{2D}\hat{X}_I(0, k_2) = \frac{1}{D}\sum_{n_2=1}^{\frac{N_2-1}{2}} \left[-\frac{A}{B}\hat{y}_R(0, n_2)\right]\left[C\sin\left(\frac{2\pi k_2 n_2}{N_2}\right)\right]$$

As in Equation 49, $$\sin\left(\frac{2\pi k_2 n_2}{N_2}\right)$$

may be multiplied by the value C. An integer or a fixed-point operation may be applied. If A/B, that is, the scaling value multiplied in Equation 46 is considered, as in Equation 49, a total scaling value multiplied into $\hat{X}_I(0,k_2)$ that is, one of the final result data, becomes $$\frac{A}{B}\frac{C}{2D}.$$

Furthermore, the value $$\frac{A}{B}\hat{y}_R(0, n_2)$$

calculated from Equation 46 may be directly applied as an input as in Equation 49.

The Simplified 11-point DFT Type 2 and the Simplified 13-point DFT Type 2 are calculated through Equation 44 (the Simplified 11-point DFT Type 2 is performed when $k_1=1$, and the Simplified 13-point DFT Type 2 is performed when $k_1=1, 2$). As in Equation 49, if C/2D is multiplied as a scaling value, Equation 50 is obtained.

$$\frac{C}{2D}\hat{X}_I(k_1, k_2) = \left[\frac{1}{D}\sum_{n_2=1}^{\frac{N_2-1}{2}} \tilde{y}_I(k_1, n_2)\left[C\cos\left(\frac{2\pi k_2 n_2}{N_2}\right)\right]\right]$$ [Equation 50]

$$+\frac{C}{2D}\hat{y}_I(k_1, 0) + \left[\frac{1}{D}\sum_{n_2=1}^{\frac{N_2-1}{2}} [-\hat{y}_R(k_1, n_2)]\left[C\sin\left(\frac{2\pi k_2 n_2}{N_2}\right)\right]\right]$$

$$\frac{A}{B}\frac{C}{2D}\hat{X}_I(k_1, k_2) = \left[\frac{1}{D}\sum_{n_2=1}^{\frac{N_2-1}{2}} \tilde{y}_I(k_1, n_2)\left[C\cos\left(\frac{2\pi k_2 n_2}{N_2}\right)\right]\right] +$$

$$\left[\frac{1}{D}\sum_{n_2=1}^{\frac{N_2-1}{2}} \left[-\frac{A}{B}\hat{y}_R(k_1, n_2)\right]\left[C\sin\left(\frac{2\pi k_2 n_2}{N_2}\right)\right]\right]$$

where $$\tilde{y}_I(k_1, n_2) = \begin{cases} \frac{A}{2B}\hat{y}_I(k_1, 0) & \text{if } n_2 = 0 \\ \frac{A}{2B}\hat{y}_I(k_1, n_2) & \text{otherwise} \end{cases}$$

Even in Equation 50, as in Equation 49, it may be seen that $$\sin\left(\frac{2\pi k_2 n_2}{N_2}\right) \text{ and } \cos\left(\frac{2\pi k_2 n_2}{N_2}\right)$$

have been multiplied by the value C. Accordingly, an integer or a floating-point operation may be used to multiply a cosine value and a sine value. As in Equation 49, if both the values A/B multiplied in Equation 46 and A/2B multiplied in Equation 47 and Equation 48 are considered, it results as in a second equation in Equation 50. If $\tilde{y}_I(k_1,n_2)$ is defined as in Equation 50, a value obtained through Equations 46 to 48 may be used as input data for Equation 50.

In Equation 50, a possible $k_2$ value is from 0 to 10 in the case of the Simplified 11-point DFT Type 2, and is from 0 to 12 in the case of the Simplified 13-point DFT Type 2. Due to symmetries fundamentally present in a cosine value and a sine value, a relation equation such as Equation 51 is established.

$$f(k_1, k_2) = \frac{1}{D}\sum_{n_2=1}^{\frac{N_2-1}{2}} \tilde{y}_I(k_1, n_2)\left[C\cos\left(\frac{2\pi k_2 n_2}{N_2}\right)\right]$$ [Equation 51]

$$g(k_1, k_2) = \frac{1}{D}\sum_{n_2=1}^{\frac{N_2-1}{2}} \left[-\frac{A}{B}\hat{y}_R(k_1, n_2)\right]\left[C\sin\left(\frac{2\pi k_2 n_2}{N_2}\right)\right]$$

$$\frac{A}{B}\frac{C}{2D}\hat{X}_I(k_1, k_2) = f(k_1, k_2) + g(k_1, k_2) = h(k_1, k_2)$$

$$h(k_1, k_2) = \begin{cases} f(k_1, k_2), & k_2 = 0 \\ f(k_1, k_2) + g(k_1, k_2), & 1 \leq k_2 \leq \frac{N_2-1}{2} \\ f(k_1, N_2-k_2) - g(k_1, N_2-k_2), & \frac{N_2+1}{2} \leq k_2 \leq N_2-1 \end{cases}$$

In Equation 51, an $N_2$ value for the Simplified 11-point DFT Type 2 is 11, and an $N_2$ value for the Simplified 13-point DFT Type 2 is 13. The definition of all the identifiers appearing in Equation 51 is the same as that in Equation 50.

Accordingly, as in Equation 51, only the range of $$0 \leq k_2 \leq \frac{N_2-1}{2}$$

has only to be calculated for $f(k_1,k_2)$, and only the range of $$1 \leq k_2 \leq \frac{N_2-1}{2}$$

has only to be calculated for $g(k_1,k_2)$. According to the same principle, even in Equation 49, only the range of $$1 \leq k_2 \leq \frac{N_2-1}{2}$$

has only to be calculated based on symmetries for $k_2$.

Embodiment 7: Implementation of DST7 Based on Only an Integer or the Floating-Point Operation Through Adjustment of a Scaling Value All scaling values appearing in Embodiment 6 have an A/B form.

$$\cos\left(\frac{2\pi kn}{N}\right) \text{ or } \sin\left(\frac{2\pi kn}{N}\right)$$

is first multiplied by A to enable an integer operation, and 1/B is then multiplied. Furthermore, as in Equation 45, the number of cosine values and sine values appearing in all the equations is limited. Accordingly, corresponding cosine values and sine values may be previously multiplied by the value A and stored in an array or a ROM, and may be used as a table look-up method. Equation 46 may be represented like Equation 52.

[Equation 52]

$$\frac{A}{B}\hat{y}_R(k_1, n_2) = \frac{1}{B}\sum_{n_1=0}^{N_1-1} \hat{x}(n_1, n_2)\left[A\cos\left(\frac{2\pi k_1 n_1}{N_1}\right)\right]$$

$$\frac{A}{B}\hat{y}_I(k_1, n_2) = \frac{1}{B}\left[-\sum_{n_1=0}^{N_1-1} \hat{x}(n_1, n_2)\left[A\sin\left(\frac{2\pi k_1 n_1}{N_1}\right)\right]\right]$$

wherein in $$A\cos\left(\frac{2\pi kn}{N}\right) \text{ or } A\sin\left(\frac{2\pi kn}{N}\right),$$

if a sufficiently large value is multiplied as the value A and then rounded off, a cosine or sine value can be modified into a scaled integer value and accuracy of the value can also be sufficiently maintained. In general, a value of an exponentiation form of 2 ($2^n$) may be used as the value A. For example, $$A \cos\left(\frac{2\pi k n}{N}\right) \text{ or } A \sin\left(\frac{2\pi k n}{N}\right)$$

may be approximated using a method such as Equation 53.

[Equation 53]

$$2^n \cos\left(\frac{2\pi k n}{N}\right) \approx \text{round}\left(2^n \cos\left(\frac{2\pi k n}{N}\right)\right)$$

In Equation 53, the round indicates a rounding operator. The rounding of any method for making an integer is possible, but a common round-off method based on 0.5 may be used.

In Equation 52, to multiply 1/B (i.e., divide by B) may be implemented using a right shift operation if B is an exponentiation form of 2. Assuming that $B=2^m$, as in Equation 54, multiplication for 1/B may be approximated. At this time, as in Equation 54, rounding may be considered, but the present disclosure is not limited thereto.

[Equation 54]

$$\frac{x}{2^m} \approx \begin{cases} x >> m, & \text{when rounding is not considered} \\ (x + (1 << (m-1))) >> m, & \text{when rounding is considered} \end{cases}$$

Meanwhile, the value A multiplied as in Equation 53 does not need to be essentially an exponentiation form of 2. In particular, of a scaling factor of a $$\frac{1}{\sqrt{N}}$$

form has to be additionally multiplied, this needs to be incorporated into the value A.

For example, in Equations 49 to 51, values multiplied as a numerator are A and C. If $$\frac{1}{\sqrt{N}}$$

can be multiplied on one side of A or C and $$\frac{1}{\sqrt{N}} = \alpha\beta,$$

α may be multiplied on the A side, and β may be multiplied on the C side. A is not an exponentiation form. For another example, a value, such as $$2^{\frac{1}{2}},$$

may be additionally multiplied. The reason for this is that in a codec system to which the present disclosure is applied, $$2^{\frac{1}{2}}$$

may be additionally multiplied in order to identically maintain the range of a kernel coefficient value with respect to transforms having all sizes.

As a similar method, Equations 40, 41, 43, and 44 may be properly approximated by only simple operations of Equations 55 to 58, respectively.

[Equation 55]

$$\frac{A}{2B}\hat{y}_R(k_1, 0) = 0, \quad \frac{A}{2B}\hat{y}_1(k_1, 0) = \frac{1}{B}\left[-\hat{x}(1, 0)\left[A \sin\left(\frac{2\pi k_1}{3}\right)\right]\right]$$

[Equation 56]

$$\frac{A}{2B}\hat{y}_R(k_1, 0) = 0, \quad \frac{A}{2B}\hat{y}_1(k_1, 0) =$$

$$\frac{1}{B}\left[-\hat{x}(1, 0)\left[A \sin\left(\frac{2\pi k_1}{5}\right)\right] - \hat{x}(2, 0)\left[A \sin\left(\frac{2\pi k_1}{5}\right)\right]\right]$$

[Equation 57]

$$\frac{A}{B}\frac{C}{2D}\hat{X}_1(0, k_2) = \frac{1}{D}\sum_{n_2=1}^{\frac{N_2-1}{2}}\left[-\frac{A}{B}\hat{y}_R(0, n_2)\right]\left[C \sin\left(\frac{2\pi k_2 n_2}{N_2}\right)\right]$$

[Equation 58]

$$f(k_1, k_2) = \frac{1}{D}\sum_{n_2=1}^{\frac{N_2-1}{2}}\bar{y}_1(k_1, n_2)\left[C \cos\left(\frac{2\pi k_2 n_2}{N_2}\right)\right],$$

$$g(k_1, k_2) = \frac{1}{D}\sum_{n_2=1}^{\frac{N_2-1}{2}}\left[-\frac{A}{B}\hat{y}_R(k_1, n_2)\right]\left[C \sin\left(\frac{2\pi k_2 n_2}{N_2}\right)\right]$$

$$\frac{A}{B}\frac{C}{2D}\hat{X}_1(k_1, k_2) =$$

$$\begin{cases} f(k_1, k_2), & k_2 = 0 \\ f(k_1, k_2) + g(k_1, k_2), & 1 \leq k_2 \leq \frac{N_2-1}{2} \\ f(k_1, N_2-k_2) - g(k_1, N_2-k_2), & \frac{N_2+1}{2} \leq k_2 \leq N_2-1 \end{cases}$$

, where $$\bar{y}_1(k_1, n_2) = \begin{cases} \frac{A}{2B}\hat{y}_1(k_1, 0), & \text{if } n_2 = 0 \\ \frac{A}{B}\hat{y}_1(k_1, n_2), & \text{otherwise} \end{cases}$$

wherein $f(k_1, k_2)$ and $g(k_1, k_2)$ may be calculated only in partial ranges $$\left(\left[0, \frac{N_2-1}{2}\right] \text{ and } \left[1, \frac{N_2-1}{2}\right],$$

respectively) due to symmetries. Accordingly, complexity can be substantially reduced.

Furthermore, the approximation method for the multiplication of the A and the approximation method for the multiplication of the 1/B may also be applied to Equations 47 to 51.

In DST7 having a length 8, 16, or 32, an approximation implementation example for a scaling factor multiplication is the same as Table 24. A, B, C, and D appearing in Table 24 are the same as A, B, C, and n appearing in Equations 46 to 51. A shift is a value introduced into the DST7 function as a factor, and may be a value determined based on a method of performing quantization (or inverse quantization) performed after a transform (or before an inverse transform).

TABLE 24

| Config. | | Original | Approximation |
|---|---|---|---|
| 8 × 8 DST7 | 17-pt DFT | $A\sin\left(\frac{2\pi k}{17}\right), k = 1, 2, \ldots, 8$ | $\text{round}\left\{\frac{1}{\sqrt{17}} \cdot 2^{\frac{1}{2}} \cdot \sin\left(\frac{2\pi k}{17}\right) \cdot 2^{10}\right\}, k = 1, 2, \ldots, 8$ |
| | | $1/B = 2^{-shift}$ | $(x + (1 << (shift - 1))) >> shift$ |
| 16 × 16 DST7 | 3-pt DFT | $A\sin\left(\frac{2\pi k}{3}\right), k = 1$ | $\text{round}\left\{\sin\left(\frac{2\pi k}{3}\right) \cdot 2^{9}\right\}, k = 1$ |
| | | $1/B = 2^{-10}$ | $(x + (1 << 9)) >> 10$ |
| | 11-pt DFT | $C\sin\left(\frac{2\pi k}{11}\right), k = 1, 2, \ldots, 5$ | $\text{round}\left\{\frac{1}{\sqrt{33}} \cdot \sin\left(\frac{2\pi k}{11}\right) \cdot 2^{11}\right\}, k = 1, 2, \ldots, 5$ |
| | | $C\cos\left(\frac{2\pi k}{11}\right), k = 0, 1, \ldots, 5$ | $\text{round}\left\{\frac{1}{\sqrt{33}} \cdot \cos\left(\frac{2\pi k}{11}\right) \cdot 2^{11}\right\}, k = 0, 1, \ldots, 5$ |
| | | $1/D = 2^{-(shift-1)}$ | $(x + (1 << (shift - 2))) >> (shift - 1)$ |
| 32 × 32 DST7 | 5-pt DFT | $A\sin\left(\frac{2\pi k}{5}\right), k = 1, 2$ | $\text{round}\left\{\sin\left(\frac{2\pi k}{5}\right) \cdot 2^{9}\right\}, k = 1, 2$ |
| | | $A\cos\left(\frac{2\pi k}{5}\right), k = 1, 2$ | $\text{round}\left\{\cos\left(\frac{2\pi k}{5}\right) \cdot 2^{9}\right\}, k = 1, 2$ |
| | | $1/B = 2^{-10}$ | $(x + (1 << 9)) >> 10$ |
| | 13-pt DFT | $C\sin\left(\frac{2\pi k}{13}\right), k = 1, 2, \ldots, 6$ | $\text{round}\left\{\frac{1}{\sqrt{65}} \cdot 2^{\frac{1}{2}} \cdot \sin\left(\frac{2\pi k}{13}\right) \cdot 2^{11}\right\}, k = 1, 2, \ldots, 6$ |
| | | $C\cos\left(\frac{2\pi k}{13}\right), k = 0, 1, \ldots, 6$ | $\text{round}\left\{\frac{1}{\sqrt{65}} \cdot 2^{\frac{1}{2}} \cdot \cos\left(\frac{2\pi k}{13}\right) \cdot 2^{11}\right\}, k = 0, 1, \ldots, 6$ |
| | | $1/D = 2^{-(shift-1)}$ | $(x + (1 << (shift - 2))) >> (shift - 1)$ |

Table 25 is an example in which a scaling value different from that of Table 24 is applied. That is, a scaling value obtained by multiplying scaling in Table 24 by ¼ is used.

TABLE 25

| Config. | | Original | Approximation |
|---|---|---|---|
| 8 × 8 DST7 | 17-pt DFT | $A\sin\left(\frac{2\pi k}{17}\right), k = 1, 2, \ldots, 8$ | $\text{round}\left\{\frac{1}{\sqrt{17}} \cdot 2^{\frac{1}{2}} \cdot \sin\left(\frac{2\pi k}{17}\right) \cdot 2^{8}\right\}, k = 1, 2, \ldots, 8$ |
| | | $1/B = 2^{-shift}$ | $(x + (1 << (shift - 1))) >> shift$ |
| 16 × 16 DST7 | 3-pt DFT | $A\sin\left(\frac{2\pi k}{3}\right), k = 1$ | $\text{round}\left\{\sin\left(\frac{2\pi k}{3}\right) \cdot 2^{7}\right\}, k = 1$ |
| | | $1/B = 2^{-10}$ | $(x + (1 << 7)) >> 8$ |
| | 11-pt DFT | $C\sin\left(\frac{2\pi k}{11}\right), k = 1, 2, \ldots, 5$ | $\text{round}\left\{\frac{1}{\sqrt{33}} \cdot \sin\left(\frac{2\pi k}{11}\right) \cdot 2^{9}\right\}, k = 1, 2, \ldots, 5$ |
| | | $C\cos\left(\frac{2\pi k}{11}\right), k = 0, 1, \ldots, 5$ | $\text{round}\left\{\frac{1}{\sqrt{33}} \cdot \cos\left(\frac{2\pi k}{11}\right) \cdot 2^{9}\right\}, k = 0, 1, \ldots, 5$ |
| | | $1/D = 2^{-(shift-1)}$ | $(x + (1 << (shift - 2))) >> (shift - 1)$ |

TABLE 25-continued

| Config. | | Original | Approximation |
|---|---|---|---|
| 32 × 32 DST7 | 5-pt DFT | $A \sin\left(\frac{2\pi k}{5}\right), k = 1, 2$ | $\text{round}\left\{\sin\left(\frac{2\pi k}{5}\right) \cdot 2^7\right\}, k = 1, 2$ |
| | | $A \cos\left(\frac{2\pi k}{5}\right), k = 1, 2$ | $\text{round}\left\{\cos\left(\frac{2\pi k}{5}\right) \cdot 2^7\right\}, k = 1, 2$ |
| | | $1/B = 2^{-10}$ | $(x + (1 << 7)) >> 8$ |
| | 13-pt DFT | $C \sin\left(\frac{2\pi k}{13}\right), k = 1, 2, \ldots, 6$ | $\text{round}\left\{\frac{1}{\sqrt{65}} \cdot 2^{\frac{1}{2}} \cdot \sin\left(\frac{2\pi k}{13}\right) \cdot 2^9\right\}, k = 1, 2, \ldots, 6$ |
| | | $C \cos\left(\frac{2\pi k}{13}\right), k = 0, 1, \ldots, 6$ | $\text{round}\left\{\frac{1}{\sqrt{65}} \cdot 2^{\frac{1}{2}} \cdot \cos\left(\frac{2\pi k}{13}\right) \cdot 2^9\right\}, k = 0, 1, \ldots, 6$ |
| | | $1/D = 2^{-(shift-1)}$ | $(x + (1 << (shift - 2))) >> (shift - 1)$ |

FIG. 29 is an embodiment to which the present disclosure is applied, and illustrates an encoding flowchart in which forward discrete sine transform-7 (DST7) and forward discrete cosine transform-8 (DCT8) are performed as discrete Fourier transforms (DFT).

The encoder may determine (or select) a horizontal transform and/or a vertical transform based on at least one of a prediction mode, a block shape and/or a block size of a current block (S2910). In this case, a candidate for the horizontal transform and/or the vertical transform may include at least one of the embodiments of FIG. 6.

The encoder may determine an optimal horizontal transform and/or an optimal vertical transform through rate distortion (RD) optimization. The optimal horizontal transform and/or the optimal vertical transform may correspond to one of a plurality of transforms combinations, and the plurality of transforms combination may be defined by a transform index.

The encoder may signal a transform index corresponding to the optimal horizontal transform and/or the optimal vertical transform (S2920). In this case, other embodiments described in the present disclosure may be applied to the transform index. For example, at least one of the embodiments of FIG. 6 may be included.

For another example, a horizontal transform index for the optimal horizontal transform and a vertical transform index for the optimal vertical transform may be independently signaled.

The encoder may perform a forward transform on the current block in a horizontal direction using the optimal horizontal transform (S2930). In this case, the current block may mean a transform block, and the optimal horizontal transform may be forward DCT8.

Furthermore, the encoder may perform a forward transform on the current block in a vertical direction using the optimal vertical transform (S2940). In this case, the optimal vertical transform may be forward DST7, and the forward DST7 may be designed as a DFT.

In the present embodiment, after a horizontal transform is performed, a vertical transform is performed, but the present disclosure is not limited thereto. That is, after a vertical transform is performed, a horizontal transform may be performed.

In an embodiment, a combination of the horizontal transform and the vertical transform may include at least one of the embodiments of FIG. 6.

Meanwhile, the encoder may generate a transform coefficient block by performing quantization on the current block (S2950).

The encoder may generate a bit stream by performing entropy encoding on the transform coefficient block.

FIG. 30 is an embodiment to which the present disclosure is applied, and illustrates a decoding flowchart in which inverse discrete sine transform-7 (DST7) and inverse discrete cosine transform-8 (DCT8) are performed as discrete Fourier transforms (DFT).

The decoder may obtain a transform index from a bit stream (S3010). In this case, other embodiments described in the present disclosure may be applied to the transform index. For example, at least one of the embodiments of FIG. 6 may be included.

The decoder may derive a horizontal transform and a vertical transform corresponding to the transform index (S3020). In this case, a candidate for the horizontal transform and/or the vertical transform may include at least one of the embodiments of FIG. 6.

In this case, steps S3010 and S3020 are embodiments, and the present disclosure is not limited thereto. For example, the decoder may derive a horizontal transform and a vertical transform based on at least one of a prediction mode, a block shape and/or a block size of the current block. For another example, the transform index may include a horizontal transform index corresponding to the horizontal transform and a vertical transform index corresponding to the vertical transform.

Meanwhile, the decoder may obtain a transform coefficient block by entropy-decoding the bit stream, and may perform inverse quantization on the transform coefficient block (S3030).

The decoder may perform an inverse transform on the inverse quantized transform coefficient block in a vertical direction using the vertical transform (S3040). In this case, the vertical transform may correspond to DST7. That is, the decoder may apply inverse DST7 on the inverse quantized transform coefficient block.

The present disclosure provides a method of designing forward DST7 and/or inverse DST7 as a discrete Fourier transform (DFT).

The decoder may implement DST7 through a one-dimensional DFT or a two-dimensional DFT.

Furthermore, the decoder may implement DST7 using only an integer operation by applying various scaling methods.

Furthermore, the decoder may design DST7 having a length 8, 16, or 32 through a method of implementing DST7 using a DFT and a method of implementing DST7 using only n integer operation.

In an embodiment, the decoder may derive a transform combination corresponding to a transform index, and may perform an inverse transform on a current block in a vertical or horizontal direction using DST7 or DCT8. In this case, the transform combination may be composed of a horizontal transform and a vertical transform. The horizontal transform and the vertical transform may correspond to any one of the DST7 or the DCT8.

In an embodiment, when a 33-point discrete Fourier transform (DFT) is applied to the DST7, the step of dividing one row or one column of the DST7 into two partial vector signals; and the step of applying 11-point DFT type 1 or 11-point DFT type 2 to the two partial vector signals may be included.

In an embodiment, when one row or one column of the DST7 is represented as src[0 . . . 15], the two partial vector signals may be divided into src[0 . . . 4] and src[5 . . . 15].

In an embodiment, when 65-point discrete Fourier transform (DFT) is applied to the DST7, the step of dividing one row or one column of the DST7 into three partial vector signals; and the step of applying 13-point DFT type 1 or 13-point DFT type 2 to the three partial vector signals may be included.

In an embodiment, when one row or one column of the DST7 is represented as src[0 . . . 31], the three partial vector signals may be divided into src[0 . . . 5], src[6 . . . 18] and src[19 . . . 31].

In an embodiment, 13-point DFT type 1 may be applied to src[0 . . . 5] of the three partial vector signals, and 13-point DFT type 2 may be applied to src[6 . . . 18] and src[19 . . . 31] thereof.

In an embodiment, a one-dimensional 65-point DFT necessary for a one-dimensional 33-point DFT and 32×32 DST7 necessary for 16×16 DST7 may be decomposed into equivalent two-dimensional DFTs having a shorter DFT. As described above, redundancy calculation can be removed and low complexity DST7 can be designed by executing DST7 by a DFT.

Furthermore, the decoder may perform an inverse transform in a horizontal direction using the horizontal transform (S3050). In this case, the horizontal transform may correspond to DCT8. That is, the decoder may apply inverse DCT8 to the inverse quantized transform coefficient block.

In the present embodiment, after the vertical transform is applied, the horizontal transform is applied, but the present disclosure is not limited thereto. That is, after the horizontal transform is applied, the vertical transform may be applied.

In an embodiment, a combination of the horizontal transform and the vertical transform may include at least one of the embodiments of FIG. 6.

The decoder generates a residual block through step S3050, and generates a reconstruction block by adding the residual block and a prediction block.

Hereinafter, an overall transform process according to an embodiment proposed in the present disclosure is described. That is, the embodiments described with reference to FIGS. 1 to 30 may be applied to a transform process described hereinafter.

In an embodiment of the present disclosure, the decoder may derive a residual sample (or residual sample array) of a current transform block by performing a transform process. The decoder is basically described for convenience of description, but the present disclosure is not limited thereto.

A transform process according to an embodiment of the present disclosure may be applied to the encoder substantially identically.

In an embodiment of the present disclosure, a transform process may receive at least one of the following variables (or marks or parameters).

Luma location (xTbY, yTbY) indicative of a top left luma sample (or coordinates, location of the top left luma sample) of a current luma transform block based on the top left luma sample of a current picture.

In this case, xTbY indicates horizontal direction coordinates of the top left luma sample of the current luma transform block, and yTbY indicates vertical direction coordinates of the top left luma sample of the current luma transform block.

Variable hTbS indicative of a horizontal size (or width) of the current transform block Variable vTbS indicative of a vertical size (or the height) of the current transform block Variable cIdx indicative of a colour component of a current block (hTbS)×(vTbS) inverse quantized transform coefficient array having an element d[x][y]

Furthermore, the transform process may output an (hTbS)×(vTbS) residual sample array having an element r[x][y].

If a cIdx value is 0, a minimum value coeffMin of a transform coefficient may be set as a minimum value CoeffMinY of a luma component coefficient, and a maximum value CoeffMax of the transform coefficient may be set as a maximum value CoeffMaxY of the luma component coefficient. If not, the minimum value of the transform coefficient may be set as a minimum value CoeffMinC of a chroma component coefficient, and the maximum value of the transform coefficient may be set as a maximum value CoeffMaxC of the chroma component coefficient.

In an embodiment of the present disclosure, the encoder/decoder may derive a transform type (or transform kernel) in a horizontal direction and/or a vertical direction, which is used for a primary transform (or core transform) of a current transform block, based on an MTS syntax (or syntax element) indicating whether MTS is applied to the current transform block. For example, the derived transform type may be derived using at least one of a prediction mode of the current transform block, a width/height of the current transform block, an MTS syntax or cIdx.

In the present disclosure, a case where MTS is applied and a case where MTS is not applied are divided and described, but the present disclosure is not limited to such an expression. For example, whether to apply MTS may have the same meaning as whether another transform type other than a predefined specific transform type (may be denoted as a basic transform type or a default transform type) is used. If MTS is applied, another transform type (e.g., any one of a plurality of transforms types or two or more combined transform types) other than the default transform type may be used for a transform. If MTS is not applied, a default transform type may be used for a transform. In an embodiment, the default transform type may be configured (or defined) as DCT2.

For example, an MTS flag syntax indicating whether MTS is applied to a current transform block and an MTS index syntax indicating a transform type applied to a current block if the MTS is applied may be individually transmitted from the encoder to the decoder. For another example, a syntax (e.g., MTS index) including both whether MTS is applied to a current transform block and a transform type applied to a current block if MTS is applied may be transmitted from the encoder to the decoder. That is, in the latter embodiment, a syntax (or syntax element) indicating a transform type applied to a current transform block (or unit) within the entire transform type group (or transform type set) including the default transform type may be transmitted from the encoder to the decoder. Accordingly, despite such an expression, a syntax (MTS index) indicating a transform type applied to a current transform block may include information on whether MTS is applied. In other words, in the latter embodiment, only an MTS index can be signaled without an MTS flag. In this case, DCT2 may be interpreted as being included in the MTS. However, hereinafter, in the disclosure, a case where DCT2 is applied is described as not applying MTS. Even though, a technical scope of MTS is not limited to corresponding definition contents.

Furthermore, as described above, MTS may use at least two transform types. In an embodiment of the present disclosure, a case where a total of three transform types of DCT2, DST7, and DCT8 are used is basically described, but the present disclosure is not limited thereto. In an embodiment, in order to indicate a transform type, an index of 0(DCT2), 1(DST7), or 2(DCT8) may be assigned.

In an embodiment, when an MTS syntax value indicating whether MTS is applied to a current transform block is 0, a transform type may be set to 0. If not, the transform type may be derived according to Table 26 below. In other words, when the MTS syntax value is 0, the transform type is set to 0. If not, the transform type may be set to 1 or 2 with respect to each of a horizontal/vertical direction.

Referring to Table 27, when an MTS index is 0, MTS may not be applied. In this case, a transform type applied to a horizontal/vertical direction may be determined (or set) as 0. Meanwhile, when an MTS index is not 0, MTS may be applied. In this case, as in Table 27, a transform type applied to a horizontal/vertical direction may be determined (or set) as 1 or 2 based on an MTS index value.

When the transform type in the horizontal/vertical direction is determined according to the aforementioned method, an (hTbS)×(vTbS) array of a residual sample may be derived according to the following method.

First, by invoking a one-dimensional transform process for each column, each column (i.e., vertical direction) of an inverse quantized transform coefficient d[x][y](wherein x=0 . . . hTbS−1, y=0 . . . vTbS−1) may be (inverse) transformed into e[x][y](wherein x=0 . . . hTbS−1, y=0 . . . vTbS−1). The e[x][y] indicates a coefficient (or list) inverse-transformed in a vertical direction. The one-dimensional transform process may receive, as inputs, the height of a current transform block, a column (or list) d[x][y] of an inverse quantized transform coefficient, and a vertical direction transform type, and may output the e[x][y] (y=0 . . . vTbS−1).

Second, an intermediate sample value g[x][y] (wherein x=0 . . . hTbS−1, y=0 . . . vTbS−1) may be derived using Equation 59.

$$g[x][y]=\text{Clip3}(\text{coeffMin},\text{coeffMax},(e[x][y]+64)>>7) \quad \text{[Equation 59]}$$

Referring to Equation 59, an intermediate sample value (or an intermediate transform coefficient value) after an inverse transform has been performed in the vertical direc-

TABLE 26

| | | | TrType | | | |
|---|---|---|---|---|---|---|
| | | | MODE_INTRA | | MODE_INTER | |
| _cu_flag[xTbY][yTbY] | mts_hor_mode[xTbY][yTbY] | mts_ver_mode[xTbY][yTbY] | Horizontal | Vertical | Horizontal | Ver |
| 1 | 0 | 0 | 1 | 1 | 2 | |
| 0 | 0 | 1 | 2 | 1 | 1 | |
| | 1 | 0 | 1 | 2 | 2 | |
| | 1 | 1 | 2 | 2 | 1 | |

Referring to Table 26, in an embodiment, a syntax (i.e., MTS flag) indicating whether to apply MTS may be first parsed. If MTS is not applied, a transform type of a current transform block may be determined as 0. If MTS is applied, a syntax (or syntax element) indicating a transform type (TrType) may be parsed with respect to a horizontal/vertical direction. If MTS is applied, the transform type applied to the horizontal/vertical direction may be determined as 1 or 2.

In another embodiment, as described above, a syntax (i.e., MTS index) indicating a transform type applied to a current transform block within the entire transform type group including a default transform type may be transmitted. In such a case, unlike in Table 26, a transform type when MTS is applied and a transform type when MTS is not applied may be determined as in Table 27 based on an MTS index without MTS flag parsing.

TABLE 27

| Mts Idx | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 | tion may be determined as a value clipped from a scaled e[x][y] value between a minimum value coeffMin of a predefined coefficient and a maximum value coeffMax of the coefficient.

Third, each row (i.e., horizontal direction) of a result array (i.e., intermediate sample) g[x][y] (wherein x=0 . . . hTbS−1, y=0 . . . vTbS−1) may be (inverse) transformed into r[x][y] (wherein x=0 . . . hTbS−1, y=0 . . . vTbS−1) by invoking a one-dimensional transform process for each row. The r[x][y] indicates a coefficient (or list) inverse-transformed in a horizontal direction. The one-dimensional transform process may receive, as inputs, the width of a current transform block, a row (or list) g[x][y] of an intermediate sample array, and a horizontal direction transform type, and may output the r[x][y] (x=0 . . . hTbS−1).

Hereinafter, a one-dimensional transform process applied in a horizontal or vertical direction is described.

A one-dimensional transform process according to an embodiment of the present disclosure may be applied in a horizontal or vertical direction.

If a one-dimensional process for a column (i.e., vertical direction) is invoked, a one-dimensional transform process may receive the following variables (or marks or parameters) as inputs.

Variable vTbS indicating a vertical size (or height) of a scaled (or inverse quantized) transform coefficient (or transform block)

List of a scaled transform coefficient x having an element x[j] (j=0 . . . nTbs−1)

Transform type variable trType

Furthermore, a one-dimensional transform process for the column may output a list of inverse transformed samples having an element y[i] (i=0 . . . nTbs−1).

In contrast, when a one-dimensional process for a row (i.e., horizontal direction) is invoked, a one-dimensional transform process may receive the following variables (or marks or parameters) as inputs.

Variable hTbS indicating a horizontal size (or width) of a scaled (or inverse quantized) transform coefficient (or transform block)

List of scaled transform coefficients x having an element x[j] (j=0 . . . nTbs−1)

Transform type variable trType

Furthermore, a one-dimensional transform process for the row may output a list of inverse transformed samples having an element y[i] (i=0 . . . nTbs−1).

In an embodiment, a transform matrix may be applied as follows based on a value of a transform type.

If the transform type is 0, Equation 60 may be applied to a scaled transform coefficient list.

$$y[i]=\Sigma_{j=0}^{nTbs-1} \text{transMatrix}[0][i][j*2^{6-\cdots 2(\cdots)}]*x[j]$$
with $i=0 \ldots nTbS-1$ [Equation 60]

Referring to Equation 60, if a transform type applied to a current transform block is 0, a predefined transform matrix may be applied. For example, if the transform type is 0, a transform matrix may be defined like Table 28 below.

TABLE 28

{
{256 256 256 256 256 256 256 256 256 256 256 256 256 256 256 256 256 256 256 256 256 256 256 256 256 256 256 256 256 256 256 256 256 256 256 256 256 256 256 256 256 256 256 256 256 256 256 256 256 256 256 256 256 256 256 256 256 256 256 256 256 256 256 256 }
{362 361 359 357 353 349 344 338 331 323 315 304 294 285 274 262 250 236 223 208 194 176 143 147 130 114 97 79 62 44 27 9 −9 −27 −44 −62 −79 −97 −114 −130 −147 −163 −178 −154 −208 −223 −236 −250 −262 −274 −285 −296 −306 −315 −323 −331 −338 −344 −349 −353 −357 −359 −361 −362 }
{362 358 351 341 327 311 291 268 243 216 186 155 122 88 53 18 −18 −53 −88 −122 −155 −186 −215 −243 −268 −291 −311 −327 −341 −351 −3} −352 −362 −358 −351 −341 −327 −311 −291 −268 −243 −216 −186 −155 −122 −88 −53 −18 18 53 88 122 155 186 216 243 268 291 311 327 341 351 359 362 }
{361 353 338 315 285 250 208 163 114 62 9 −44 −97 −147 −194 −235 −274 −306 −331 −349 −359 −362 −357 −344 −323 −296 −262 −223 −176 −00 −79 −27 27 79 130 176 223 262 296 121 344 357 362 354 349 331 306 274 236 194 147 97 44 −9 −62 −114 −163 −208 −250 −265 −315 −339 −353 −361 }
{360 346 319 210 230 171 105 35 −35 −105 −171 −230 −280 −319 −344 −360 −360 −346 −319 −280 −230 −171 −105 −35 35 105 171 230 280 319 346 360 360 346 319 280 230 171 105 35 −35 −105 −171 −230 −280 −315 −346 −360 −360 −346 −319 −280 −230 −171 −105 −35 35 105 171 230 280 319 346 360 }
{359 338 296 236 163 79 −9 −97 −178 −250 −306 −344 −361 −357 −331 −285 −223 −147 −62 27 114 194 262 315 349 362 353 323 274 208 130 44 −44 −130 −208 −274 −323 −353 −362 −349 −315 −262 −194 −114 −27 62 147 223 265 331 357 361 344 306 250 178 97 9 −79 −163 −236 −296 −338 −359 }
{358 327 268 186 86 −18 −122 −216 −291 −341 −362 −351 −311 −243 −155 −53 53 155 243 311 351 362 341 291 216 122 18 −88 −186 −268 −327 −358 −358 −327 −268 −186 −88 18 122 216 291 341 362 351 311 243 155 53 −53 −155 −243 −311 −351 −362 −341 −291 −216 −122 −18 88 186 268 327 358 }
{357 315 236 130 9 −114 −223 −306 −353 −359 −323 −250 −147 −27 97 208 296 349 361 331 262 163 44 −79 −194 −285 −344 −362 −338 −274 −178 −62 62 178 274 338 362 344 265 194 79 −44 −163 −262 −331 −361 −349 −296 −208 −97 27 147 250 323 359 353 306 223 114 −9 −130 −236 −315 −357 }
{355 301 201 71 −71 −201 −301 −355 −355 −301 −201 −71 71 201 301 355 355 301 201 71 −71 −201 −301 −355 −355 −301 −201 −71 71 201 301 355 355 301 201 71 −71 −201 −301 −355 −355 −301 −201 −71 71 201 301 355 355 301 201 71 −71 −201 −301 −355 −355 −301 −201 −71 71 201 301 355 }
{353 285 163 9 −147 −274 −349 −357 −296 −178 −27 130 262 344 359 306 194 44 −114 −250 −338 −361 −315 −208 −62 97 236 331 362 323 223 79 −79 −223 −323 −162 −331 −236 −97 62 208 315 361 338 250 114 −44 −194 −306 −359 −344 −262 −130 27 178 296 357 349 274 147 −9 −163 −285 −353 }
{351 268 122 −53 −216 −327 −362 −311 −186 −18 155 291 358 341 243 88 −88 −243 −341 −355 −291 −155 18 186 311 362 327 216 53 −122 −268 −351 −351 −268 −122 53 216 327 362 311 186 18 −155 −291 −358 −341 −243 −88 88 243 341 358 291 155 −18 −186 −311 −362 −327 −216 −53 122 268 351 }
{349 250 79 −114 −274 −357 −335 −223 −44 147 296 361 323 194 9 −178 −315 −362 −306 −163 27 208 331 359 285 130 −62 −236 −344 −353 −262 −97 97 262 353 344 236 62 −130 −295 −359 −331 −228 −27 163 306 362 315 178 −9 −194 −323 −361 −296 −147 44 223 338 357 274 114 −79 −250 −349 }
{346 230 35 −171 −319 −260 −280 −105 105 280 360 319 171 −35 −230 −346 −346 −230 −35 171 319 360 280 105 −105 −280 −360 −319 −171 35 230 346 346 230 35 −171 −319 −360 −280 −105 105 280 360 319 171 −35 −230 −346 −346 −230 −35 171 319 360 280 105 −105 −280 −360 −319 −171 35 230 346 }
{344 208 −9 −223 −349 −338 −194 27 236 353 331 178 −44 −250 −357 −323 −161 62 262 359 315 147 −79 −274 −361 −306 −130 97 285 362 296 114 −114 −296 −362 −285 −97 130 306 361 274 79 −147 −315 −359 −262 −62 163 323 357 250 44 −178 −331 −353 −236 −27 194 338 349 223 9 −246 −344 }

TABLE 28-continued

{341 186 −53 −268 −362 −291 −88 155 327 351 216 −18 −243 −358 −311 −122 122 311
358 243 18 −216 −351 −327 −155 88 291 262 268 53 −186 −341 −341 −186 53 268 362
291 88 −155 −327 −351 −215 18 243 358 311 122 −122 −311 −358 −243 −18 216 351
327 155 −88 −291 −362 −268 −63 186 341  }
{338 163 −97 −306 −357 −223 27 262 362 274 44 −208 −353 −315 −114 147 331 344
178 −79 −296 −359 −236 9 250 361 285 62 −194 −349 −323 −130 130 323 349 194 −42
−285 −361 −250 −9 236 359 296 79 −178 −344 −331 −147 114 315 353 208 −44 −274
−362 −262 −27 223 357 306 97 −163 −338  }
{334 139 −139 −334 −334 −139 139 334 334 139 −139 −134 −334 −139 139 334 334 139
−139 −334 −334 −139 139 334 334 139 −139 −334 −334 −139 139 334 334 139 −139
−334 −334 −139 139 334 334 139 −139 −334 −334 −139 139 334 334 139 −139 −334 −334
−139 139 334 334 139 −139 −334 −334 −139 139 334  )
{331 114 −179 −353 −296 −44 236 362 250 −27 −285 −357 −194 97 323 338 130 −163
−349 −306 −62 223 361 262 −9 −274 −359 −208 79 315 344 147 −143 −344 −315 −79 208
359 274 9 −262 −361 −223 62 306 345 163 −130 −336 −323 −97 194 357 285 27 −250
−362 −236 44 296 353 178 −114 −331    )
{327 88 −215 −362 −243 53 311 341 122 −186 −358 −268 18 291 351 155 −155 −351
−291 −18 268 358 166 −122 −341 −311 −53 243 362 216 −88 −327 −327 −88 216 362 243
−53 −311 −341 −122 186 358 268 −18 −291 −351 −155 155 351 291 18 −268 −358 −186
122 341 311 53 −243 −362 −216 88 327  }
{323 62 −250 −359 −179 143 353 274 −27 −306 −338 −97 223 362 208 −114 −344 −296
−9 285 349 130 −194 −361 −236 79 331 315 44 −262 −357 −163 163 353 262 −44 −315
−331 −79 236 361 194 −130 −344 −285 9 246 344 114 −208 −362 −223 97 338 306 27
−274 −353 −147 178 359 250 −62 −323  }
{319 35 −290 −346 −105 230 360 171 −171 −360 −230 105 346 260 −35 −319 −319 −35
280 346 105 −230 −360 −171 171 360 230 −105 −346 −280 35 319 319 35 −280 −346
−105 230 360 171 −171 −360 −230 105 346 260 −35 −319 −319 −35 280 346 105 −230
−360 −171 171 360 230 −105 −345 −280 35 319  }
{315 9 −306 −323 −27 296 331 44 −285 −338 −62 274 344 39 −262 −349 −97 250 353
114 −236 −357 −130 223 359 147 −208 −361 −163 194 362 178 −178 −362 −194 163 361
208 −147 −359 −223 130 357 236 −114 −353 −250 97 349 262 −79 −344 −274 62 338
285 −44 −331 −296 27 323 306 −9 −315  }
{311 −18 −327 −291 53 341 268 −88 −351 −243 122 358 216 −155 −362 −186 186 362
155 −216 −358 −122 243 151 88 −268 −341 −53 291 327 18 −311 −311 18 327 291 −53
−341 −268 88 351 243 −122 −358 −216 155 362 186 −186 −362 −155 216 358 122 −243
−351 −68 268 341 53 −291 −327 −18 311  }
{306 −44 −344 −250 130 361 178 −208 −357 −97 274 331 9 −323 −285 79 353 223 −163
−362 −147 236 349 62 −296 −315 27 338 262 −114 −359 −194 194 359 114 −262 −338
−27 315 296 −62 −349 −236 147 362 163 −223 −353 −79 285 323 −9 −331 −274 97 357
208 −178 −361 −130 250 344 44 −306  }
{301 −71 −355 −201 201 355 71 −301 −301 71 355 201 −201 −355 −71 301 301 −71
−355 −201 201 355 71 −301 −301 71 355 201 −201 −355 −31 301 301 −71 −355 −201 201
355 71 −301 −301 71 355 201 −201 −355 −71 301 301 −71 −355 −201 201 355 71 −301
−301 71 355 201 −201 −355 −71 301  }
{296 −97 −361 −147 262 323 −44 −353 −194 223 344 9 −338 −236 118 357 62 −315
−274 130 362 114 −285 −306 79 359 163 −250 −331 27 349 208 −208 −349 −27 331 250
−163 −359 −79 306 285 −114 −362 −130 274 315 −62 −357 −178 236 338 −9 −344 −223
194 353 44 −323 −262 147 361 97 −296  }
{291 −122 −362 −88 311 258 −155 −358 −53 327 243 −186 −351 −18 341 216 −216 −341
18 351 186 −243 −327 53 358 155 −268 −311 86 362 122 −291 −291 122 362 88 −311
−268 155 358 53 −327 −243 186 351 18 −341 −216 216 341 −18 −351 −186 243 327 −53
−358 −155 268 311 −88 −382 −122 291  }
{285 −147 −357 −27 344 194 −250 −315 97 362 79 −323 −236 208 338 −44 −359 −130
296 274 −163 −353 −9 344 178 −262 −306 114 361 62 −331 −223 223 331 −62 −361
−114 306 262 −178 −349 9 353 163 −274 −296 130 359 44 −338 −200 236 323 −79 −362
−97 315 250 −194 −344 27 357 147 −285  }
{280 −171 −346 35 360 105 −319 −230 230 319 −105 −360 −35 346 171 −280 −250 171
346 −35 −360 −105 319 230 −233 −319 105 360 35 −346 −171 280 280 −171 −346 35
360 105 −319 −230 230 319 −105 −360 −35 346 171 −280 −280 171 346 −35 −360 −105
319 230 −230 −319 105 360 35 −346 −171 280  }
{274 −194 −331 97 359 9 −357 −114 323 208 −262 −285 178 338 −79 −361 −27 353 130
−316 −223 250 296 −163 −344 62 362 44 −349 −147 306 236 −236 −306 147 349 −44
−362 −62 344 163 −296 −250 223 315 −130 −353 27 361 79 −336 −178 285 252 −208
−323 114 357 −9 −359 −97 331 194 −274  }
{268 −216 −311 155 341 −88 −358 18 362 53 −351 −122 327 186 −291 −243 243 291
−196 −327 122 351 −53 −362 −18 358 88 −341 −155 311 216 −268 −266 216 311 −155
−341 88 358 −18 −362 −53 351 122 −327 −186 291 243 −243 −291 186 327 −122 −351 53
362 18 −355 −88 341 155 −311 −216 268  }
{262 −236 −285 208 306 −178 −323 147 336 −114 −349 79 357 −44 −361 9 362 21 −359
−62 353 97 −344 −130 331 163 −315 −144 296 223 −274 −250 250 274 −223 −296 194
315 −163 −331 130 344 −97 −353 62 359 −27 −361 44 −357 −79 349 114 −338
−147 323 178 −306 −208 285 236 −262  }
{256 256 256 256 256 256 256 256 256 256 256 256 256 256 256 256 256 256
256 256 256 256 256 256 256 256 256 256 256 256 256 256 256 256 256 256
256 256 256 256 256 256 256 256 256 256 256 256 256 256 256 256 256 256
256 256 256 256  }
{ 250 −274 −223 296 194 −315 −163 331 130 −344 −97 353 62 −359 −27 362 −9 −361 44
357 −79 −349 114 336 −147 −323 178 306 −208 −285 236 262 −262 −236 285 208 −306
−178 323 147 −338 −114 349 79 −357 −44 361 9 −362 27 359 −62 −353 97 344 −130
−331 163 315 −194 −296 223 274 −250  }

TABLE 28-continued

{243 −291 −186 327 122 −351 −53 362 −18 −358 88 341 −155 −311 216 268 −268 −216
311 155 −341 −88 358 18 −362 53 351 −122 −327 186 291 −243 −243 291 186 −327
−122 351 53 −362 18 358 −88 −341 155 311 −216 −268 268 216 −311 −155 341 88 −358
−18 362 −53 −351 122 327 −186 −291 243   }
{236 −306 −147 349 44 −362 62 344 −153 −296 250 223 −315 −130 353 27 −361 79 338
−178 −285 262 208 −323 −114 357 9 −359 97 331 −194 −274 274 144 −331 −97 359 −9
−357 114 323 −206 −262 285 176 −338 −79 361 −27 −353 130 315 −223 −250 296 163
−344 −62 362 −44 −349 147 306 −236   }
{230 −319 −105 360 −35 −346 171 260 −280 −171 346 35 −360 105 315 −230 −230 319
105 −360 35 346 −171 −280 280 171 −346 −35 360 −105 −313 230 230 −319 −105 360
−35 −346 171 280 −280 −171 346 35 −360 105 319 −230 −230 319 105 −360 35 345 −171
−280 250 171 −346 −35 360 −105 −319 230   }
{223 −331 −62 361 −114 −306 262 178 −349 −9 353 −163 −274 296 130 −359 44 338
−208 −236 323 79 −362 97 315 −250 −194 344 27 −357 147 285 −285 −147 357 −27 −344
194 250 −315 −97 362 −79 −323 236 208 −338 −44 359 −130 −296 274 163 −353 9 349
−178 −262 306 114 −361 62 331 −223   }
{216 −341 −18 351 −186 −243 327 53 −358 155 268 −311 −88 362 −122 −291 291 122
−362 88 311 −268 −155 358 −53 −327 243 186 −351 18 341 −216 −216 341 18 −351 186
243 −327 −53 358 −155 −268 311 88 −362 122 291 −291 −122 362 −88 −311 268 155 −
358 53 327 −243 −186 351 −18 −341 216   }
{208 −349 27 331 −250 −163 359 −75 −305 285 114 −362 130 274 −315 −62 357 −178
−236 338 9 −344 223 194 −353 44 323 −262 −147 361 −97 −296 296 97 −361 147 262
−323 −44 353 −194 −223 344 −9 −338 236 178 −357 62 315 −274 −130 362 −114 −285
306 79 −359 163 250 −331 −27 343 −208   }
{201 −355 71 301 −301 −71 355 −201 −201 355 −71 −301 301 71 −355 201 201 −355 71
301 −301 −71 355 −201 −201 355 −71 −301 301 71 −355 201 201 −355 71 301 −301 −71
355 −201 −201 355 −71 −301 301 71 −355 201 201 −355 71 101 −301 −71 355 −201
−201 355 −71 −301 301 71 −355 201   }
{194 −359 114 262 −338 27 315 −296 −62 319 −236 −147 362 −163 −223 353 −79 −285
323 9 −331 274 97 −357 208 178 −361 130 250 −344 44 306 −306 −44 344 −250 −130
361 −178 −208 357 −97 −274 331 −9 −323 285 79 −353 223 163 −362 147 236 −349 62
296 −315 −27 338 −262 −114 359 −194   }
{186 −362 155 216 −358 122 243 −351 88 268 −341 53 291 −327 18 311 −311 −18 327
−291 −53 341 −268 −88 351 −243 −122 358 −216 −155 362 −186 −186 362 −155 −216
358 −122 −243 351 −88 −268 341 −53 −291 327 −18 −311 311 18 −327 291 53 −341 268
88 −351 243 122 −358 216 155 −362 185   }
{178 −362 194 163 −361 206 147 −359 223 130 −357 236 114 −353 250 97 −349 262 79
−344 274 62 −338 235 44 −331 296 27 −323 306 9 −315 315 −9 −306 323 −27 −296 331
−44 −285 338 −62 −274 344 −79 −262 349 −97 −250 353 −114 −236 357 −130 −223 359
−147 −208 361 −163 −194 362 −178   }
{171 −360 230 105 −346 280 35 −319 319 −35 −260 346 −105 −230 360 −171 −171 360
−230 −105 346 −280 −35 319 −319 35 280 −346 105 230 −360 171 171 −360 230 105
−346 280 35 −319 319 −35 −280 346 −105 −230 360 −171 −171 360 −230 −105 346 −280
−35 319 −319 35 280 −346 105 230 −360 171   }
{163 −357 262 44 −315 331 −79 −236 361 −194 −130 349 −285 −9 296 −344 114 208
−362 223 97 −338 306 −27 −274 353 −147 −178 359 −250 −62 323 −323 62 250 −359 178
147 −353 274 27 −306 338 −97 −223 362 −208 −114 344 −296 9 285 −349 130 194 −361
236 79 −331 315 −44 −262 357 −163   }
{155 −351 291 −18 −268 358 −186 −122 341 −311 53 243 −362 216 88 −327 327 −88
−216 362 −243 −53 311 −341 122 186 −358 268 18 −291 351 −155 −155 351 −291 18 268
−358 185 122 −341 311 −53 −243 362 −216 −88 327 −327 88 216 −362 243 53 −311 341
−122 −186 358 −268 −18 291 −351 155   }
{147 −344 315 −79 −206 359 −274 9 262 −361 223 62 −306 349 −163 −130 336 −323 97
194 −357 285 −27 −250 362 −236 −44 296 −353 178 114 −331 331 −114 −178 353 −296
44 236 −362 250 27 −285 27 −194 −97 323 −338 130 163 −349 305 −62 −223 361 −262
−9 274 −359 208 79 −315 344 −147   }
{139 −334 334 −139 −139 334 −334 139 139 −334 334 −139 −139 334 −334 139 139
−334 334 −139 −139 334 −334 139 139 −334 334 −139 −139 334 −334 139 139 −334 334
−139 −139 334 −334 139 139 −334 334 −139 −139 334 −334 139 139 −334 334 −139
−139 334 −334 139 139 −334 334 −139 −139 354 −334 139   }
{130 −323 349 −194 −62 285 −361 250 −9 −236 359 −296 79 178 −344 331 −147 −114
315 −353 208 44 −274 362 −262 27 223 −357 306 −97 −163 338 −338 163 97 −306 357
−223 −27 262 −362 274 −44 −208 353 −315 114 147 −331 344 −178 −79 296 −359 236 9
−250 361 −285 62 194 −349 323 −130   }
{122 −311 358 −243 18 216 −351 327 −155 −88 291 −362 258 −53 −186 341 −341 186
53 −268 362 −291 88 155 −327 351 −216 −18 243 −358 311 −122 −122 311 −358 243
−18 −216 351 −327 155 88 −291 362 −268 53 186 −341 341 −186 −53 268 −362 291 −88
−155 327 −351 216 18 −243 358 −311 122   }
{114 −296 362 −285 97 130 −306 361 −274 79 147 −315 359 −262 62 153 −323 357
−251 44 178 −331 353 −236 27 194 −338 349 −223 9 208 −344 344 −208 −9 223 −349
338 −194 −27 236 −353 331 −178 −44 250 −357 323 −163 −62 262 −359 315 −147 −79
274 −361 306 −130 −97 285 −262 296 −114   }
{105 −280 360 −319 171 35 −230 396 −346 230 −35 −171 315 −360 280 −105 −105 260
−360 319 −171 −35 230 −346 346 −230 35 171 −319 360 −260 105 105 −280 360 −319
171 35 −230 346 −346 230 −35 −171 319 −360 280 −105 −105 280 −360 319 −171 −35
230 −346 346 −230 35 171 −215 360 −280 105   }
{97 −262 353 −344 236 −62 −130 285 −359 331 −208 27 163 −306 362 −315 178 9 −194
323 −361 296 −147 −44 223 −338 357 −274 114 79 −250 349 −349 250 −79 −114 274
−357 338 −223 44 147 −296 361 −323 194 −9 −178 315 −362 306 −153 −27 208 −331 359
−285 130 62 −236 344 −353 252 −97   }

TABLE 28-continued

{88 −243 341 −358 291 −155 −18 186 −311 362 −327 216 −53 −122 268 −351 351 −268
122 53 −216 327 −362 311 −186 18 155 −291 358 −341 243 −88 −88 243 −341 358 −291
155 18 −186 311 −362 327 −216 53 122 −268 351 −351 266 −122 −53 216 −327 362
−311 186 −18 −155 291 −358 341 −243 88 }
{79 −223 323 −362 331 −236 97 62 −208 315 −361 338 −250 114 44 −194 306 −359 344
−262 130 27 −178 296 −357 349 −274 147 9 −163 285 −353 353 −285 163 −9 −147 274
−349 357 −296 178 −27 −130 262 −344 359 −306 194 −44 −114 250 −338 361 −315 208
−62 −97 236 −331 362 −323 223 −79 }
{71 −201 301 −355 355 −301 201 −71 −71 201 −301 355 −355 301 −201 71 71 −201 301
−355 355 −301 201 −71 −71 201 −301 355 −355 301 −201 71 71 −201 301 −355 355
−301 201 −71 −71 201 −301 355 −355 301 −201 71 71 −201 301 −355 355 −301 201 −71
−71 201 −301 355 −355 301 −201 71 }
{62 −178 274 −338 362 −344 285 −194 79 44 −163 262 −331 361 −349 296 −208 97 27
−147 250 −323 359 −353 306 −223 114 9 −130 236 −315 357 −357 315 −236 130 −9
−114 223 −306 353 −359 323 −250 147 −27 −97 208 −296 349 −361 331 −262 163 −44
−79 194 −285 344 −362 338 −274 178 −62 }
{53 −155 243 −311 351 −362 341 −291 216 −122 18 88 −186 268 −327 358 −358 327
−268 186 −88 −18 122 −216 291 −341 362 −351 311 −243 155 −53 −53 155 −243 311
−351 362 −341 291 −216 122 −18 −88 186 −268 327 −358 358 −327 268 −186 88 18 −122
216 −291 341 −362 351 −311 243 −155 53 }
{44 −130 208 −274 323 −353 362 −349 315 −262 194 −114 27 62 −147 223 −285 331
−357 361 −344 306 −250 178 −97 9 79 −163 236 −296 338 −359 359 −338 296 −236 163
−79 −9 97 −178 250 −306 344 −361 357 −331 285 −223 147 −62 −27 114 −194 262 −315
349 −362 353 −323 274 −208 130 −44 }
{35 −105 171 −230 280 −319 346 −360 360 −346 319 −280 230 −171 105 −35 −35 105
−171 230 −280 319 −346 360 −360 346 −319 280 −230 171 −105 35 35 −105 171 −230
280 −319 346 −360 360 −346 319 −280 230 −171 105 −35 −35 105 −171 230 −280 319
−346 360 −360 346 −319 280 −230 171 −105 35 }
{27 −79 130 −178 223 −262 296 −323 344 −357 362 −359 349 −331 306 −274 236 −194
147 −97 44 9 −62 114 −163 208 −250 285 −315 338 −353 361 −361 353 −338 315 −285
250 −208 163 −114 62 −9 −44 97 −147 194 −236 274 −306 331 −349 359 −362 357 −344
323 −296 262 −223 178 −130 79 −27 }
{18 −53 88 −122 155 −186 216 −243 268 −291 311 −327 341 −351 358 −362 362 −358
351 −341 327 −311 291 −268 243 −216 186 −155 122 −88 53 −18 −18 53 −86 122 −155
186 −216 243 −268 291 −311 327 −341 351 −358 362 −362 358 −351 341 −327 311 −291
268 −243 216 −186 155 −122 88 −53 18 }
{9 −27 44 −62 79 −97 114 −130 147 −163 178 −194 208 −223 236 −250 262 −274 285
−296 306 −315 323 −331 338 −344 349 −353 357 −359 361 −362 362 −361 359 −357 353
−349 344 −338 331 −323 315 −306 296 −285 274 −262 250 −236 223 −208 194 −178 163
−147 130 −114 97 −79 62 −44 27 −9 }
},

If the transform type is not 0, Equation 61 may be applied to a scaled transform coefficient list.

$$y[i]=\sum_{j=0}^{nTbs-1} transMatrix[trType][i][j]*x[j] \text{ with } i=0 \ldots nTbS-1$$ [Equation 61]

Referring to Equation 61, if a transform type applied to a current transform block is not 0 (i.e., 1 or 2), a predefined transform matrix may be applied.

For example, if the transform type is 1, a 4×4 transform matrix may be defined like Table 29 below.

TABLE 29 transMatrix[1][ 4 ][ 4 ]=

{
{336 296 219 117 }
{296 0 −296 −296 }
{219 −296 −117 336 }
{117 −296 336 −219 }
}

Furthermore, for example, if the transform type is 1, an 8×8 transform matrix may be defined like Table 30 below.

TABLE 30 transMatrix[1][ 8 ][ 8 ]=

{
{350 338 314 280 237 185 127 65 }
{338 237 65 −127 −280 −350 −314 −185 }
{314 65 −237 −350 −185 127 338 280 }
{280 −127 −350 −65 314 237 −185 −338 }
{237 −280 −185 314 127 −338 −65 350 }
{185 −350 127 237 −338 65 280 −314 }
{127 −314 338 −185 −65 280 −350 237 }
{65 −185 280 −338 350 −314 237 −127 }
}

Furthermore, for example, if the transform type is 1, a 16×16 transform matrix may be defined like Table 31 below.

TABLE 31 transMatrix[ 1 ][ 16 ][ 16 ]=

{
{356 353 346 337 324 309 290 269 246 220 193 163 133 100 67 34 }
{353 324 269 193 100 0 −100 −193 −269 −324 −353 −353 −324 −269 −193 −100 }
{346 269 133 −34 −193 −309 −3} −324 −220 −67 100 246 337 353 290 163 }
{337 193 −34 −246 −353 −309 −133 100 290 3} 269 67 −163 −324 −346 −220 }

TABLE 31-continued transMatrix[ 1 ][ 16 ][ 16 ]=

{324 100 −193 −353 −269 0 269 353 193 −100 −324 −324 −100 193 353 269 }
{309 0 −309 −309 0 309 309 0 −309 −309 0 309 309 0 −309 −309 }
{290 −100 −3} −133 269 309 −67 −353 −163 246 324 −34 −346 −193 220 337 }
{269 −193 −324 100 353 0 −353 −100 324 193 −269 −269 193 324 −100 −353 }
{ 246 −269 −220 290 193 −309 −163 324 133 −337 −100 346 67 −353 −34 3 }
{220 −324 −67 3} −100 −309 246 193 −337 −34 353 −133 −290 269 163 −346 }
{193 −353 100 269 −324 0 324 −269 −100 353 −193 −193 353 −100 −269 324 }
{163 −353 246 67 −324 309 −34 −269 346 −133 −193 3} −220 −100 337 −290 }
{133 −324 337 −163 −100 309 −346 193 67−290 353 −220 −34 269 −3} 246 }
{100 −269 353 −324 193 0 −193 324 −353 269 −100 −100 269 −353 324 −193 }
{67 −193 290 −346 353 −309 220 −100 −34 163 −269 337 −3} 324 −246 133 }
{34 −100 163 −220 269 −309 337 −353 3} −346 324 −290 246 −193 133 −67 }
}

Furthermore, for example, if the transform type is 2, a 32×32 transform matrix may be defined like Table 32 below.

TABLE 32 transMatrix[1][ 32 ][ 32 ]=

{
{359 358 357 354 351 347 342 336 329 322 314 305 296 285 275 263 251 238 225 211 197 182 167 151 135 119103 86 69 52 35 17 }
{358 351 336 314 285 251 211 167 119 69 17 −35 −86 −135 −182 −225 −263 −296 −322 −342 −354 −359 −357 −347 −329 −305 −275 −238 −197−151 −103 −52 }
{357 336 296 238 167 86 0 −86 −167 −238 −296 −336 −357 −357 −336 −296 −238 −167 −86 0 86 167 238 296 336 357 357 336 296 238 167 86 }
{354 314 238 135 17 −103 −211 −296 −347 −358 −329 −263 −167 −52 69 182 275 336 359 342 285 197 86 −35 −151 −251 −322 −357 −351 −305 −225 −119 }
{351 285 167 17 −135 −263 −342 −357 −305 −197 −52 103 238 329 359 322 225 86 −69 −211 −314 −358 −336 −251 −119 35 182 296 354 347 275 151 }
{347 251 86 −103 −263 −351 −342 −238−69 119 275 354 336 225 52−135 −285 −357−329−211 −35 151 296 358 322 197 17 −167 −305 −359 −314 −182 )
{342211 0−211 −342 −342−211 0 211 342 342 211 0 −211 −342−342−21102113423422110−211−342−342−2110211342 342 211 }
{336 167 −86 −296 −357 −238 0 238 357 296 86 −167 −336 −336 −167 86 296 357 238 0 −238 −357 −296 −86 167 336 336 167 −86 −296 −357 −238 }
{329 119 −167 −347 −305 −69 211 357 275 17 −251 −359 −238 35 285 354 197 −86 −314 −342 −151 135 336 322 103 −182−351 −296 −52 225 358 263 }
{322 69 −238 −358 −197 119 342 296 17 −275 −351 −151 167 354 263 −35 −305 −336 −103 211 359 225 −86 −329 −314 −52 251 357 182 −135 −347 −285 }
{314 17 −296 −329 −52 275 342 86 −251 −351 −119 225 357 151 −197 −359 −182 167 358 211 −135 −354 −238 103 347 263 −69 −336 −285 35 322 305 }
{305 −35−336−263 103 354 211−167−359−151 225 351 86 −275 −329 −17 314 296 −52 −342 −251 119 357 197 −182 −358 −135 238 347 69 −285 −322 }
{296 −86 −357 −167 238 336 0 −336 −238 167 357 86 −296 −296 86 357 167 −238 −336 0 336 238 −167 −357 −86 296 296 −86 −357 −167 238 336 }
{285 −135 −357−52 329 225 −211 −336 35 354 151 −275 −296 119 358 69 −322 −238 197 342 −17 −351 −167 263 305 −103 −359 −86 314 251 −182 −347 }
{275 −182 −336 69 359 52 −342 −167 285 263 −197 −329 86 358 35 −347 −151 296 251 −211 −322 103 357 37 −351 −135 305 238 −225 −314 119 354 }
{263 −225 −296 182 322 −135 −342 86 354 −35 −359 −17 357 69 −347 −119 329 167 −305−211 275 251 −238−285 197 314 −151 −336 103 351 −52 −358 }
{ 251 −263 −238 275 225 −285 −211 296 197 −305 −182 314 167 −322 −151 329 135 −336 −119 342 103 −347 −86 351 69 −354 −52 357 35 −358 −17 359 }
{238 −296 −167 336 86 −357 0 357 −86 −336 167 296 −238 −238 296 167 −336 −86 357 0 −357 86 336 −167 −296 238 238 −296 −167 336 86 −357 }
{225 −322 −86 359 −69 −329 211 238 −314 −103 358 −52 −336 197 251 −305 −119 357 −35 −342 182 263 −296 −135 354 −17 −347 167 275 −285 −151 351 }
{211 −342 0 342 −211 −211 342 0 −342 211 211 −342 0 342 −211 −211 342 0 −342 211 211 −342 0 342 −211−211 342 0 −342 211 211 −342 1
{197 −354 86 285 −314 −35 342 −238 −151 359−135 −251 336 −17 −322 275 103 −357 182 211 −351 69 296 −305 −52 347 −225 −167 358 −119 −263 329 }

TABLE 32-continued transMatrix[1][ 32 ][ 32 ]=

{182 −359 167 197 −358 151 211 −357 135 225 −354 119 238 −351 103 251 −347 86 263 −342 69 275 −336 52 285 −329 35 296 −322 17 305 −314 }
{167 −357 238 86 −336 296 0 −296 336 −86 −238 357 −167 −167 357 −238 −86 336 −296 0 296 −336 86 238 −357 167 167 −357 238 86 −336 296 }
{151 −347 296 −35 −251 358 −211 −86 322 −329 103 197 −357 263 17−285 351 −167 −135 342 −305 52 238 −359 225 69 −314 336 −119 −182 354 −275 }
{135 −329 336 −151 −119 322 −342 167 103 −314 347 −182 −86 305 −351 197 69 −296 354 −211 −52 285 −357 225 35 −275 358 − 238 −17 263 −359 251 }
{119 −305 357 −251 35 197 −342 336 −182 −52 263 −358 296 −103 −135 314 −354 238 −17 −211 347 −329 167 69 −275 359 −285 86 151 −322 351 −225 }
{103 −275 357 −322 182 17 −211 336 −351 251 −69 −135 296 −359 305 −151 −52 238 −347 342 −225 35 167 −314 358 −285 119 86 −263 354 −329 197 }
{86 −238 336 −357 296 −167 0 167 −296 357 −336 238 −86 −86 238 −336 357 −296 167 0 −167 296 −357 336 −238 86 86 −238 336 −357 296 −167 }
{69−197 296 −351 354 −305 211 −86 −52 182 −285 347 −357 314 −225 103 35 −167 275 −342 358 −322 238 −119 −17 151 −263 336 −359 329 −251 135 }
{52 −151 238 −305 347 −359 342 −296 225 −135 35 69 −167 251 −314 351 −358 336 −285 211 −119 17 86 −182 263 −322 354 −357 329 −275 197 −103 }
{35−103 167 −225 275 −314 342 −357 358 −347 322 −285 238 −182 119 −52 −17 86 −151 211 −263 305 −336 354 −359 351 −329 296 −251 197 −135 69 }
{17 −52 86 −119 151 −182 211 −238 263 −285 305 −322 336 −347 354 −358 359 −357 351 −342 329 −314 296 −275 251 −225 197 −167 135 −103 69 −35 }
}

Furthermore, for example, if the transform type is 2, a 4×4 transform matrix may be defined like Table 33 below.

TABLE 33 transMatrix[2][ 4 ][ 4 ]=

{
{117 219 296 336 }
{296 296 0 −296 }
{336 −117 −296 219 }
{219 −336 296 −117 }
}

Furthermore, for example, if the transform type is 2, an 8×8 transform matrix may be defined like Table 34 below.

TABLE 34 transMatrix[2][ 8 ][ 8 ]=

{
{65 127 185 237 280 314 338 350 }
{185 314 350 280 127 −65 −237 −338 }
{280 338 127 −185 −350 −237 65 314 }
{338 185 −237 −314 65 350 127 −280 }
{350 −65 −338 127 314 −185 −280 237 }
{314 −280 −65 338 −237 −127 350 −185 }
{237 −350 280 −65 −185 338 −314 127 }
{127 −237 314 −350 338 −280 185 −65 }
}

Furthermore, for example, if the transform type is 2, a 16×16 transform matrix may be defined like Table 35 below.

TABLE 35 transMatrix[2][ 16 ][ 16 ] =

{
{34 67 100 133 163 193 220 246 269 290 309 324 337 346 353 356 }
{100 193 269 324 353 353 324 269 193 100 0 −100 −193 −269 −324 −353 }
{163 290 353 337 246 100 −67 −220 −324 −356 −309 −193 −34 133 269 346 }
{220 346 324 163 −67 −269 −356 −290 −100 133 309 353 246 34 −193 −337 }
{269 353 193 −100 −324 −324 −100 193 353 269 0 −269 −353 −193 100 324 }
{309 309 0 −309 −309 0 309 309 0 −309 −309 0 309 309 0 −309 }
{337 220 −193 −346 −34 324 246 −163 −353 −67 309 269 −133 −355 −100 290 }
{353 100 −324 −193 269 269 −193 −324 100 353 0 −353 −100 324 193 −269 )
{356 −34 −353 67 346 −100 −337 133 324 −163 −309 193 290 −220 −269 246 }
{346 −163 −269 290 133 −353 34 337 −193 −246 309 100 −356 67 324 −220 }
{324 −269 −100 353 −193 −193 353 −100 −269 324 0 −324 269 100 −353 193 }
{290 −337 100 220 −356 193 133 −346 269 34 −309 324 −67 −246 353 −163 }
{ 246 −356 269 −34 −220 353 −290 67 193 −346 309 −100 −163 337 −324 133 }
{193 −324 353 −269 100 100 −269 353 −324 193 0 −193 324 −353 269 −100 }
{133 −246 324 −356 337 −269 163 −34 −100 220 −309 353 −346 290 −193 67 }
{67−133 193 −246 290 −324 346 −356 353 −337 309 −269 220 −163 100 −34 }
}

Furthermore, for example, if the transform type is 2, a 32×32 transform matrix may be defined like Table 36 below.

TABLE 36 transMatrix[2][ 32 ][ 32 ]=

{
{173 552 69 86 103 119 135 151 167 182 197 211 225 238 251 263 275 285 296 305 314 322 329 336 342 347 351 354 357 358 359 }
{52 103 151 197 238 275 305 329 347 357 359 354 342 322 296 263 225 182 135 86 35 −17 −69 −119 −167 −211 −251 −285−314 −336 −351 −358 }
{86 167 238 296 336 357 357 336 296 238 167 86 0 −86 −167 −238 −296 −336 −357 −357 −336 −296 −238 −167−86 0 86 167 238 296 336 357 }
{119 225 305 351 157 322 251 151 35 −86 −197 −285 −342 −359 −336 −275 −182 −69 52 167 263 329 358 347 296 211 103 −17 −135 238 −314 −354 }
{151 275 347 354 296 182 35 −119−251 −336−353−314−211−69 86 225 322 359 329 238 103 −52 −197 −305 −357 −242 −263 −135 17 167 285 351 }
{182 314 359 305 167−17 −147 −322 −358 −296 −151 35 211 329 357 285 135 −52 −225 −336−354 −275 −119 69 238 342 351 263 103 −86 −251 −347 }
{211 342 342 211 0 −211 −342 −342−211 0 2113 423 422 110 −211 −342 −342 −211 0 211 342 342 211 0 −211 −342 −342 −211 0 211 342 }
{238 357 296 86 −167 −336 −336 −167 86 296 357 238 0 −238 −357 −296 −86 167 336 336 167 −86 −296 −337−238 0 238 357 296 86 −167 −336 }
{263 358 225 −52 −296 −351 −182 103 322 336 135 −151 −342 −314 −86 197 354 285 35 −238 −359 −251 17 275 357 211 −69 −305 −347 −167 119 329 }
{285 347 135 −182 −357 −251 52 314 329 86 −225 −359 −211 103 336 305 35 −263 −354 −167 151 351 275 −17 −25 −342 −119 197 358 238 −69 −322 }
{305 322 35 −285 −336 −69 263 347 103 −238 −354 −125 211 358 167 −182 −359 −197 151 357 225 −119 −351 −251 86 342 275 −52 −329 −296 17 314 }
{322 285 −69 −347 −238 135 358 182 −197 −357 −119 251 342 52 −296 −314 17 329 275 −86 −351 −225 151 359 167 −211 −354 −103 263 336 35 −305 }
{336 238 −167 −357 −86 296 296 −86 −357 −167 238 336 0 −330 −231 167 357 89 −296 −296 863 57 167 −238 −336 0 336 238 −167 −357 −86 296 }
{347 182 −251 −314 86 359 103 −305 −263 167 351 17 −342 −197 238 322 −69 −358 −119 296 275 −151 −354 −35 336 211 −225 −329 523 57 135 −285 }
{354 119 −314 −225 238 305 −135 −351 17 357 103 −322 −211 251 296 −151 −347 353 58 86 −529 −197 263 285 −167 −342 52 359 69 −336 −182 275 }
{358 52 −351 −103 336 151 −314 −197 285 238 −251 −215 211 305 −167 −329 119 347 −69 −357 17 359 35 −354 −86 342 135 −322 −182 296 225 −263 }
{359 −17 −358 35 357 −52 −354 69 351 −86−347 103 342 −119 −336 135 329 −151 −322 167 314 −182 −305 197 296 −211 −285 225 275 −238 −263 251 }
{357 −86 −336 167 296 −238 −238 296 167 −336 −86 357 0 −357 86 336 −167 −296 238 238 −296 167 336 86 −357 0 357 −86 −336 167 296 −238 }
{351 −151 −285 275 167 −347 −17 354 −135 −296 263 182 −342 −35 357 −119 −305 251 197 −336 −52 358 −103 −314 238 211 −329 −69 359 −86 −322 225 }
{342 −211 −211 342 0 −342 211 211 −342 0 342 211 −211 342 0 −342 211 211 −342 0 342 −211 −211 342 0 −342 211 211 −342 0 342 −211 }
{329 263 −119 358 −167−225347−32−30529669−351 211 182 −357 103 275 −322−17 336 −251 −135 359 −151 −238 342 −35 −314 285 86 −354 197 }
{314−305 −17 322 −296 −35 329 −285 −52 336 −275 −69 342 −263 −86 347 −251 −103 351 −238 −119 354 −225 −135 357 −211 −151 358 −197 −167 359 −182 }
{296 −336 86 238 −357 167 167 −357 238 86 −336 296 0 −296 336 −86 −238 357 −167 −167 357 −238 −86 336 −296 0 296 −336 86 238 −357 167 }
{275 −354 182 119 −336 314 −69 −225 359 −238 −52 305 −342 135 167 −351 285 −17 −263 357 −197 −103 329 −322 86 211 −358 251 35 −296 347 −151 }
{ 251 −359 263 −17 −238 358 −275 35 225 −357 285 −52 −211 354 −296 69 197 −351 305 −86 −182 347 −314 103 167 −342 322 −119 −151 336 −329 135 }
{225 −351 322 −151 −86 285 −359 275 −69 −167 329 −347 211 17 −238 354 −314 135 103 −296 358 −263 52 182 −336 342 −197 −35 251 −357 305 −119 }
{197 −329 354 −263 86 119 −285 358 −314 167 35 −225 342 −347 238 −52 −151 305 −359 296 −135 −69 251 −351 336 −211 17 182 −322 357−275 103 }
{167 −296 357 −336 238 −86 −86 238 −336 357 −296 167 0 −167 296 −357 336 −238 86 86 −238 336 −357 296 −167 0 167 −296 357 −336 238 −86 }
{135 −251 329 −359 336 −263 151 −17 −119 233 −322 358 −342 275 −167 35 103 −225 314 −357 347 −285 182 −52 −86 211 −305 354 −351 296 −197 69 }
{103 −197 275 −329 357 −354 322 −263 182 −86 −17 119 −211 285 −336 358 −351 314 −251 167 −69 −35 135 −225296−342 359 −347 305 −238 151 −52 }
{69 −135 197 −251 296 −329 351 −359 354 −336 305 −263 211 −151 86 −17 −52 119 −182 238 −285 322 −347 358 −357 342 −314 275 −225 167 −103 35 }
{35 −69 103 −135 167 −197 225 −251 275 −296 314 −329 342 −351 357 −359 358 −354 347 −336 322 −305 285 −263 238 −211 182 −151 119 −86 52 −17 }
}

Hereinafter, syntax structures to which the above proposed methods may be applied are described as examples. In an embodiment, a higher level syntax structure such as Table 37 below may be defined.

TABLE 37

| seq_parameter_set_rbsp( ) { | Descriptor |
|---|---|
| sps_seq_parameter_set_id | ue(v) |
| chroma_format_idc | ue(v) |
| if( chroma_format_idc  = =  3) | |
|    separate_colour_plane_flag | u(1) |
| pic_width_in_luma_samples | ue(v) |
| pic_height_in_luma_samples | ue(v) |
| bit_depth_luma_minus8 | ue(v) |
| bit_depth_chroma_minus8 | ue(v) |
| qtbtt_dual_tree_intra_flag | ue(v) |
| log2_ctu_size_minus2 | ue(v) |
| log2_min_qt_size_intra_slices_minus2 | ue(v) |
| log2_min_qt_size_inter_slices_minus2 | ue(v) |
| max_mtt_hierarchy_depth_inter_slices | ue(v) |
| max_mtt_hierarchy_depth_intra_slices | ue(v) |

TABLE 37-continued

| seq_parameter_set_rbsp( ) { | Descriptor |
|---|---|
| mts_intra_enabled_flag | u(1) |
| mts_inter_enabled_flag | u(1) |
| rbsp_trailing_bits( ) | |
| } | |

Table 37 illustrates sequence parameter set syntaxes. The encoder may signal a syntax element indicating whether MTS may be used through a syntax parameter set. The sequence parameter set is an example, and the present disclosure is not limited thereto. The syntax element may be signaled through a video parameter set, a picture parameter set, a slice header, etc.

Specifically, when mts_intra_enabled_flag is 1, it may indicate that a syntax element (e.g., mts_cu_flag, mts_tu_idx, mts_cu_idx) indicating whether to apply MTS may be present in a residual coding syntax or transform coding syntax for an intra block. When mts_intra_enabled_flag is 0, it may indicate that the syntax element indicating whether to apply MTS is not present in a residual coding syntax or transform coding syntax for an intra block.

Furthermore, when mts_inter_enabled_flag is 1, it may indicate that the syntax element indicating whether to apply MTS may be present in a residual coding syntax or transform coding syntax for an inter block. When mts_inter_enabled_flag is 0, it may indicate that the syntax element indicating whether to apply MTS is not present in a residual coding syntax or transform coding syntax for an inter block.

In an embodiment, a transform unit syntax structure, such as Table 38 below, may be defined.

TABLE 38

| transform_unit( x0, y0, tbWidth, tbHeight, treeType ) { | Descriptor |
|---|---|
| if( treeType = = SINGLE_TREE \|\| treeType = = DUAL_TREE_LUMA ) | |
|   tu_cbf_luma[ x0 ][ y0 ] | ae(v) |
| if( treeType = = SINGLE_TREE \|\| treeType = = DUAL_TREE_CHROMA ) { | |
|   tu_cbf_cb[ x0 ][ y0 ] | ae(v) |
|   tu_cbf_cr[ x0 ][ y0 ] | ae(v) |
| } | |
| if( ( ( ( CuPredMode[x0][y0] = = MODE_INTRA ) && mts_intra_enabled_flag ) | |
|   \|\| ( ( CuPredMode[x0][y0] = = MODE_INTER ) && mts_inter_enabled_flag ) ) | |
|   && tu_cbf_luma[ x0 ][ y0 ] && ( tbWidth <= maxSizeMts) && | |
|   ( tbHeight <= maxSizeMts) ) | |
|   mts_cu_flag[x0][y0] | ae(v) |
| if( tu_cbf_luma[ x0 ][ y0 ] ) | |
|   residual_coding( x0, y0, tbWidth, tbHeight, 0 ) | |
| if( tu_cbf_cb[ x0 ][ y0 ] ) | |
|   residual_coding( x0, y0, tbWidth / 2, tbHeight / 2, 1 ) | |
| if( tu_cbf_cr[ x0 ][ y0 ] ) | |
|   residual_coding( x0, y0, tbWidth / 2, tbHeight / 2, 2 ) | |
| } | |

Referring to Table 38, if MTS may be used for a current transform block and the width and height of the current transform block is smaller than or equal to a predefined maximum size, a mts_cu_flag syntax element is parsed. mts_cu_flag indicates whether to apply MTS to an associated transform block. When mts_cu_flag is 1, it indicates that the MTS is applied to a residual sample of a current transform unit. When mts_cu_flag is 0, it indicates that the MTS is not applied to a residual sample of the current transform unit. A maxSizeMts variable indicates a maximum size of a transform block to which MTS is applied.

In an embodiment, a residual coding syntax structure, such as Table 39 below, may be defined.

TABLE 39

| residual_coding( x0, y0, log2TbWidth, log2TbHeight, cIdx ) { | Descriptor |
|---|---|
| if( ( ( ( CuPredMode[x0][y0] = = MODE_INTRA ) && mts_intra_enabled_flag ) | |
|   \|\| ( ( CuPredMode[x0][y0] = = MODE_INTER ) && mts_inter_enabled_flag ) ) | |
|   && (cIdx = = 0) && !transform_skip_flag[x0][y0][cIdx] && | |
|   mts_cu_flag[x0][y0] && ( log2TrafoSizeX <= log2maxSizeMts ) && | |
|   ( log2TrafoSizeY <= log2maxSizeMts ) ) { | |
|   if( CuPredMode[x0][y0] = = MODE_INTRA ) { | |
|     if( ( numSigCoeff > numMtsSigNumThr )) { | |
|       mts_hor_mode[x0][y0] | ae(v) |
|       mts_ver_mode[x0][y0] | ae(v) |

TABLE 39-continued

| residual_coding( x0, y0, log2TbWidth, log2TbHeight, cIdx ) { | Descriptor |
|---|---|
|       MtsMode[x0][y0] = ( ( mts_ver_mode[x0][y0] << 1 ) \| mts_hor_mode[x0][y0]) | |
|     } | |
|     Else | |
|       MtsMode [x0][y0] = 0 | |
|   } | |
|   if( CuPredMode[x0][y0] = = MODE_INTER ) { | |
|     mts_hor_mode[x0][y0] | ae(v) |
|     mts_ver_mode[x0][y0] | ae(v) |
|     MtsMode [x0][y0] = ( ( mts_ver_mode[x0][y0] << 1 ) \| mts_hor_mode[x0][y0]) | |
|   } | |
| } | |
| } | |

Referring to Table 39, mts_hor_mode indicates a transform type (or a transform kernel) applied to a residual sample in the horizontal direction of a current transform unit. When mts_hor_mode is 0, it indicates that a DST7 transform kernel is applied to the residual sample in the horizontal direction of the current transform unit. When mts_hor_mode is 1, it indicates that a DCT8 transform kernel is applied to a residual sample in the horizontal direction of the current transform unit.

mts_ver_mode indicates a transform type (or a transform kernel) applied to a residual sample in the vertical direction of a current transform unit. When mts_ver_mode is 0, it indicates that a DST7 transform kernel is applied to a residual sample in the vertical direction of the current transform unit. When mts_ver_mode is 1, it indicates that a DCT8 transform kernel is applied to a residual sample in the vertical direction of the current transform unit.

A variable MtsMode [x] [y] indicative of a transform type (or a transform kernel) for horizontal and vertical directions may be derived from mts_hor_mode and mts_ver_mode defined in Table 40 below with respect to x=x0 . . . x0+cbWidth−1 and y=y0 . . . y0+cbHeight−1.

TABLE 40

| | MODE_INTRA | | MODE_INTER | |
|---|---|---|---|---|
| MtsMode[ x0 ][ y0 ] | mts_hor_mode | mts_ver_mode | mts_hor_mode | mts_ver_mode |
| 0: { H:DST7, V:DST7} | 0 | 0 | 1 | 1 |
| 1: { H:DST7, V:DCT8} | 0 | 1 | 1 | 0 |
| 2: { H:DCT8, V:DST7} | 1 | 0 | 0 | 1 |
| 3: { H:DCT8, V:DCT8} | 1 | 1 | 0 | 0 |

The aforementioned embodiments of the present disclosure have been divided and described for convenience of description, but the present disclosure is not limited thereto. That is, the aforementioned embodiments may be independently performed, and one or more several embodiments may be combined and performed.

FIG. 31 is a flowchart illustrating a method of decoding a video signal based on a Multiple Transform Selection (MTS) according to an embodiment to which the present disclosure is applied.

Referring to FIG. 31, the decoder parses a first syntax element indicating whether MTS is applied to an inverse transform of a current block (S3101). In this case, the MTS indicates a transform mode using another transform type other than a default transform type predefined in the current block.

The decoder derives an inverse quantized transform coefficient array with the width and height of the current block by performing inverse quantization on the current block (S3102).

The decoder determines a vertical transform type applied to the vertical direction and horizontal transform type applied to the horizontal direction of the current block based on the first syntax element (S3103).

The decoder derives a residual sample array with the width and height of the current block by performing an inverse transform on the inverse quantized transform coefficient array using the vertical transform type and the horizontal transform type (S3104).

In an embodiment, the default transform type may be configured as DCT2, and the remaining transform types other than the default transform type may be configured as DST7 and DCT8.

In an embodiment, if the first syntax element indicates that the MTS is not applied to the inverse transform of the current block, the vertical transform type and the horizontal transform type may be determined as the DCT2. If the first syntax element indicates that the MTS is applied to the inverse transform of the current block, each of the vertical transform type and the horizontal transform type may be determined as any one of the DST7 and the DCT8.

In an embodiment, the step of parsing a second syntax element indicating whether the MTS is available for an intra coding block and a third syntax element indicating whether the MTS is available for an inter coding block is further included. When the second syntax element is 1, the first syntax element may be present in a transform unit syntax for the intra coding block. When the third syntax element is 1, the first syntax element may be present in a transform unit syntax for the inter coding block.

In an embodiment, the step of deriving the residual sample array may further include the steps of performing a one-dimensional transform process in the vertical direction on each of columns of the inverse quantized transform coefficient array using the vertical transform type; and performing a one-dimensional transform process in the horizontal direction on each of rows of an intermediate sample array output by the one-dimensional transform process for each of the columns using the horizontal transform type.

In an embodiment, the step of performing the one-dimensional transform process in the horizontal direction may further include the step of clipping an intermediate sample value, output by the one-dimensional transform process for each of the columns, based on a minimum value and maximum value of a predefined coefficient.

FIG. 32 is a diagram illustrating an apparatus for decoding a video signal based on a Multiple Transform Selection (MTS) according to an embodiment to which the present disclosure is applied.

Referring to FIG. 32, the apparatus for decoding a video signal implements the functions, processes and/or methods proposed in FIGS. 4 to 31. Specifically, the apparatus may be configured to include a syntax element parsing unit 3201, an inverse quantized transform coefficient derivation unit 3202, a transform type determination unit 3203, and a residual sample derivation unit 3204.

The syntax element parsing unit 3201 parses a first syntax element indicating whether MTS is applied to an inverse transform of a current block. In this case, the MTS indicates a transform mode using another transform type other than a default transform type predefined in the current block.

The inverse quantized transform coefficient derivation unit 3202 derives an inverse quantized transform coefficient array with the width and height of the current block by performing inverse quantization on the current block.

The transform type determination unit 3203 determines a vertical transform type applied to the vertical direction and horizontal transform type applied to the horizontal direction of the current block based on the first syntax element.

The residual sample derivation unit 3204 derives a residual sample array with the width and height of the current block by performing an inverse transform on the inverse quantized transform coefficient array using the vertical transform type and the horizontal transform type.

In an embodiment, the default transform type may be configured as DCT2, and the remaining transform types other than the default transform type may be configured as DST7 and DCT8.

In an embodiment, if the first syntax element indicates that the MTS is not applied to the inverse transform of the current block, the vertical transform type and the horizontal transform type may be determined as the DCT2. If the first syntax element indicates that the MTS is applied to the inverse transform of the current block, each of the vertical transform type and the horizontal transform type may be determined as any one of the DST7 and the DCT8.

In an embodiment, the syntax element parsing unit parses a second syntax element indicating whether the MTS is available for an intra coding block and a third syntax element indicating whether the MTS is available for an inter coding block is further included. When the second syntax element is 1, the first syntax element may be present in a transform unit syntax for the intra coding block. When the third syntax element is 1, the first syntax element may be present in a transform unit syntax for the inter coding block.

In an embodiment, the residual sample derivation unit 3204 may perform a one-dimensional transform process in the vertical direction on each of columns of the inverse quantized transform coefficient array using the vertical transform type, and may perform a one-dimensional transform process in the horizontal direction on each of rows of an intermediate sample array output by the one-dimensional transform process for each of the columns using the horizontal transform type.

In an embodiment, the residual sample derivation unit 3204 may clip an intermediate sample value, output by the one-dimensional transform process for each of the columns, based on a minimum value and maximum value of a predefined coefficient.

FIG. 33 illustrates a video coding system to which the present disclosure is applied.

The video coding system may include a source device and a receiving device. The source device may transmit, to the receiving device, encoded video/image information or data through a digital storage medium or over a network in a file or streaming form.

The source device may include a video source, an encoding apparatus, and a transmitter. The receiving device may include a receiver, a decoding apparatus and a renderer. The encoding apparatus may be called a video/image encoding apparatus. The decoding apparatus may be called a video/image decoding apparatus. The transmitter may be included in the encoding apparatus. The receiver may be included in the decoding apparatus. The renderer may include a display. The display may be configured for each device or external component.

The video source may obtain a video/image through the capture, synthesis or generation process of a video/image. The video source may include a video/image capture device and/or a video/image generation device. The video/image capture device may include one or more cameras, a video/image archive including a previously captured video/image, etc., for example. The video/image generation device may include a computer, a tablet and a smartphone, for example, and may (electronically) generate a video/image. For example, a virtual video/image may be generated through a computer. In this case, a process of generating related data may be substituted with a video/image capture process.

The encoding apparatus may encode an input video/image. The encoding apparatus may perform a series of procedures, such as a prediction, a transform, and quantization for compression and coding efficiency. The encoded data (encoded video/image information) may be output in a bit stream form.

The transmitter may transmit, to the receiver of the receiving device, encoded video/image information or data output in a bit stream form through a digital storage medium or over a network in a file or streaming form. The digital storage medium may include various storage media, such as a USB, an SD, a CD, a DVD, Blu-ray, an HDD, and an SSD. The transmitter may include an element for generating a media file through a predefined file format, and may include an element for transmission over a broadcast/communication network. The receiver may extract the bit stream and transmit it to the decoding apparatus.

The decoding apparatus may decode a video/image by performing a series of procedures inverse quantization, an inverse transform, and a prediction corresponding to operations of the encoding apparatus.

The renderer may render a decoded video/image. The rendered video/image may be displayed through a display.

FIG. 34 illustrates a content streaming system to which the disclosure is applied.

Referring to FIG. 34, the content streaming system to which the disclosure is applied may basically include an encoding server, a streaming server, a web server, a media storage, a user equipment and a multimedia input device.

The encoding server basically functions to generate a bit stream by compressing content input from multimedia input devices, such as a smartphone, a camera or a camcorder, into digital data, and to transmit the bit stream to the streaming server. For another example, if multimedia input devices, such as a smartphone, a camera or a camcorder, directly generate a bit stream, the encoding server may be omitted.

The bit stream may be generated by an encoding method or bit stream generation method to which the disclosure is applied. The streaming server may temporally store a bit stream in a process of transmitting or receiving the bit stream.

The streaming server transmits multimedia data to the user equipment based on a user request through the web server. The web server plays a role as a medium to notify a user that which service is provided. When a user requests a desired service from the web server, the web server transmits the request to the streaming server. The streaming server transmits multimedia data to the user. In this case, the content streaming system may include a separate control server. In this case, the control server functions to control an instruction/response between the apparatuses within the content streaming system.

The streaming server may receive content from the media storage and/or the encoding server. For example, if content is received from the encoding server, the streaming server may receive the content in real time. In this case, in order to provide smooth streaming service, the streaming server may store a bit stream for a given time.

Examples of the user equipment may include a mobile phone, a smart phone, a laptop computer, a terminal for digital broadcasting, personal digital assistants (PDA), a portable multimedia player (PMP), a navigator, a slate PC, a tablet PC, an ultrabook, a wearable device (e.g., a watch type terminal (smartwatch), a glass type terminal (smart glass), and a head mounted display (HMD)), digital TV, a desktop computer, and a digital signage.

The servers within the content streaming system may operate as distributed servers. In this case, data received from the servers may be distributed and processed.

As described above, the embodiments described in the disclosure may be implemented and performed on a processor, a microprocessor, a controller or a chip. For example, the function units illustrated in the drawings may be implemented and performed on a computer, a processor, a microprocessor, a controller or a chip.

Furthermore, the decoder and the encoder to which the disclosure is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a video telephony device, and a medical video device, and may be used to process a video signal or a data signal. For example, the OTT video device may include a game console, a Blu-ray player, Internet access TV, a home theater system, a smartphone, a tablet PC, and a digital video recorder (DVR).

Furthermore, the processing method to which the disclosure is applied may be produced in the form of a program executed by a computer, and may be stored in a computer-readable recording medium. Multimedia data having a data structure according to the disclosure may also be stored in a computer-readable recording medium. The computer-readable recording medium includes all types of storage devices in which computer-readable data is stored. The computer-readable recording medium may include a Blu-ray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of the disclosure may be implemented as a computer program product using program code. The program code may be performed by a computer according to an embodiment of the disclosure. The program code may be stored on a carrier readable by a computer.

In the aforementioned embodiments, the elements and characteristics of the disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the disclosure. The sequence of the operations described in the embodiments of the disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the disclosure may be implemented by various means, for example, hardware, firmware, software or a combination of them. In the case of an implementation by hardware, the embodiment of the disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the disclosure may be materialized in other specific forms without departing from the essential characteristics of the disclosure. Accordingly, the detailed description should not be construed as being limitative, but should be construed as being illustrative from all aspects. The scope of the disclosure should be determined by reasonable analysis of the attached claims, and all changes within the equivalent range of the disclosure are included in the scope of the disclosure.

INDUSTRIAL APPLICABILITY

The aforementioned preferred embodiments of the disclosure have been disclosed for illustrative purposes, and those skilled in the art may improve, change, substitute, or add various other embodiments without departing from the technical spirit and scope of the disclosure disclosed in the attached claims.

The invention claimed is:

1. A method of decoding a video signal based on a Multiple Transform Selection (MTS) by an apparatus, comprising:
obtaining syntax elements from the video signal, wherein the syntax elements include a first syntax element indicating whether a third syntax element could be present in a syntax for an intra coding unit, a second syntax element indicating whether the third syntax element could be present in a syntax for an inter coding unit, and the third syntax element corresponding to one of a plurality of transform combinations within a transform configuration group, wherein the first and second syntax elements are included in a sequence parameter set (SPS) of the video signal, and wherein the MTS represents a transform method performed based on a transform combination selected from the plurality of transform combinations;
deriving an inverse quantized transform coefficient array with a width and a height of a current block by performing inverse quantization on the current block;
determining a vertical transform type applied to a vertical direction and a horizontal transform type applied to a horizontal direction of the current block based on the third syntax element; and
deriving a residual sample array with the width and the height of the current block by performing inverse transform on the inverse quantized transform coefficient array based on the vertical transform type and the horizontal transform type,
wherein deriving the residual sample array includes:
performing, based on the vertical transform type, a one-dimensional transform process in the vertical direction on each of columns of the inverse quantized transform coefficient array; and
performing, based on the horizontal transform type, a one-dimensional transform process in the horizontal direction on each of rows of an intermediate sample array output by the one-dimensional transform process for each of the columns,
wherein performing the one-dimensional transform process in the horizontal direction includes clipping an intermediate sample value output by the one-dimensional transform process for each of the columns based on a minimum value and a maximum value of a predefined coefficient.

2. The method of claim 1,
wherein the plurality of transform combinations includes at least one of DCT2, DST7, or DCT8.

3. The method of claim 1,
wherein based on the third syntax element being equal to a value of zero, the vertical transform type and the horizontal transform type are determined as DCT2, and
wherein based on the third syntax element being equal to a value of non-zero, each of the vertical transform type and the horizontal transform type is determined as one of DST7 or DCT8.

4. A method of encoding a video signal based on a Multiple Transform Selection (MTS) by an apparatus, comprising:
generating a residual sample array of a current block;
determining a vertical transform type applied to a vertical direction of the current block and a horizontal transform type applied to a horizontal direction of the current block;
performing transform on the current block based on the vertical transform type and horizontal transform type;
deriving a quantized transform coefficient array with a width and a height of the current block by performing quantization on the current block; and
entropy-encoding the quantized transform coefficient array of the current block,
wherein the MTS represents a transform method performed based on a transform combination selected from a plurality of transform combinations within a transform configuration group,
wherein syntax elements for the MTS are encoded into a bitstream,
wherein the syntax elements include a first syntax element indicating whether a third syntax element could be present in a syntax for an intra coding unit, a second syntax element indicating whether the third syntax element could be present in a syntax for an inter coding unit, and the third syntax element corresponding to one of the plurality of transform combinations,
wherein the first and second syntax elements are included in a sequence parameter set (SPS) of the bitstream,
wherein performing the transform on the current block includes:
performing, based on the horizontal transform type, a one-dimensional transform process in the horizontal direction on each of rows of the residual sample array; and
performing, based on the vertical transform type, a one-dimensional transform process in the vertical direction on each of columns of an intermediate sample array output by the one-dimensional transform process for each of the rows of the residual sample array.

5. The method of claim 4,
wherein the plurality of transform combinations includes at least one of DCT2, DST7, or DCT8.

6. The method of claim 4,
wherein the third syntax element is encoded as a value of zero based on the vertical transform type and the horizontal transform type being determined as DCT2, and
wherein the third syntax element is encoded as a value of non-zero based on each of the vertical transform type and the horizontal transform type being determined as one of DST7 or DCT8.

7. A transmission method of data for an image, comprising:
obtaining a bitstream for the image, wherein the bitstream is generated by: generating a residual sample array of a current block, determining a vertical transform type applied to a vertical direction of the current block and a horizontal transform type applied to a horizontal direction of the current block, performing transform on the current block based on the vertical transform type and horizontal transform type, deriving a quantized transform coefficient array with a width and a height of the current block by performing quantization on the current block, and entropy-encoding the quantized transform coefficient array of the current block; and transmitting the data comprising the bitstream, wherein the MTS represents a transform method performed based on a transform combination selected from a plurality of transform combinations within a transform configuration group, wherein syntax elements for the MTS are encoded into the bitstream, wherein the syntax elements include a first syntax element indicating whether a third syntax element could be present in a syntax for an intra coding unit, a second syntax element indicating whether the third syntax element could be present in a syntax for an inter coding unit, and the third syntax element corresponding to one of the plurality of transform combinations, wherein the first and second syntax elements are included in a sequence parameter set (SPS) of the bitstream, wherein performing the transform on the current block includes:

performing, based on the horizontal transform type, a one-dimensional transform process in the horizontal direction on each of rows of the residual sample array; and performing, based on the vertical transform type, a one-dimensional transform process in the vertical direction on each of columns of an intermediate sample array output by the one-dimensional transform process for each of the rows of the residual sample array.

\* \* \* \* \*